United States Patent [19]

Tahara et al.

[11] Patent Number: 5,741,446
[45] Date of Patent: Apr. 21, 1998

[54] METHOD OF PRODUCING A MOLDED ARTICLE USING A MOLD ASSEMBLY WITH AN INSERT BLOCK

[75] Inventors: Hisashi Tahara; Toshiaki Izumida, both of Hiratsuka, Japan

[73] Assignee: Mitsubishi Engineering-Plastics Corp., Japan

[21] Appl. No.: 652,356

[22] Filed: May 23, 1996

[30] Foreign Application Priority Data

| May 26, 1995 | [JP] | Japan | 7-152519 |
|---|---|---|---|
| Oct. 3, 1995 | [JP] | Japan | 7-279761 |
| Oct. 3, 1995 | [JP] | Japan | 7-279762 |
| Oct. 5, 1995 | [JP] | Japan | 7-258609 |
| Oct. 16, 1995 | [JP] | Japan | 7-266886 |
| Oct. 27, 1995 | [JP] | Japan | 7-280724 |
| Nov. 1, 1995 | [JP] | Japan | 7-285172 |
| Nov. 21, 1995 | [JP] | Japan | 7-302517 |
| Nov. 21, 1995 | [JP] | Japan | 7-403516 |
| Dec. 22, 1995 | [JP] | Japan | 7-334817 |
| Jan. 12, 1996 | [JP] | Japan | 8-021697 |
| Feb. 1, 1996 | [JP] | Japan | 8-038687 |
| Mar. 8, 1996 | [JP] | Japan | 8-080816 |

[51] Int. Cl.$^6$ ............................................. B29C 45/37
[52] U.S. Cl. ............... 264/1.9; 249/115; 249/134; 249/135; 264/2.2; 264/328.1; 264/328.7; 264/328.9; 264/335; 264/337; 264/338; 264/572; 425/190; 425/437; 425/444; 425/468; 425/546; 425/555; 425/556; 425/577; 425/DIG. 247
[58] Field of Search ......................... 264/1.9, 328.1, 264/328.2, 328.9, 337, 338, 2.2, 328.7, 335, 572; 425/190, 542, 555, 556, 577, 468, 470, DIG. 247, 546, 437, 444; 249/114.1, 115, 134, 135, 112

[56] References Cited

U.S. PATENT DOCUMENTS

| 4,614,630 | 9/1986 | Pluim, Jr. | 264/337 |
|---|---|---|---|
| 4,704,079 | 11/1987 | Pluim, Jr. | 425/190 |
| 4,731,013 | 3/1988 | Schrammel | 425/542 |
| 4,783,041 | 11/1988 | Sakaida et al. | 249/134 |
| 5,151,232 | 9/1992 | Thornthwaite et al. | 264/338 |
| 5,362,226 | 11/1994 | Kataoka et al. | 264/337 |
| 5,620,635 | 4/1997 | DeRozier et al. | 425/577 |

*Primary Examiner*—Jay H. Woo
*Assistant Examiner*—Joseph Leyson
*Attorney, Agent, or Firm*—Wenderoth, Lind & Ponack

[57] ABSTRACT

A method is disclosed for the production of a molded article, using a mold assembly including a mold having a cavity, for producing a molded article from a thermoplastic resin; an insert block formed of ceramic or glass having a thermal conductivity of $2 \times 10^{-2}$ cal/cm.sec.°C. or less, the insert block being disposed inside the mold, constituting part of the cavity, and having a thickness of 0.5 mm to 10 mm; and a cover plate for covering a peripheral portion of the insert block. The cover plate is attached to the mold and constitutes part of the cavity, wherein a clearance between the insert block and the cover plate is 0.001 mm to 0.03 mm, an amount of overlapping of the insert block and the cover plate is at least 0.1 mm. The method includes filling a molten thermoplastic resin in the cavity, and then cooling the thermoplastic resin to solidness.

51 Claims, 41 Drawing Sheets

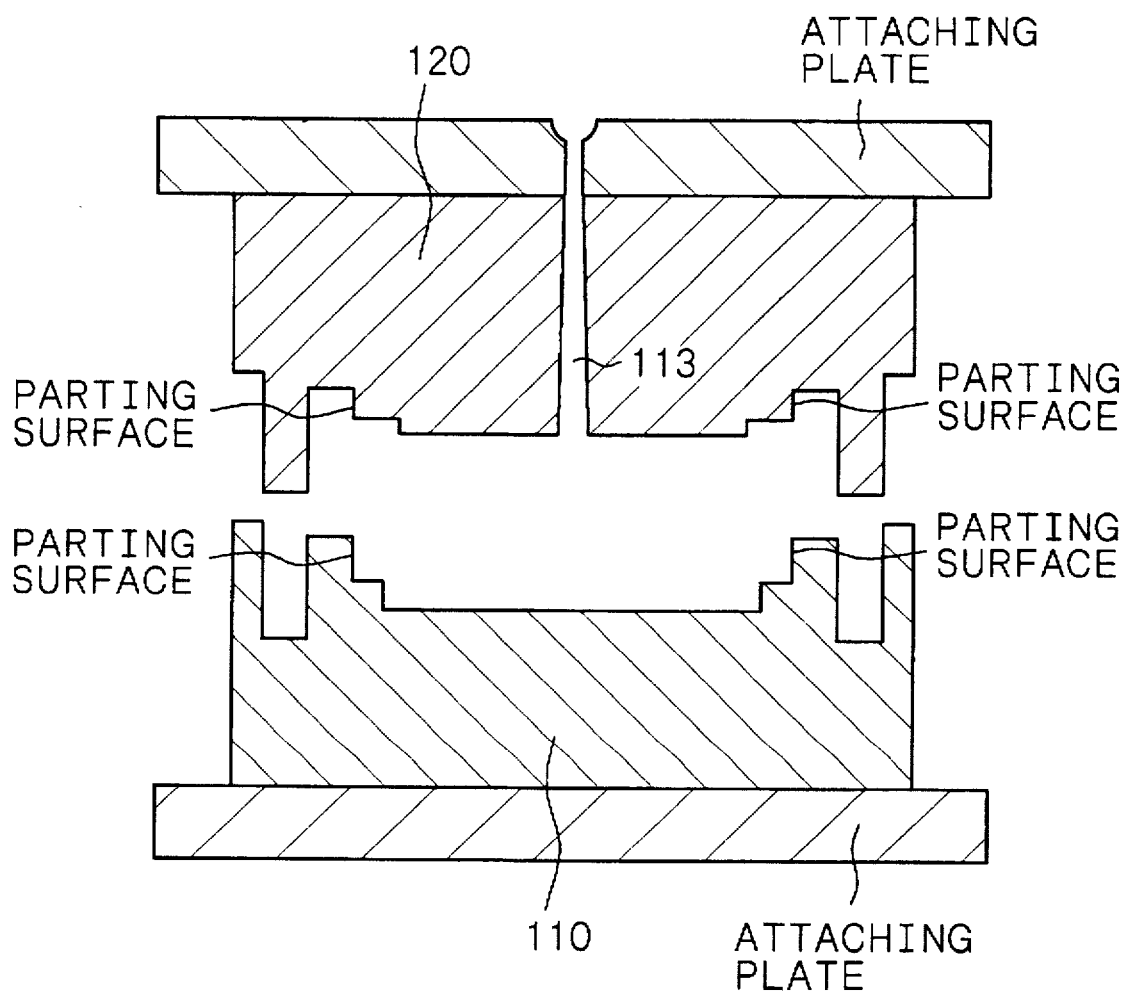

METHOD OF PRODUCING A MOLDED ARTICLE USING A MOLD ASSEMBLY WITH AN INSERT BLOCK

BACKGROUND OF THE INVENTION AND RELATED ART

The present invention relates to a method of producing a molded article which is formed of a thermoplastic resin and has a modified surface, a mold assembly for molding a thermoplastic resin, and an insert block.

Generally, a mold used for producing a molded article of a thermoplastic resin (to be simply referred to as "mold" hereinafter) is formed from a metal material that is not deformed under a high pressure exerted at the time of filling a cavity, i.e., a hollow portion, of the mold, with a molten thermoplastic resin (to be sometimes simply referred to as "molten resin" hereinafter). The metal material is selected, for example, from carbon steel, stainless steel, aluminum alloy or copper alloy. A molten resin is filled in the cavity, and as a result, a molded article having a desired form and having a surface to which a surface of the mold is replicated. The surface of the mold which constitutes the cavity is sometimes referred to as "cavity wall of the mold" hereinafter.

In a mold used for producing a molded article having a hole from a thermoplastic resin, a core pin (also called "pin" or "mold pin") for providing the molded article with a hole is arranged in the cavity of the mold. A molten resin is filled in the cavity, and as a result, a molded article having a hole in a portion occupied by the core pin is produced.

A molded article is produced, for example, from a crystalline thermoplastic resin as a raw material. A crystalline thermoplastic resin gives the molded article improved in hardness and elasticity since it has an increased density and melting point when crystallized. A crystalline thermoplastic resin has a characteristic feature in being excellent in chemical resistance since water, a dye and a plasticizer scarcely penetrate in its crystal structure. In producing a molded article by molding a crystalline thermoplastic resin, generally, there is employed a method in which the mold temperature is set at a level considerably lower than the deflection temperature under load of the crystalline thermoplastic resin in advance so as to promote the cooling and curing of the molten crystalline thermoplastic resin filled in the cavity of the mold. The mold has an excellent thermal conductivity since it is formed from a metal material.

When a mold of a metal material is used and when the mold temperature is set at a level considerably lower than the deflection temperature under load of a crystalline thermoplastic resin as described above, the molten crystalline thermoplastic resin filled in the cavity begins to be cooled as soon as it is brought into contact with the cavity wall of the mold. As a result, an amorphous layer or a low-crystallinity fine crystal layer is formed as a surface of the molded article. Such a layer is generally called a skin layer. The molded article having the skin layer has a problem in that it is greatly degraded in surface properties. For example, a molded article formed of a polyoxymethylene resin as a crystalline thermoplastic resin is very poor in resistance to frictional wear and abrasion and resistance to climate. Further, the decalcomania or replication of the cavity wall of the mold to the surface of a molded article is also poor.

Further, for example, a polymer alloy is used as a raw material for producing a molded article. The polymer alloy refers to a blend of at least two kinds of thermoplastic resins or a block or graft copolymer obtained by chemically binding at least two kinds of thermoplastic resins. The polymer alloy is widely used as a highly functional material having characteristic performances of individual thermoplastic resins. The polymer alloy includes, for example, a high-impact polystyrene (HIPS) and a modified polyphenylene ether resin (modified PPE). A HIPS resin is obtained by incorporating a rubber component such as SBR or BR into a polystyrene resin for improving the polystyrene resin in impact resistance. A molded article therefrom has improved impact resistance, while the molded article is deprived of transparency and gloss due to the presence of the rubber component. A polyphenylene ether (PPE) resin has excellent heat resistance, while it is almost impossible to mold it due to its poor fluidity. However, when a polystyrene resin is incorporated into the PPE resin, there is obtained a modified PPE resin which is improved in fluidity and is moldable. The modified PPE resin contains a PPE resin and a polystyrene resin which are homogeneously dispersed, and the heat resistance and the fluidity thereof can be changed depending upon the amount ratio of these two resins. The polymer alloy formation technique is an excellent technique to make it possible to impart a polymer alloy with performances which the individual resins cannot have when used independently of each other.

However, a molded article formed of a polymer alloy generally has the following problems. The appearance (particularly gloss) of the molded article is poor. In particular, that portion of the molded article which increases or decreases in thickness or a weld portion of the molded article is liable to have a poor appearance. What caused the above is related to the material of a mold. As explained above, generally, the mold is formed from a metal material, which has a good thermal conductivity. A molten polymer alloy filled in the cavity starts to be cooled on being brought into contact with the cavity wall of the mold. As a result, a solidification layer is formed in the molten polymer alloy, which causes poor decalcomania or replication, or poor gloss.

A molded article of a thermoplastic resin having a metallic color tone has a lighter weight than a metal part, has the appearance of a metal, and is used as parts of an automobile or parts of other industrial products. For producing the molded article having a metallic color tone, generally, a coating composition containing metal particles which can give a metallic color tone is applied to the mold article, or metal particles which can give a metallic color tone are mixed with a raw material resin of the molded article. The application of a coating composition can relatively easily impart the surface of the molded article with a metallic appearance regardless of the size of metal particles contained in the coating composition. However, the problem is that it is required to form double or more coatings of clear coating composition(s) for imparting the molded article with the deep and glossy appearance, so that the number of the steps of producing the molded article increases. On the other hand, the method of mixing metal particles with a resin has the following problems. For example, when metal particles having small particle diameters are used, a mold article is liable to have the color of turbid gray, and it is difficult to impart the molded article with a metallic appearance. When metal particles having large particle diameters are used, the metal particles are deposited on the surface of the molded article, and the surface of the molded article has a glary metallic appearance to a great extent. It is therefore required to define the diameter of the metal particles, while, even if the definition is done, no molded article can be imparted with an appearance having the deep and glossy color tone equivalent to that obtained by clear coating. It is therefore general practice to apply clear coating composition(s) to the surface of a molded article, for imparting the molded article with an appearance having the deep and glossy color tone, even when the molded article is formed of a mixture of metal particles with a resin.

It is because the metal particles are deposited on the surface of a molded article to form an uneven surface that no deep and glossy appearance can be obtained. This phenomenon is related to the material of a mold. As explained already, generally, the mold is formed from a metal material, which has a good thermal conductivity. A molten resin filled in the cavity starts to be cooled on being brought into contact with the cavity wall of the mold. As a result, a solidification layer is formed in the molten resin containing the metal particles, and metal particles are deposited on the surface of the molded article, which causes poor gloss. Further, since the solidification layer develops, it is difficult to faithfully replicate the cavity wall of the mold to the surface of the molded article.

A thermoplastic resin containing an inorganic fiber is often used as a raw material for producing various parts for automobiles and industrial products, since it enables the improvement of a molded article in heat resistance and rigidity.

A door handle of an automobile is used for opening and closing a door of an automobile, and is required to have an excellent appearance. Generally, a thermoplastic resin containing no filler is therefore used as a raw material for producing a door handle of an automobile. Further, a door handle of an automobile is required to have high rigidity and a high flexural modulus. For this reason, generally, a door handle of an automobile is designed to have a special form, or the thickness thereof is increased. Further, since a door handle of an automobile is an exterior part, it is required to have heat resistance, and generally, an engineering plastic is used as a raw material.

For obtaining the rigidity required for a handle of an automobile, it is preferred to use a thermoplastic resin containing an inorganic fiber.

An exterior member of an automobile is required to have high durability against collision, high durability against the deformation caused by a change in temperature and an excellent appearance. Therefore, a material for the exterior member of an automobile is as well required to have a high elastic modulus, a low coefficient of linear expansion, high heat resistance and high definition. An exterior member of an automobile is required, for example, to have the following requirements. The flexural modulus (ASTM D790) is at least 5.0 GPa, the coefficient of linear expansion (ASTM D696) is not more than $3.0 \times 10^{-5}$/K., the deflection temperature under load (ASTM D648, load 455 kPa) is at least 140° C., and the definition (reflection image clarity or mirror surface property) is at least 85%. Metal materials have been used as a raw material for producing the exterior member of an automobile which can satisfy the above requirements. The exterior member of an automobile is generally produced by press-forming a metal material in a desired form and then applying a coating composition. The exterior member formed of a metal material satisfies the various requirements, while it has a defect in a heavy weight. In descriptions to follow hereinafter, measurements for the flexural modulus, the coefficient of linear expansion and the deflection temperature under load are based on ASTM D790, ASTM D696 and ASTM D648 (load 455 kPa).

Further, the exterior member of an automobile generally has a problem in that the freedom of design is low since it is produced by a press forming method. It is therefore studied to produce an exterior member of an automobile from a thermoplastic resin for an increased mileage, a decreased weight and diversified designs. Generally, the exterior member of an automobile is produced by molding a thermoplastic resin to produce an exterior part and applying a coating composition to the surface of the exterior part. The "exterior part" and "exterior member of an automobile" are both molded articles, while, for distinguishing these two terms, the molded article whose surface is not yet coated with a coating composition will be sometimes referred to as "exterior part", and the molded article whose surface is coated with a coating composition will be sometimes referred to as "exterior member of an automobile" hereinafter.

For producing an exterior part and an exterior member of an automobile which satisfy the various requirements, it is preferred to produce them from a thermoplastic resin containing an inorganic fiber.

A pillar of an automobile such as a front pillar, a center pillar or a rear pillar is an exterior member which constitutes a part of a side body of an automobile, and is required to have an excellent appearance. A thermoplastic resin containing no filler is therefore generally used as a raw material for producing a pillar of an automobile. Further, a pillar of an automobile is required to have high strength (high flexural modulus in particular). A pillar of an automobile is therefore generally designed to have a special form or increased in thickness. Moreover, a pillar of an automobile is required to have heat resistance since it is an exterior member, and an engineering plastic is generally used as a raw material therefor. A pillar of an automobile is produced by molding a thermoplastic resin to form a pillar part and forming a hard coating on the surface of the pillar part. In view of strength, it is preferred to produce a pillar part or a pillar of an automobile from a thermoplastic resin containing an inorganic fiber. The "pillar part" and "pillar of an automobile" are both molded articles, while, for distinguishing these two terms, the molded article whose surface is not yet coated with a coating composition will be sometimes referred to as "pillar part", and the molded article whose surface is coated with a coating composition will be sometimes referred to as "pillar of an automobile" hereinafter.

In a mirror mounted on an automobile, it is required to decrease the warpage of an image caused by the vibration when an automobile is running and caused by a change in temperature. Further, the mirror is required to have heat resistance against the deformation under heat when exposed to high temperatures in summer (the temperature inside an automobile reaches close to 80° C.). Further, the mirror is required to have excellent surface smoothness since the clear reflection of an image in the mirror is the most essential. For satisfying the above requirements, the mirror of an automobile is required to have a high elastic modulus, a low coefficient of linear expansion, a high deflection temperature under load (heat resistance temperature) and high definition (reflection image clarity or mirror surface property). A mirror part, described hereinafter, is required, for example, to have the following requirements. The flexural modulus is at least 5.0 GPa, the coefficient of linear expansion is not more than $3.0 \times 10^{-5}$/K., the deflection temperature under load is at least 100° C., and the definition is at least 85%.

The material for a mirror of an automobile which satisfies the above requirements is conventionally selected from glass materials such as soda-lime glass or heat resisting glass. The mirror of an automobile is produced from the above glass material as follows. The glass material is placed on a tooling having a desired form, and shaped by itself by heating it in a high-temperature furnace at 700° to 1000° C. for tens minutes, to obtain a mirror part. Then, for example, aluminum is vacuum-deposited on the surface of the mirror part to complete the mirror of an automobile. The mirror part produced through the above steps satisfies the requirements. However, the problem is that it is difficult to produce mirrors of an automobile in volume due to the above steps and a high production cost is required per mirror of an automobile. The term "mirror part" refers to a part on the surface of which aluminum or the like is not yet vacuum-deposited, and the term "mirror of an automobile" refers to a part on the surface of which aluminum or the like is vacuum-deposited.

In a mirror of an automobile housed in a speedometer, etc., it is required to assemble the mirror of an automobile produced as described above and a speedometer part formed of a resin together with various parts and incorporate the resultant component into an automobile. There is therefore another problem in that the number of production steps increases.

The material for satisfying the above requirements includes not only glass materials but also a thermoplastic resin containing an inorganic fiber.

A reflector is a part which effectively reflects light emitted from a light source. For example, a reflector of a headlamp of an automobile is required to have excellent definition and reflectivity for lighting in front of an automobile running at night. The resin used as a raw material for the reflector is selected, for example, a sheet molding compound (SMC) or bulk molding compound (BMC) containing an unsaturated polyester resin containing a filler. Generally, the reflector is produced by molding SMC or BMC to obtain a reflector part and forming a thin metal film on the surface of the reflector part. The "reflector part" and "reflector" are both molded articles, while, for distinguishing these two terms, the molded article whose surface is not yet coated with a thin metal film will be referred to as "reflector part", and the molded article whose surface is coated with a thin metal film will be referred to as "reflector" hereinafter.

The above SMC or BMC generates a large amount of gas when molded, and the reflector part is therefore liable to have an uneven surface. The reflector part is therefore post-treated, or putty is applied to the surface of the reflector part, to even the surface, whereby the reflector part is imparted with an excellent appearance. Further, SMC and BMC are thermosetting resins, and they therefore require a long molding cycle and are poor in mass productivity. Further, mold flashes occur on the molded article and the post treatment of removing the mold flashes is required, which requires an additional cost. Further, the molding machine used with SMC or BMC is very expensive, about 10 times as expensive as an injection molding machine.

As a raw material which can be a substitute for the unsaturated polyester resin, preferred is a thermoplastic resin containing an inorganic fiber.

The exterior part, the pillar part, the mirror part, the door handle of an automobile and the reflector part are sometimes generically called "molded part" hereinafter.

For obtaining various requirements for the molded part, it is preferred to use a thermoplastic resin containing an inorganic fiber. However, when the molded part is produced from a thermoplastic resin containing an inorganic fiber, the molded part has the following problems. An inorganic fiber is deposited on the surface of the molded part, and as a result, the appearance is degraded or the definition (mirror surface property) is deteriorated. It is therefore difficult to use a thermoplastic resin containing an inorganic fiber for producing a molded part which is required to have an excellent appearance and excellent definition. The phenomenon of inorganic fiber being deposited on the surface of the molded part is observed through the emergence of the inorganic fiber on the surface of the molded part.

For overcoming the problem of the inorganic fiber being deposited on the surface of the molded part, it is general practice to improve the flowability of a molten resin by decreasing the viscosity of a thermoplastic resin. However, with an increase in the content of an inorganic fiber, it is more difficult to prevent the deposition of the inorganic fiber onto the surface of the molded part. It is therefore difficult to use a thermoplastic resin containing an inorganic fiber for producing the molded part which is required to have an excellent appearance, although the thermoplastic resin containing an inorganic fiber has excellent performances.

The cause of the deposition of an inorganic fiber onto the surface of a molded part when the content of the inorganic fiber is increased is also related to the material of a mold. As explained already, generally, the mold is formed from a metal material, which has a good thermal conductivity. A molten resin filled in the cavity starts to be cooled on being brought into contact with the cavity wall of the mold. As a result, a solidification layer is formed in the molten resin, and the inorganic fiber is deposited on the surface of the molded part. Further, there is caused another problem in that the decalcomania or replication of the cavity wall of the mold to the surface of the molded part is insufficient. In addition, when a solidification layer is formed in a thermoplastic resin containing no inorganic fiber in contact with the cavity wall of the mold, poor appearances such as a weldmark and a flow mark are liable to occur, and the decalcomania or replication of the cavity wall of the mold to the surface of a molded article is poor.

Further, the solidification rate of a molten resin in the cavity increases in some cases, and no sufficient pressure reaches the inside of a molded article. There is therefore another problem below. A sink mark is liable to occur on the molded article. In particular, when the molded article has a large thickness, a sink mark is liable to occur. Even when the molded article is a general one, a sink mark is liable to occur in circumferential portions thereof.

When a molded article having a hole is produced, the flow of a molten resin filled in the cavity is divided by a core pin and then allowed to converge. In this process, the molten resin is cooled and resin which is starting solidification converges, so that a weldline is liable to occur. A molded article having a weldline shows an extreme decrease in strength. It is therefore required to design a mold to avoid the occurrence of a weldline in that portion of a molded article on which a stress is exerted, and as a result, the freedom of design of a molded article decreases. Further, a molded article having a weldline is poor in appearance.

For overcoming the above-explained various problems, generally, there is employed a method in which a cavity wall of a mold is forced to be replicated to the surface of a molded article by injecting a molten thermoplastic resin into a cavity under high pressure, or a method in which the development of a solidification layer or a skin layer of a thermoplastic resin is delayed by setting the mold temperature at a high level. However, the former method has the following problem; the molding machine is increased in size, the mold itself is increased in size and thickness, all of which require additional costs. Further, the molded article has a residual stress inside due to the injection of the molten resin under high pressure, and as a result, the molded article is poor in quality. On the other hand, the latter method has the following problems. Since the mold temperature is set at a level close to the deflection temperature under load of a thermoplastic resin used, a longer period of time is therefore required for cooling the resin in the cavity. As a result, the molding cycle takes a long time, and the productivity decreases. Further, even if the above molding methods are employed, it is difficult to completely prevent the deposition of metal particles or an inorganic fiber on the surface of a molded article or molded part. Moreover, when a mold formed from, for example, carbon steel is used, the above methods are not sufficient for improving the decalcomania or replication of the cavity wall of the mold or preventing the occurrence of a weldline.

For preventing the defects of a molded article such as a weld-mark and a flow mark by using a thermoplastic resin containing no inorganic fiber, i.e., one that is not reinforced, and for delaying the development of a solidification layer of the resin filled in a cavity of a mold, for example, JP-A-55-55839, JP-A-61-100425, JP-A-62-208919, JP-A-5-111937, JP-A-5-200789, JP-B-6-35134 and JP-A-6-218769 disclose methods in which a member having a low thermal conductivity is provided or attached to a cavity wall of a mold.

However, the method of simply attaching an insert block having a low thermal conductivity to the cavity wall of the mold with an adhesive has the following problems and is difficult to put to practical use.

(1) When a clearance between an insert block having a low thermal conductivity and the mold is small, the insert block is broken due to a difference in the coefficient of linear expansion between the material forming the mold and the material forming the insert block by repeating an increase and a decrease in the mold temperature.

(2) When a clearance between an insert block having a low thermal conductivity and the mold is large, a molten resin penetrates a space between the mold and the insert block in the molding operation for a long period of time, and mold flashes occur on a molded article. The mold flashes destroy the insert block when the molded article is released from the mold.

Further, there is another problem. That is, an insert block having a low thermal conductivity has a residual fine craze caused in its peripheral portion when the insert block is produced by grinding. A cracking occurs in the peripheral portion by the contact of the insert block to a molten resin having a high temperature and a high pressure. As a result, the insert block is broken. For this reason, the durability of the mold as a whole raises concern, and the mass production of molded articles is difficult.

The method of delaying the development of a solidification layer by using an insert block of a heat-resistant plastic has the following problems. Since such an insert block has low rigidity and has a poor surface hardness, the insert block is deformed and damaged when used for a long period of time. There is another insert block which is prepared by forming a thin film of ceramic or the like on a metal surface by a deposition method, while such an insert block has a problem in that the thin film has poor durability and peels off the metal surface. The above insert blocks are therefore used in an experimental mold or a simple mold and are not qualified for use for long period of time. Further, when a mold having one of the above insert blocks incorporated is used for molding a thermoplastic resin containing an inorganic fiber to produce a molded article, a high stress is exerted on the insert block due to the poor flowability of the resin. As a result, the life of the insert block is inevitably decreased. Further, it is required to impart the surface of the insert block with resistance to frictional wear and abrasion, since the inorganic fiber and the insert block are brought into contact with each other. For the above reasons, it is very difficult to use a mold having any one of the above insert blocks incorporated, for molding a thermoplastic resin containing an inorganic fiber to produce a molded article.

There is also known another method of delaying the development of a solidification layer, in which the mold temperature is increased to a high temperature with high frequency, electricity or steam before a molten resin is filed into a cavity of a mold, and the temperature of the mold is decreased with water and the like in a cooling step. However, this method has not been put to practical use so far due to the following reasons. Extraoordinary equipment is required, the cost increases, and the molding cycle takes a long period of time.

When that portion of a mold which constitutes the cavity is produced from a material having a low thermal conductivity, the development of a solidification layer of a molten resin can be delayed. As a result, the decalcomania or replication of a cavity wall of a mold to the surface of a molded article is improved, and a molded article having an aesthetically fine surface can be produced. However, due to the development of a solidification layer, it is difficult to produce a molded article completely free of a sink mark in some cases.

When that portion of a mold which constitutes the cavity is produced from a material having a low thermal conductivity, further, the wettability between the cavity wall of the mold and a molten resin improves due to a delay in the development of a solidification layer. As a result, there is formed a vacuum state between the cavity wall of the mold and the resin (molded article) and it is sometimes difficult to release the molded article from the mold. In this case, when the molded article is forcibly released from the mold, the molded article may be deformed, or the cavity wall of the mold or the material having a low thermal conductivity may be broken or damaged.

For overcoming the problem of a sink mark, a gas-assisted injection molding method is known. In the gas-assisted injection molding method, a pressurized fluid is introduced into a molten thermoplastic resin injected into the cavity of a mold through a pressurized fluid introduction device arranged in the mold, thereby to form a hollow portion in the thermoplastic resin in the cavity. Generally, a molded article has a thickness-increased portion, e.g., in the form of a rib (also called gas channel portion), and the pressurized fluid is introduced into the thickness-increased portion. When the molten resin in the cavity is cooled to solidness, the resin is pressed toward the cavity wall of the mold by the pressurized fluid introduced into the resin in the cavity. As a result, the occurrence of a sink mark on the surface of a molded article can be prevented. In this gas-assisted injection molding method, however, the resin in the vicinity of the cavity wall of the mold which starts solidification and the resin which is in a molten state are mutually mixed when the pressurized fluid is introduced into the molten resin, and that surface of the molded article which is near the thickness-increased portion is liable to have color shading and a faulty appearance.

When a molded article having a hole is produced, a core pin is pressed to a cavity wall of a mold and the cavity is partly occupied by the core pin to form the hole. However, when the core pin is forcibly pressed to a material having a low thermal conductivity, the material having a low thermal conductivity may be deformed or broken.

OBJECTS AND SUMMARY OF THE INVENTION

It is therefore a first object of the present invention to provide a mold assembly used for producing a molded article from a thermoplastic resin and to provide an insert block to be used with, or incorporated into the mold assembly, wherein the insert block can be easily maintained, the insert block formed of a fragile material such as ceramic or glass is not damaged when the thermoplastic resin is molded, the insert block can endure the use for a long period of time, the molded article is free of a mold flash, and a surface of the insert block constituting a cavity wall can be reliably replicated to the surface of the molded article.

It is a second object of the present invention to provide a method of producing a molded article from a thermoplastic resin, in which the above mold assembly is used.

It is a third object of the present invention to provide a method of producing a molded article from a thermoplastic resin containing an inorganic fiber, in which a surface constituting a cavity wall can be faithfully replicated to the surface of the molded article even if the thermoplastic resin containing an inorganic fiber is used, the molded article has an excellent mirror surface property, and the molded article is free of a mold flash.

It is a fourth object of the present invention to provide a method of producing a molded article from a crystalline thermoplastic resin, in which the crystallinity of the surface of the molded article from the crystalline thermoplastic resin can be improved, the degradation of physical properties of the surface of the molded article such as a cracking caused by the deterioration of the resin can be prevented, the molded article is free of a mold flash, and a surface constituting a cavity wall can be faithfully replicated to the surface of the molded article.

It is a fifth object of the present invention to provide a method of producing a molded article from a polymer alloy, in which the molded article of the polymer alloy, having excellent gloss, can be produced, the molded article is free of a mold flash, and a surface constituting a cavity wall can be faithfully replicated to the surface of the molded article.

It is a sixth object of the present invention to provide a method of producing a molded article of a thermoplastic resin, having a metallic color tone, in which a thermoplastic resin containing a metal powder or metal flakes is used, the molded article of a metallic color tone having an excellent deep and glossy appearance can be obtained, and a surface constituting a cavity wall can be faithfully replicated to the surface of the molded article.

It is a seventh object of the present invention to provide a mold assembly to produce a molded article, which enables the faithful decalcomania or replication of a surface constituting a cavity wall to the surface of the molded article, which enables the production of the molded article having an excellent quality, which is free from prolonging a molding cycle, and which can reliably prevent the occurrence of a sink mark on the molded article, and to provide a method of producing a molded article, in which the above mold assembly is used. Further to the above seventh object, it is an eighth object of the present invention to provide a mold assembly and a method of producing a molded article, which enable easy release of a molded article from a mold.

It is a ninth object of the present invention to provide a method of producing a molded article having a hollow portion on the basis of a gas-assisted injection molding method, which makes it possible to reliably avoid the occurrence of color shading, a poor appearance, a sink mark or faulty decalcomania or replication on the molded article formed from a thermoplastic resin as a raw material.

It is a tenth object of the present invention to provide a mold assembly to produce a molded article having a hole, wherein an insert block and a core pin can be easily maintained, the insert block formed of a fragile material such as ceramic or glass is not damaged when the molded article having a hole is produced, the insert block can be used for a long period of time, the molded article having a hole can be reliably produced, the molded article is free of a mold flash, a surface constituting a cavity wall can be faithfully replicated to the surface of the molded article, and a weldline occurs in almost no case, and to provide a method of producing a molded article in which the above mold assembly is used.

The insert block of the present invention for achieving the first object of the present invention is an insert block which is to be disposed inside a mold having a cavity for producing a molded article from a thermoplastic resin and is to constitute part of the cavity, said insert block having a thermal conductivity of $2 \times 10^{-2}$ cal/cm.sec.°C. or less and being formed of ceramic selected from the group consisting of $ZrO_2$, $ZrO_2$-$CaO$, $ZrO_2$-$Y_2O_3$, $ZrO_2$-$MgO$, $K_2O$-$TiO_2$, $Al_2O_3$, $Al_2O_3$-$TiC$, $Ti_3N_2$ and $3 Al_2O_3$-$2 SiO_2$ or glass selected from the group consisting of soda-lime glass, quartz glass, heat resisting glass and glass-ceramics (crystallized glass).

The mold assembly directed to the first aspect of the present invention for achieving the first object of the present invention is a mold assembly for molding a thermoplastic resin, comprising (A) a mold having a cavity, for producing a molded article from a thermoplastic resin, (B) an insert block formed of ceramic or glass, said insert block being disposed inside the mold, constituting part of the cavity and having a thickness of 0.5 mm to 10 mm, preferably 1 mm to 7 mm, more preferably 2 mm to 5 mm, and (C) a cover plate for covering a peripheral portion of the insert block, said cover plate being attached to the mold and constituting part of the cavity, wherein a clearance (C) between the insert block and the cover plate is 0.001 mm to 0.03 mm (0.001 mm$\leq$C$\leq$0.03 mm), preferably 0.003 mm to 0.03 mm (0.003 mm$\leq$C$\leq$0.03 mm), an amount ($\Delta$S) of overlapping of the insert block and the cover plate is at least 0.1 mm ($\Delta$S)$\leq$0.1 mm), and the insert block has a thermal conductivity of $2 \times 10^{-2}$ cal/cm.sec.°C. or less.

The mold generally comprises a fixed mold member and a movable mold member. Depending upon the form of a molded article to be produced and the surface properties required for the molded article, the insert block may be disposed in the movable mold member alone, the fixed mold member alone, or each of the movable mold member and the fixed mold member. A portion in which the insert block is to be disposed may be formed of a core to be attached in the mold. It is preferred to dispose the insert block inside the mold such that the insert block faces that portion of the molded article which is required to have, for example, an excellent smoothness (mirror surface property).

The term "constituting part of the cavity" means "constituting part of the cavity wall which defines the outer form of a molded article". More specifically, the cavity is formed, for example, of the surfaces provided in the movable and fixed mold members and constituting part of the cavity, the surface provided in the insert block and constituting part of the cavity, and the surface provided in the cover plate and constituting part of the cavity. These surfaces or each surface constituting part of the cavity will be referred to as "cavity wall".

For achieving not only the above first object but also the above seventh object, in the mold assembly directed to the second aspect of the present invention, the mold of the mold assembly directed to the first aspect of the present invention, comprises a first mold member and a second mold member and has a structure in which a cavity for forming a molded article is formed inside the mold at the time of closing the mold and the cavity is variable in volume at the time of forming the molded article. In this case, the mold preferably has a telescopic (nesting) structure which is formed by a parting surface of the first mold member and a parting surface of the second mold member. The term "telescopic structure" refers to a structure in which the parting surface of the first mold member and the second mold member face each other and the first mold member and the second mold member are engaged with each other such that the parting surface of the first mold member and the parting surface of the second mold member are slidably in contact with each other to form a cavity even when the mold is not closed perfectly. In some cases, the telescopic structure may be formed of an end face (side face) of the cover plate attached to the first mold member and the parting surface of the second mold member, may be formed of an end face (side face) of the cover plate attached to the second mold member and the parting surface of the first mold member, or may be formed of an end face (side face) of the cover plate attached to the first mold member and an end face (side face) of the (other) cover plate attached to the second mold member.

Depending upon the form of a molded article to be produced and the surface properties required for the molded article, the insert block may be disposed in the first mold member alone, the second mold member alone, or each of the first mold member and the second mold member.

The following Table 1 shows combinations of elements to constitute the cavity wall, disposed or arranged on the side of the first mold member corresponding to a female mold (cavity portion), and elements to constitute the cavity wall, disposed or arranged on the side of the second mold member corresponding to a male mold (core portion). When the elements constituting the cavity wall are (the first or second mold member)+(the insert block)+(the cover plate), the peripheral portion of the insert block is covered by the cover plate, and the edge portion of the cover plate leaves a pressing mark on the surface of a molded article.

Table 1

(1) On the side of first mold member: first mold member+ insert block+cover plate
On the side of second mold member:
(1-1) second mold member
(1-2) second mold member+insert block+cover plate
(1-3) insert block+cover plate
(2) On the side of first mold member: insert block+cover plate
On the side of second mold member:
(2-1) second mold member
(2-2) second mold member+insert block+cover plate
(2-3) insert block+cover plate
(3) On the side of first mold member: first mold member On the side of second mold member:
(3-1) second mold member+insert block+cover plate
(3-2) insert block+cover plate Since the development of a solidification layer is delayed, the wettability between a molten thermoplastic resin and that surface of the insert block which constitutes or forms the cavity wall (to be sometimes referred to as "cavity wall of the insert block" hereinafter) improves to form a space of vacuum between the resin (molded article) and the cavity wall of the insert block, and it is sometimes difficult to release the molded article from the insert block, although this phenomenon depends upon the thermoplastic resin used as a raw material. In this case, or for achieving the above eighth object of the present invention, preferably, the mold assembly directed to the second aspect of the present invention further has a knock-out pin slidably disposed in the first mold member and has a structure in which a clearance ($CP_1$) between the knock-out pin and the first mold member is 0.01 mm to 0.03 mm (0.01 mm$\leq CP_1 \leq$0.03 mm), a space between the knock-out pin and the first mold member and a space between the insert block and the cover plate are communicated with a fluid source and a fluid flows through the space between the knock-out pin and the first mold member and through the space between the insert block and the cover plate when the mold is opened to release the molded article from the first mold member with the knock-out pin after the molded article is produced. The fluid source can be selected, for example, from a compressed air source or a pressurized nitrogen gas source, and in this case, the fluid is compressed air or pressurized nitrogen gas. An embodiment in which the cover plate is attached to the first mold member and the knock-out pin is disposed through the cover plate is also included in the embodiment in which the knock-out pin is disposed in the first mold member.

It is sufficient that the above clearance ($CP_1$) between the knock-out pin and the first mold member should be present in a region ranging from a site about 5 mm apart from the top end of the knock-out pin to a site about 30 mm apart from the top end of the knock-out pin. In a region other than the above region, the clearance between the knock-out pin and the first mold member is preferably 0.5 mm to 5 mm in view of the flow of the fluid. When the clearance ($CP_1$) between the knock-out pin and the first mold member is less than 0.01 mm, it is difficult to flow the fluid through the space between the knock-out pin and the first mold member. When the above clearance ($CP_1$) exceeds 0.03 mm, a molten thermoplastic resin may penetrate the space between the knock-out pin and the first mold member.

The method of the production of a molded article, directed to the first aspect of the present invention, for achieving the second object of the present invention uses a mold assembly comprising (A) a mold having a cavity, for producing a molded article from a thermoplastic resin, (B) an insert block formed of ceramic or glass having a thermal conductivity of $2 \times 10^{-2}$ cal/cm.sec.°C. or less, said insert block being disposed inside the mold, constituting part of the cavity and having a thickness of 0.5 mm to 10 mm, preferably 1 mm to 7 mm, more preferably 2 mm to 5 mm, and (C) a cover plate for covering a peripheral portion of the insert block, said cover plate being attached to the mold and constituting part of the cavity, wherein a clearance (C) between the insert block and the cover plate is 0.001 mm to 0.03 mm (0.001 mm$\leq C \leq$0.03 mm), preferably 0.003 mm to 0.03 mm (0.003 mm$\leq C \leq$0.03 mm), and an amount ($\Delta S$) of overlapping of the insert block and the cover plate is at least 0.1 mm ($\Delta S \geq$0.1 mm), said method comprising filling a molten thermoplastic resin in the cavity, and then cooling the thermoplastic resin to solidness. The above method will be sometimes referred to as "first production method" hereinafter.

In the method of producing a molded article directed to the first aspect of the present invention (first production method), the method of producing a molded article by molding includes an injection molding method and a blow molding method which are generally used for molding a thermoplastic resin and a multi-color molding method, and an injection molding method is the most preferred.

For achieving the above third object of the present invention, the method of producing a molded article, directed to the first aspect of the present invention, uses a thermoplastic resin containing 5 to 80% by weight of an inorganic fiber having an average length of 5 to 400 µm, preferably 5 to 200 µm, more preferably 5 to 100 µm and an average diameter of 0.01 to 15 µm, preferably 0.05 to 13 µm, more preferably 0.1 to 10 µm. The above method of producing a molded article will be sometimes referred to as "second production method" hereinafter.

The content of the inorganic fiber in the thermoplastic resin (i.e., the amount of the inorganic fiber added to the thermoplastic resin) may be in the range sufficient to form a molded article which can satisfy a required flexural modulus (e.g., at least 3.0 GPa when the molded article is measured according to ASTM D790). The upper limit of the content of the inorganic fiber exists just before the content when the flowability of the molten thermoplastic resin in the cavity is too low to mold the thermoplastic resin or a molded article having an excellent mirror surface property can be no longer produced. Specifically, when the thermoplastic resin is a crystalline thermoplastic resin, the above upper limit is about 80% by weight. When the thermoplastic resin is an amorphous thermoplastic resin, the above upper limit may be about 50% by weight since the flowability of the molten amorphous thermoplastic resin is lower than that of the molten crystalline one. When the above content is less than 5% by weight, the flexural modulus, elastic modulus and coefficient of linear expansion cannot required be obtained. When the above content exceeds 80% by weight, the production of a molded article by molding is difficult since the flowability of the molten thermoplastic resin decreases, or no molded article having an excellent mirror surface property may be produced.

When the inorganic fiber has an average length of less than 5 µm or when the inorganic fiber has an average diameter less than 0.01 µm, no molded article having the flexural modulus required can be obtained. When the inorganic fiber has an average length of more than 400 µm, or when the inorganic fiber has an average diameter of more than 15 µm, there is a problem in that the surface of a molded article is no longer a mirror surface.

The inorganic fiber having an average length and an average diameter in the above ranges is preferably surface-treated with a silane-coupling agent or the like, and compounded with a thermoplastic resin, and the compound is pelletized to form a molding material. The thus-obtained molding material is molded, and the mold assembly in which the insert block and the cover plate are incorporated is used for the molding, whereby there can be obtained a molded article having a high rigidity, a high elastic modulus, a low coefficient of linear expansion and a high deflection temperature under load (heat resistance) and having an excellent mirror surface property (definition).

The inorganic fiber used in the second production method is at least one member preferably selected from the group consisting of a glass fiber, a carbon fiber, wollastonite, an aluminum borate whisker fiber, a potassium titanate whisker fiber, a basic magnesium sulfate whisker fiber, a calcium silicate whisker fiber and a calcium sulfate whisker fiber. These inorganic fibers may be used alone or in combination. The thermoplastic resin suitable for use in the second production method includes polyolefin resins such as a polyethylene resin and a polypropylene resin, styrene resins such as a polystyrene resin, an AS resin, an ABS resin and an AES resin, polyamide resins such as polyamide 6, polyamide 66 and polyamide MXD6, a methacrylic resin, a polycarbonate resin, a polyoxymethylene resin, a modified PPE resin, a polyester resin, a polyphenylene sulfide resin and a liquid crystal polymer, and polymer alloys formed of at least two members of the above thermoplastic resins. Above all, preferred are a polycarbonate resin, a polyamide resin, a modified PPE resin, a polyester resin and a polycarbonate/polyester resin polymer alloy.

The average length of the inorganic fiber refers to a weight-average length. The inorganic fiber can be measured for a length as follows. Molding pellets containing an inorganic fiber or a molded article are/is dipped in a liquid in which the resin component of the thermoplastic resin is soluble. When the inorganic fiber is a glass fiber, the resin component is combusted at 600° C. or higher. The residual inorganic fibers are observed through a microscope, etc. Generally, a photograph of the inorganic fibers is taken, and inorganic fibers are manually measured for a length, or an apparatus specialized for measuring a fiber length is used. A number-average length is affected by finely broken fibers to a great extent, and it is therefore preferred to use a weight-average length. In the measurement of a weight-average length, fragments of the inorganic fibers crushed too finely are removed. When the length of the inorganic fiber is smaller than the size which is twice as large as the nominal diameter of the inorganic fiber, the measurement is difficult. Therefore, for example, inorganic fibers having a length at least twice as large as the nominal diameter are measured.

The molded article obtained by the method (second production method) of producing a molded article from the thermoplastic resin containing an inorganic fiber, directed to the first aspect of the present invention, is to constitute a door handle of an automobile. The door handle of an automobile is required to have the following physical property values.

Flexural modulus: at least 5.0 GPa, preferably 5 to 25 GPa

Coefficient of linear expansion: $3.0 \times 10^{-5}$/K. or less, preferably 0.5 to $3.0 \times 10^{-5}$/K.

Deflection temperature under load: at least 140° C.

Definition: at least 85%

For satisfying the above properties, it is preferred to use a thermoplastic resin containing an inorganic fiber which satisfies the following requirements.

Average length: 5 to 400 µm, preferably 5 to 70 µm

Average diameter: 0.01 to 15 µm, preferably 0.1 to 10 µm

Content: 15 to 80% by weight, preferably 20 to 60% by weight

The door handle of an automobile comprises a body member fixed to a door, and a handle member connected to the body member with a spring or a fixing part. The door handle of an automobile includes an outside door handle of slide type (pull-up type) or push-button type with an outside hinge or an inside hinge, and an inside door handle of slide type housed in a door trim.

The method (second production method) of producing a molded article from a thermoplastic resin containing an inorganic fiber, directed to the first aspect of the present invention, may further include the step of forming a light reflection thin film on at least part of the surface of the molded article. The method of producing the above molded article will be sometimes referred to as "No. 2A production method" hereinafter. In the No. 2A production method, the thickness of the light reflection thin film can be a thickness sufficient for effectively reflecting light. The thickness of the light reflection thin film is at least 50 nm, preferably 50 to 500 nm, more preferably 100 to 300 nm. When the above thickness is less than 50 nm, the reflectivity is sometimes insufficient. When it is over 500 nm, the surface smoothness of a molded article is decreased to cause a problem in the reflectivity in some cases.

The material for the light reflection thin film includes metals such as gold, platinum, silver, chromium, nickel, phosphorus-nickel, aluminum, copper, beryllium, beryllium-copper and zinc, metal compounds of these, and alloys of these metals. The method of forming the above thin film includes PVD (physical vapor deposition) methods such as (a) vacuum deposition methods such as an electron beam heating method, a resistance heating method and a flash deposition method, (b) a plasma deposition method, (c) sputtering methods such as a bipolar sputtering method, a direct-current sputtering method, a direct-current magnetron sputtering method, a high-frequency sputtering method, a magnetron sputtering method, an ion-beam sputtering method and a bias sputtering method, and (d) ion plating methods such as a DC (direct current) method, an RF method, a multi-cathode method, an activation reaction method, an HCD (hollow cathode discharge) method, an electric field deposition method, a high-frequency ion-plating method and a reactive ion-plating method.

From the viewpoint of the reflectivity and cost, it is the most preferred to form the light reflection thin film by vacuum-depositing aluminum.

A mirror is one type among molded articles obtained by the above method. That is, the molded article is to constitute a mirror. Specifically, the mirror includes mirrors of an automobile such as an inside rear-view mirror, a wing mirror, a fender mirror, a mirror inside a speed meter; a roof mirror (roof prism) of a camera; an optical mirror of a copying machine and a polygonal mirror of a laser beam printer. The molded article constituting a mirror part and a mirror is required to have the following physical property values.

Flexural modulus: at least 5.0 GPa
Coefficient of linear expansion: $3.0 \times 10^{-5}/K$ or less
Deflection temperature under load: at least 100° C.
Definition: at least 85% for a mirror part For satisfying the above physical property values, it is preferred to use a thermoplastic resin containing an inorganic fiber which satisfies the following requirements.

Average length: 5 to 100 μm, preferably 5 to 70 μm
Average diameter: 0.01 to 15 μm, preferably 0.1 to 10 μm
Content: 15 to 80% by weight A reflector is another type among the molded articles obtained by the above method. That is, the molded article is to constitute a reflector. Specific example is a reflector included in a head lamp, a turn lamp, a searchlight, a rotating lamp and an emergency lamp. The molded article constituting a reflector part is required to have the following physical property values.

Coefficient of linear expansion: $3.0 \times 10^{-5}/deg$ or less
Deflection temperature under load: at least 140° C.

Definition: at least 80%

For satisfying the above physical property values, it is preferred to use a thermoplastic resin containing an inorganic fiber which satisfies the following requirements.

Average length: 5 to 100 μm, preferably 5 to 70 μm
Average diameter: 0.01 to 15 μm, preferably 0.05 to 13 μm, more preferably 0.1 to 10 μm
Content: 15 to 80% by weight The thermoplastic resin containing an inorganic fiber used in the No. 2A production method preferably has the following property values.

Coefficient of linear expansion: $3.0 \times 10^{-5}/K$ or less, preferably 0.5 to $3.0 \times 10^{-5}/K$.
Deflection temperature under load: at least 140° C., preferably 140° to 260° C.

The method (second production method) of producing a molded article from a thermoplastic resin containing an inorganic fiber, directed to the first aspect of the present invention, may further include the step of forming a coating on at least part of the surface of the molded article. This method of producing a molded article will be sometimes referred to as "No. 2B production method" hereinafter. The coating is preferably formed from at least one coating composition selected from at least one coating composition selected from the group consisting of an acrylic coating composition, a urethane coating composition and an epoxy coating composition. An exterior member of an automobile is one type among molded article obtained by the above method. That is, the molded article is to constitute an exterior member of an automobile. Specific examples of the molded article include a front fender, a rear fender, a door, a bonnet, a roof and a trunk hood. The molded as an exterior member of an automobile is required to have the following physical property values.

Flexural modulus: at least 4.0 GPa
Coefficient of linear expansion: $4.0 \times 10^{-5}/K$ or less
Deflection temperature under load: at least 100° C.
Definition: at least 85%

For satisfying the above physical property values, it is preferred to use a thermoplastic resin containing an inorganic fiber which satisfies the following requirements.

Average length: 5 to 400 μm, preferably 5 to 200 μm
Average diameter: 0.01 to 15 μm, preferably 0.1 to 10 μm
Content: 15 to 80% by weight, preferably 20 to 60% by weight The thermoplastic resin containing an inorganic fiber used in the above No. 2B production method preferably has the following property values.

Flexural modulus: at least 4.0 GPa, more preferably at least 4.5 GPa
Coefficient of linear expansion: $4.0 \times 10^{-5}/K$ or less, more preferably $3.5 \times 10^{-5}/K$ or less
Deflection temperature under load: at least 100° C., preferably at least 110° C.

In the No. 2B production method, after the surface of the molded article (e.g., exterior part) is dusted off, a coating may be formed on at least part of the surface of the molded article (e.g., exterior part) by applying a coating composition to the surface of the molded article (e.g., exterior part) by a brushing, spraying, electrostatic coating or dipping method and by drying the resultant coating. It is preferred to use a coating composition having a curing temperature which does not exceed the deflection temperature under load of the thermoplastic resin as a raw material.

The method (second production method) of producing a molded article from a thermoplastic resin containing an inorganic fiber, directed to the first aspect of the present invention, may further include the step of forming a hard coating on at least part of the surface of the molded article. This method of producing a molded article will be sometimes referred to as "No. 2C production method" hereinafter. The hard coating is preferably at least one member selected from the group consisting of an acrylic hard coating, a urethane hard coating and a silicone hard coating. A pillar for an automobile such as a front pillar, a center pillar or a rear pillar is one type among molded articles obtained by the above method. That is, the molded article is constitute a pillar of an automobile. The molded article constituting a pillar part is required to have the following physical property values.

Flexural modulus: at least 4.0 GPa
Coefficient of linear expansion: $4.0 \times 10^{-5}$/K. or less
Deflection temperature under load: at least 100° C.
Definition: at least 80%

For satisfying the above physical property values, it is preferred to use a thermoplastic resin containing an inorganic fiber which satisfies the following requirements.

Average length: 5 to 400 μm, preferably 5 to 200 μm
Average diameter: 0.01 to 15 μm, preferably 0.1 to 10 μm
Content: 15 to 80% by weight, preferably 20 to 60% by weight The thermoplastic resin containing an inorganic fiber is required to have a flexural modulus of at least 4.0 GPa, a coefficient of linear expansion of $4.0 \times 10^{-5}$/K. or less and a deflection temperature under load of at least 100° C.

In the No. 2C production method, after the surface of the molded article (e.g., pillar part) is dusted, a hard coating can be formed on at least part of the surface of the molded article (e.g., pillar part) by applying a solution selected from the group consisting of an acrylic, urethane or silicone hard-coating solution to the surface of the molded article (e.g., pillar part) by a dipping, flow-coating or spraying method, and by drying the resultant coating to solidness. The thickness of the hard coating on the molded article is 1 to 30 μm, preferably 3 to 15 μm. When the thickness of the hard coating is less than 1 μm, the hard coating is poor in durability. When it exceeds 30 μm, the hard coating is liable to undergo cracking. When the adhesion between the hard coating and the molded article is insufficient, the adhesion can be increased by applying a prior coating to the molded article (e.g., pillar part) before a top coating is formed. Since the molded article (e.g., pillar part) has little residual strain, almost no cracking caused by the formation of the hard coating occurs on the molded article.

For achieving the above fourth object of the present invention, the method of producing a molded article (first production method), directed to the first aspect of the present invention, uses a crystalline thermoplastic resin. The above method of producing a molded article will be sometimes referred to as "third production method" hereinafter.

The crystalline thermoplastic resin used in the third production method includes polyolefin resins such as a polyethylene resin and a polypropylene resin; polyamide resins such as polyamide 6, polyamide 66 and polyamide MXD6; a polyoxymethylene resin; polyester resins such as a polyethylene terephthalate (PET) resin and a polybutylene terephthalate (PBT) resin; and a polyphenylene sulfide resin. Further, the crystalline thermoplastic resin may include a thermoplastic resin obtained by blending any one of the above crystalline thermoplastic resins with not more than 30% by weight, preferably not more than 20% by weight, of an amorphous thermoplastic resin. The amorphous thermoplastic resin includes a styrene resin, a methacrylic resin, a polycarbonate resin, a modified PPE resin and an elastomer. Further, the crystalline thermoplastic resin may contain a stabilizer, an ultraviolet light absorbent, a mold releasing agent, a dye and a pigment. Furthermore, the crystalline thermoplastic resin may contain an inorganic fiber or filler or an organic filler. The inorganic fiber or filler includes a glass fiber, glass beads, a carbon fiber, wollastonite, an aluminum borate whisker fiber, a potassium titanate whisker fiber, a basic magnesium sulfate whisker fiber, a calcium silicate whisker fiber and a calcium sulfate whisker fiber; mica, kaolin and calcium carbonate.

For achieving the above fifth object of the present invention, the method of producing a molded article, directed to the first aspect of the present invention, uses a polymer alloy. The above method of producing a molded article will be sometimes referred to as "fourth production method" hereinafter. The polymer alloy includes a blend of at least two thermoplastic resins and a block or graft copolymer in which at least two thermoplastic resins are chemically bound.

The thermoplastic resins as components for the polymer alloy which is a blend of at least two thermoplastic resins include styrene resins such as a polystyrene resin, an ABS resin, and AES resin and an AS resin, polyolefin resins such as a polyethylene resin and a polypropylene resin, a methacrylic resin, a polycarbonate resin, polyamide resins such as polyamide 6, polyamide 66 and polyamide MXD6, a modified PPE resin, polyester resins such as a polybutylene terephthalate resin and a polyethylene terephthalate resin, a polyoxymethylene resin, a polysulfone resin, a polyimide resin, a polyphenylene sulfide resin, a polyarylate resin, a polyether sulfone resin, a polyether ketone resin, a polyether ether ketone resin, a polyester carbonate resin, a liquid crystal polymer and an elastomer. A polymer alloy of a blend of a polycarbonate resin and an ABS resin is a polymer alloy which is a blend of two thermoplastic resins. The polymer alloy of a polycarbonate resin and an ABS resin will be described as polycarbonate resin/ABS resin. A polymer alloy of at least two thermoplastic resins will be similarly described hereinafter. The polymer alloy which is a blend of at least two thermoplastic resins includes polycarbonate resin/PET resin, polycarbonate resin/PBT resin, polycarbonate resin/polyamide resin, polycarbonate resin/PBT resin/ PET resin, modified PPE resin/HIPS resin, modified PPE resin/polyamide resin, modified PPE resin/PBT resin/PET resin, modified PPE resin/polyamide MXD6 resin, polyoxymethylene resin/polyurethane resin, PBT resin/PET resin, and polycarbonate resin/liquid crystal polymer. The polymer alloy which is a block or graft copolymer obtained by chemically binding at least two thermoplastic resins includes an HIPS resin, an ABS resin, an AES resin and an AAS resin. The polymer alloy may contain a stabilizer, an ultraviolet light absorbent, a mold releasing agent, a dye and a pigment. Further, the polymer alloy may contain an inorganic fiber or filler or an organic filler. The inorganic fiber or filler includes a glass fiber, glass beads, a carbon fiber, wollastonite, an aluminum borate whisker fiber, a potassium titanate whisker fiber, a basic magnesium sulfate whisker fiber, a calcium silicate whisker fiber and a calcium sulfate whisker fiber; mica, kaolin and calcium carbonate.

For achieving the above sixth object of the present invention, the method of producing a molded article, directed to the first aspect of the present invention, uses a thermoplastic resin containing 0.01 to 80% by weight, preferably 0.1 to 60% by weight, more preferably 1 to 50% by weight, of a metal powder having an average particle diameter of 0.1 μm to 1 mm, preferably 0.2 μm to 0.5 mm, or metal flakes having an average thickness of 0.1 to 200 µm, preferably 1 to 150 µm and an average size which is greater than the average thickness, and the thermoplastic resin being an amorphous thermoplastic resin, or being a crystalline thermoplastic resin which satisfies the following formula (1), $$Y > (3.35 \times 10^7) X^{-4.08} \quad (1)$$

wherein Y is a semi-crystallization time and X is a supercooling degree.

X preferably satisfies X≧15. The above method of producing a molded article will be sometimes referred to as "fifth production method" hereinafter.

When the content of the metal powder or the metal flakes is less than 0.01% by weight, the molded article has an insufficient metallic color tone. When the above content exceeds 80% by weight, the molded article only has a glaring appearance, or metal powder or metal flakes are deposited on the surface of the molded article, and it is so difficult to impart the molded article surface with a deep and glossy appearance. When the average particle diameter of the metal powder is less than 0.1 µm, no deeply and glossily metallic appearance is obtained. When the above average particle diameter exceeds 1 mm, metal powder is easily deposited on the surface of the molded article, and no deep and glossy appearance is obtained. When metal flakes having an average thickness of less than 0.1 µm are used, the metal flakes undergo cracking when kneaded with the resin, and the molded article shows a decreased metallic color tone. When the above average thickness exceeds 200 µm, metal flakes are easily deposited on the surface of the molded article, and it is therefore difficult to impart the molded article surface with a deep and glossy appearance. Further, when the average size of the metal flakes is smaller than the average thickness, it is difficult to impart the molded article surface with a deep and glossy appearance.

The metal powder can be measured for an average particle diameter, and the metal flakes can be measured for an average thickness and an average size, with an image analysis apparatus. When the metal powder or the metal flakes are contained in a resin, the resin is carbonized or is dissolved in a solvent, and then the metal powder can be measured for an average particle diameter, or the metal flakes can be measured for an average thickness and an average size.

The metal of the metal powder and the metal flakes includes gold, silver, platinum, copper, aluminum, chromium, iron, nickel, and compounds and alloys of these metals. A chromium oxide powder or an aluminum powder is particularly preferred as a metal powder, or aluminum flakes are particularly preferred as metal flakes, for obtaining a metallic color tone with a deep and glossy appearance or in view of a cost or an aesthetical appearance.

The amorphous thermoplastic resin used in the fifth production method includes styrene resins such as a polystyrene resin, an ABS resin, an AES resin and an AS resin, a methacrylic resin, a polycarbonate resin, a modified PPE resin, a polysulfone resin, a polyether sulfone resin, a polyarylate resin, a polyetherimide resin and a polyamide-imide resin.

The crystalline thermoplastic resin of which the crystallization rate satisfies the above formula (1) has a relatively low crystallization rate. The crystalline thermoplastic resin of this type includes a PET resin, polyamide resins such as polyamide 6, polyamide 66 and polyamide MXD6, a polyimide resin, a polyphenylene sulfide resin, a polyether ketone resin, a polyether ether ketone resin, a polyolefin resin and a polymer alloy. The above polymer alloy includes a polymer alloy containing at least one of the above resins and a polymer alloy containing at least two of the above resins. A PBT resin and a polyoxymethylene resin do not satisfy the above formula (1). However, a polymer alloy obtained by adding 5 to 10% by weight, of the above amorphous thermoplastic resin to a polyoxymethylene (POM) resin or a PBT resin satisfies the above formula (1). When the amount of amorphous thermoplastic resin exceeds 10% by weight, the properties of the polymer alloy decreases.

FIG. 9 shows the relationship between the supercooling degree (X) and the semi-crystallization time (Y). A long semi-crystallization time means a low crystallization rate. In the present invention, the semi-crystallization time (X) is defined to be a time (unit; second) which is a half of the period of time required for the completion of formation of a crystal. The supercooling degree (X) is defined to be a value (unit; °C.) obtained by deducting a temperature (constant temperature) used for crystallization from the melting point of the resin.

When the crystalline thermoplastic resin, e.g., polyamide 6, is measured for a crystallization rate, the crystallization is carried out at a temperature lower than the 224° C. melting point of the polyamide 6. When polyamide 6 is crystallized at an ambient temperature of 180° C., the supercooling degree (X) is 44° C. (=224–180). When the complete crystallization takes 120 seconds at the above ambient temperature, the semi-crystallization time (Y) is 60 seconds (=120/2). The complete crystallization can be found by measuring a sample for a transmittance with a crystallization rate measuring apparatus while holding the sample in a crossed nicol state. When no crystal is formed, the sample looks dark, while the sample comes to look light with an advance in the crystallization.

When the relationship between the semi-crystallization time (Y) and the supercooling degree (X) is outside a range indicated by slanting lines in FIG. 9, the formation of a crystal is active, and a crystal alone is regularly formed with forcing metal powder or metal flakes out onto the surface of a molded article. As a result, the metal powder or the metal flakes are easily deposited on the surface of the molded article. In this case, the crystallization rate can be decreased by adding 5 to 10% by weight, of an amorphous thermoplastic resin such as a polycarbonate resin to a crystalline thermoplastic resin such as a PBT resin. As a result, the deposition of the metal powder or the metal flakes on the surface of the molded article can be prevented, and the molded article has an appearance of a deep and glossy metallic color.

In the fifth production method, the thermoplastic resin may contain 1 to 50% by weight, preferably 5 to 40% by weight, of an inorganic fiber. In this case, the total amount of the metal powder or the metal flakes and the inorganic fiber is preferably 80% by weight or less. The inorganic fiber includes a glass fiber, glass beads, a carbon fiber, wollastonite, an aluminum borate whisker fiber, a potassium titanate whisker fiber, a basic magnesium sulfate whisker fiber, a calcium silicate whisker fiber and a calcium sulfate whisker fiber. When the content of the inorganic fiber is too small, the molded article sometimes shows insufficient strength. When the content of the inorganic fiber exceeds 50% by weight, the inorganic fiber may be deposited on the surface of the molded article. The thermoplastic resin may further contain a filler such as mica, kaolin and calcium carbonate, a stabilizer, an ultraviolet light absorbent, a dye and a pigment.

For achieving the above seventh object of the present invention, the method of producing a molded article, directed to the second aspect of the present invention, uses a mold assembly comprising (A) a mold which comprises a first mold member and a second mold member and has a structure in which a cavity for molding a thermoplastic resin to form a molded article is formed inside the mold at the time of closing the mold and the cavity is variable in volume at the time of forming the molded article, (B) an insert block formed of ceramic or glass having a thermal conductivity of $2 \times 10^{-2}$ cal/cm.sec.°C. or less, said insert block being disposed in the first mold member, the second mold member or the first and second members, constituting part of the cavity and having a thickness of 0.5 mm to 10 mm, preferably 1 mm to 7 mm, more preferably 2 mm to 5 mm, and (C) a cover plate for covering a peripheral portion of the insert block, said cover plate being attached to the mold member in which the insert block is disposed, and constituting part of the cavity, wherein a clearance (C) between the insert block and the cover plate is 0.001 mm to 0.03 mm (0.001 mm≦C≦0.03 mm), preferably 0.003 mm to 0.03 mm (0.003 mm≦C≦0.03 mm), and an amount (ΔS) of overlapping of the cover plate and the insert block is at least 0.1 mm (ΔS≧0.1 mm), said method comprising the steps of (a) closing the first mold member and the second mold member so as to make a cavity volume ($V_c$) greater than a volume ($V_M$) of the molded article to be produced, (b) injecting a molten thermoplastic resin to the cavity (volume; $V_c$), (c) decreasing the cavity volume to the volume ($V_M$) of the molded article to be produced, concurrently with the initiation of injection of the thermoplastic resin, during the injection, or after completion of the injection (or simultaneously with the completion of the injection), and (d) cooling the thermoplastic resin in the cavity and then releasing a molded article from the mold.

In the production method directed to the second aspect of the present invention, the insert block may be disposed in the first mold member alone, may be disposed in the second mold member alone, or may be disposed in each of the first and second mold members, depending upon the form and the surface properties required for the molded article to be produced.

In the above step (a), the volume ($V_M$) of the molded article to be produced and the cavity volume ($V_c$) preferably satisfy the relationship of 0.1 mm≦Δt≦6 mm, wherein $\Delta t = t_1 - t_0$ in which $t_0$ is the thickness of a molded article to be produced and $t_1$ is a distance of the cavity in the thickness direction of the molded article in the step (a). When Δt<0.1 mm, it is difficult to produce a molded article from a molten thermoplastic resin having poor flowability, and the residual stress in a molded article cannot be decreased. When Δt>6 mm, air may be included in the molded article to deteriorate the quality of the molded article.

The point of time when the decreasing of the cavity volume is initiated may be set at a time before the initiation of the injection of the thermoplastic resin, at a time when the injection is initiated, at a time during the injection, or after (or at the time of) the completion of the injection. Further, the point of time when the cavity volume comes to equal the volume ($V_M$) of the molded article to be produced may be set at a time during the injection of the thermoplastic resin or after (or simultaneously with) the completion of the injection.

In the method of producing a molded article directed to the second aspect of the present invention, for achieving the above eighth object of the present invention, preferably, the mold assembly further has a knock-out pin slidably arranged in the first mold member, a clearance ($CP_1$) between the knock-out pin and the first mold member is 0.01 mm to 0.03 mm (0.01 mm≦$CP_1$≦0.03 mm), a space between the knock-out pin and the first mold member and a space between the insert block and the cover plate are communicated with a fluid source, and a fluid flows through the space between the knock-out pin and the first mold member and through the space between the insert block and the cover plate when the mold is opened to release the molded article from the first mold member with the knock-out pin after the molded article is produced.

The thermoplastic resin suitable for use in the method of producing a molded article directed to the second aspect of the present invention includes polyolefin resins such as a polyethylene resin and a polypropylene resin, styrene resins such as a polystyrene resin, an AS resin, an ABS resin and an AES resin, a methacrylic resin, a polycarbonate resin, a polyoxymethylene resin, polyamide resins such as polyamide 6, polyamide 66 and polyamide MXD6, a modified PPE resin, polyester resins such as a PET resin and a PBT resin, a polyphenylene sulfide resin, a polysulfone resin, a polyether sulfone resin, a polyarylate resin, a polyetherimide resin, a polyamideimide resin, a polyimide resin, a polyoxymethylene resin, a polyether ketone resin, a polyether ether ketone resin, a liquid crystal polymer, a polyester carbonate resin, an elastomer and a polymer alloy composed of at least two of the above thermoplastic resins.

Further, the thermoplastic resin may contain 1 to 50% by weight of an inorganic fiber, an organic fiber, a filler, a material prepared by coating any one of the previous materials with a metal, a stabilizer, an ultraviolet light absorbent, a dye and a pigment. When the content of the above material exceeds 50% by weight, the material (for example, an inorganic fiber) may be deposited on the surface of the molded article. The inorganic fiber includes a glass fiber, a carbon fiber, wollastonite, an aluminum borate whisker fiber, a potassium titanate whisker fiber, a basic magnesium sulfate whisker fiber, a calcium silicate whisker fiber and a calcium sulfate whisker fiber.

For achieving the ninth object of the present invention, the method of producing a molded article, directed to the third aspect of the present invention, uses a mold assembly comprising (A) a mold having a cavity, for producing a molded article from a thermoplastic resin, (B) a pressurized fluid introduction device, (C) an insert block formed of ceramic or glass having a thermal conductivity of $2 \times 10^{-2}$ cal/cm.sec.°C. or less, said insert block being disposed inside the mold, constituting part of the cavity and having a thickness of 0.5 mm to 10 mm, preferably 1 mm to 7 mm, more preferably 2 mm to 5 mm, and (D) a cover plate for covering a peripheral portion of the insert block, said cover plate being attached to the mold and constituting part of the cavity, wherein a clearance (C) between the insert block and the cover plate is 0.001 mm to 0.03 mm (0.001 mm≦C≦0.03 mm), preferably 0.003 mm to 0.03 mm (0.003 mm≦C≦0.03 mm), and an amount (ΔS) of overlapping of the insert block and the cover plate is at least 0.1 mm (ΔS≧0.1 mm), said method comprising introducing a pressurized fluid from the pressurized fluid introduction device into a molten thermoplastic resin injected into the cavity, thereby to form a hollow portion inside the thermoplastic resin in the cavity.

In the method of producing a molded article directed to the third aspect of the present invention, generally, the mold comprises a fixed mold member and a movable mold member. Depending upon the form of a molded article to be produced and the surface properties required for the molded article, the insert block may be disposed in the movable mold member alone, the fixed mold member alone, or each of the movable mold member and the fixed mold member.

Depending upon the form of a molded article to be produced, etc., the pressurized fluid introduction device may be properly arranged in the interior of a molten resin injection nozzle of an injection molding machine or a molten resin introduction portion formed in the mold (e.g., gate portion) or in a pressurized fluid introduction device attaching portion which is formed in the mold and is to be opened to the cavity.

The point of time when the initiation of introducing a pressurized fluid into the molten thermoplastic resin in the cavity may be set at a time during the injection of the molten thermoplastic resin, at a time when the injection is completed, or after the completion of the injection. Preferably, the introduction of the pressurized fluid into the resin in the cavity is maintained even after the resin is cooled to solidness. The amount of the molten thermoplastic resin injected into the cavity may be an amount required to completely fill the cavity with it, or it may be an amount insufficient for the complete filling in the cavity in cases of some molded articles.

Table 2 shows combinations of elements to constitute the cavity wall, disposed on the side of the movable mold member (force side part) corresponding to a male mold (core portion) and elements to constitute the cavity wall, disposed on the side of the fixed mold member (cavity side part) corresponding to a female mold (cavity portion). Further, [ ] shows a mold side where the pressurized fluid introduction device can be attached. When the elements constituting the cavity wall are (the movable mold member or the fixed mold member)+(the insert block)+(the cover plate), the peripheral portion of the insert block is covered by the cover plate, and the edge portion of the cover plate leaves a pressing mark on the surface of a molded article.

Table 2

(1) Force side part: Movable mold member+insert block cover plate
Cavity side part:
(1-1) Fixed mold member
[Pressurized fluid introduction device: on cavity side part]
(1-2) Fixed mold member+insert block+cover plate
[Pressurized fluid introduction device: on force side part or cavity side part]
(1-3) Insert block+cover plate
[Pressurized fluid introduction device: on force side part or cavity side part]
(2) Force side part: Insert block+cover plate
Cavity side part:
(2-1) Fixed mold member
[Pressurized fluid introduction device: on cavity side part]
(2-2) Fixed mold member+insert block+cover plate
[Pressurized fluid introduction device: on force side part or cavity side part]
(2-3) Insert block+cover plate
[Pressurized fluid introduction device: on force side part or cavity side part]
(3) Force side part: Movable mold member
Cavity side part:
(3-1) Fixed mold member+insert block+cover plate
[Pressurized fluid introduction device: on force side part]
(3-2) Insert block+cover plate
[Pressurized fluid introduction device: on force side part]

The thermoplastic resin suitable for use in the method of producing a molded article, directed to the third aspect of the present invention, can be selected from those described concerning the method of producing a molded article directed to the second aspect of the present invention. The thermoplastic resin may contain 1 to 50% by weight of an inorganic fiber, an organic fiber, a filler, a material prepared by coating any one of the previous materials with a metal, a stabilizer, an ultraviolet light absorbent, a dye and a pigment. When the content of the above material exceeds 50% by weight, the material (for example, an inorganic fiber) may be deposited on the surface of the molded article. The inorganic fiber includes a glass fiber, a carbon fiber, wollastonite, an aluminum borate whisker fiber, a potassium titanate whisker fiber, a basic magnesium sulfate whisker fiber, a calcium silicate whisker fiber and a calcium sulfate whisker fiber.

The pressurized fluid can be selected not only from substances which are gaseous at room temperature such as nitrogen gas, carbon dioxide gas, air and helium gas but also from gases liquefied under high pressure. The pressurized fluid is preferably one which is inert so that no burning caused by heat-insulated compression takes place in the hollow portion of a molded article. When the pressurized fluid is nitrogen gas, the nitrogen gas preferably has a purity of at least 90%.

For achieving the above tenth object, the mold assembly for the production of a molded article having a hole, directed to the third aspect of the present invention, comprises (A) a mold comprising a first mold member and a second mold member and being capable of forming a cavity for molding a thermoplastic resin therein to form a molded article at a time of clamping the mold, (B) a core pin for forming a hole in the molded article, said core pin being attached to the first mold member, the second mold member or the first and second members, said core pin having a portion which is present in the cavity and forms part of the cavity, (C) an insert block formed of ceramic or glass having a thermal conductivity of $2 \times 10^{-2}$ cal/cm.sec.°C. or less, said insert block being disposed in the first mold member, the second mold member or the first and second members, constituting part of the cavity and having a thickness of 0.5 mm to 10 mm, preferably 1 mm to 7 mm, more preferably 2 mm to 5 mm, and (D) a cover plate for covering a peripheral portion of the insert block, said cover plate being attached to the mold member in which the insert block is disposed, and constituting part of the cavity, wherein a clearance (C) between the insert block and the cover plate is 0.001 mm to 0.03 mm (0.001 mm$\leq$C$\leq$0.03 mm), preferably 0.003 mm to 0.03 mm (0.003 mm$\leq$C$\leq$0.03 mm), and an amount ($\Delta$S) of overlapping of the insert block and the cover plate is at least 0.1 mm ($\Delta$S$\geq$0.1 mm).

The above-constituted mold assembly used for producing a molded article having a hole, directed to the third aspect of the present invention, can serve to produce a molded article having a blind hole (not through hole but a non-through hole) or a through hole.

In one form of the mold assembly used for producing a molded article having a hole, directed to the third aspect of the present invention, that portion of the core pin which is present in the cavity has an opposite surface which faces that surface of the insert block which constitutes the cavity, and a clearance ($C_0$) between the opposite surface of the core pin and the surface of the insert block (the cavity wall of the insert block) is preferably 0.003 mm to 0.03 mm (0.003 mm$\leq C_0 \leq$0.03 mm). The mold assembly having the above form will be sometimes referred to as mold assembly directed to the fourth aspect. When the clearance ($C_0$) is less than 0.003 mm, the cavity wall of the insert block and the opposite surface of the core pin may contact to each other due to the heat expansion of the insert block caused when the mold is temperature-increased. As a result, the insert block may be damaged. When the clearance ($C_0$) is greater than 0.03 mm, a molten thermoplastic resin may penetrate a gap between the opposite surface of the core pin and the cavity wall of the insert block to crack the insert block or cause a mold flash on a molded article. The clearance ($C_0$) is arranged to be 0.003 mm to 0.03 mm, which can reliably prevent the penetration of the molten thermoplastic resin into the gap between the opposite surface of the core pin and the cavity wall of the insert block, and can serve to reliably produce a molded article having a through hole.

The core pin may be formed of a metal, glass or ceramic. When the core pin is formed of a metal, the thermoplastic resin which is divided into two flows with the core pin, may be cooled in the cavity and then converges to form a weld-mark in some case, and the molded article has decreased strength. In order to avoid this case, the core pin can be formed of ceramic or glass. As a result, the cooling of the resin can be prevented when the flows of the resin in the cavity converge, which can effectively prevent the occurrence of the weld-mark inside the molded article and can prevent the decrease in the strength of the molded article. In this case, the diameter of the core pin (diameter when the core pin is cylindrical or diameter of circumcircle when the core pin is polygonal in cross section) is preferably 10 mm or less. When the diameter of the core pin exceeds 10 mm, the heat insulation effect of the core pin works excessively, and the mold article released from the mold may be deformed without an increased cooling time of the resin in the cavity. As a result, there may be a problem of prolonging the molding cycle. When the insert block having high a heat insulation property is disposed in each of the first and second mold members, the thermoplastic resin which is divided into two flows with the core pin and converges is not easily cooled, and therefore, the core pin can be formed of a metal without any problem. The cross-sectional form of the core pin can be designed to meet the cross-sectional form of a desired hole. Further, the core pin may be tapered toward one end, or may be formed to have height differences (steps) on sides.

The material for the core pin is selected from ceramic or glass having a thermal conductivity of $2\times10^{-2}$ cal/cm.sec.°C. or less. The ceramic includes zirconia, alumina and $K_2O$-$TiO_2$, more specifically, $ZrO_2$, $ZrO_2$-CaO, $ZrO_2$-$Y_2O_3$, $ZrO_2$-MgO, $K_2O$-$TiO_2$, $Al_2O_3$, $Al_2O_3$-TiC, $Ti_3N_2$ and 3 $Al_2O_3$-2 $SiO_2$. The glass includes soda-lime glass, quartz glass, heat resisting glass and glass-ceramics. In particular, the core pin is preferably produced from ceramic having a thermal conductivity of $2\times10^{-2}$ cal/cm.sec.°C. or less such as $ZrO_2$-$Y_2O_3$ or 3 $Al_2O_3$-2 $SiO_2$, or glass-ceramics having a thermal conductivity of $2\times10^{-2}$ cal/cm.sec.°C. or less. Generally, the material for constituting the core pin has a thermal conductivity of $2\times10^{-2}$ cal/cm.sec.°C. or less for preventing rapid cooling of a molten thermoplastic resin in the cavity. When the core pin is formed from a material having a thermal conductivity greater than the above value, the core pin may rapidly cool the molten thermoplastic resin in the cavity.

The mold assembly used for producing a molded article directed to the third or fourth aspect of the present invention includes an embodiment in which the core pin is formed of ceramic or glass and attached to the first mold member (to be referred to as "first type mold assembly"). The mold assembly used for producing a molded article directed to the fourth aspect of the present invention includes an embodiment in which the core pin is formed of ceramic or glass, the insert block has a through hole and the core pin is attached to the second mold member through the through hole of the insert block (to be referred to as "second type mold assembly").

When the core pin has a diameter of greater than 10 mm, the core pin of the mold assembly for producing a molded article having a hole, directed to the third or fourth aspect of the present invention, preferably has the following form. That is, instead of being formed of ceramic or glass, the core pin comprises (a) a core pin attaching member provided to the first mold member, and (b) an annular member which is formed of ceramic or glass, has one closed end and one open end and is attached to the core pin attaching member, and the annular member constitutes a surface of that part of the core pin which is present in the cavity, and the core pin attaching member is extending from the open end of the annular member into the annular member (to be referred to as "third type mold assembly").

In the mold assembly used for producing a molded article directed to the fourth aspect of the present invention, the core pin comprises (a) a core pin attaching member provided to the second mold member and (b) an annular member which is formed of ceramic or glass, has one closed end and one open end and is attached to the core pin attaching member, and the annular member constitutes a surface of that part of the core pin which is present in the cavity, a surface constituting the open end of the annular member corresponds to the opposite surface, the insert block has a through hole, and the core pin attaching member is extending through the through hole of the insert block and extending from the open end of the annular member into the annular member (to be referred to as "fourth type mold assembly").

In the mold assembly used for producing a molded article directed to the fourth aspect of the present invention, further, the core pin comprises (a) a core pin attaching member provided to the first mold member and (b) an annular member which is formed of ceramic or glass, has both open ends and is attached to the core pin attaching member, and the annular member constitutes a surface of that part of the core pin which is present in the cavity, a surface constituting the one open end of the annular member corresponds to the opposite surface, and the core pin attaching member is extending from the other open end of the annular member into the annular member (to be referred to as "fifth type mold assembly").

In the mold assembly used for producing a molded article directed to the fourth aspect of the present invention, further, the core pin comprises (a) a core pin attaching member provided to the second mold member, and (b) an annular member which is formed of ceramic or glass, has both open ends and is attached to the core pin attaching member, and the annular member constitutes a surface of that part of the core pin which is present in the cavity, a surface constituting the one open end of the annular member corresponds to the opposite surface, the insert block has a through hole, and the core pin attaching member is extending through the through hole of the insert block and extending from the one open end of the annular member into the annular member (to be referred to as "sixth type mold assembly").

In the third to sixth type mold assemblies, the annular member may be formed of ceramic or glass having a thermal conductivity of $2 \times 10^{-2}$ cal/cm.sec.°C. or less. The ceramic includes zirconia, alumina and $K_2O$-$TiO_2$ such as $ZrO_2$, $ZrO_2$-$CaO$, $ZrO_2$-$Y_2O_3$, $ZrO_2$-$MgO$, $K_2O$-$TiO_2$, $Al_2O_3$, $Al_2O_3$-$TiC$, $Ti_3N_2$ and 3 $Al_2O_3$-2 $SiO_2$. The glass includes soda-lime glass, quartz glass, heat resisting glass and glass-ceramics. In particular, the annular member is preferably produced from ceramic having a thermal conductivity of $2 \times 10^{-2}$ cal/cm.sec.°C. or less such as $ZrO_2$-$Y_2O_3$ or 3 $Al_2O_3$-2 $SiO_2$, or glass-ceramics having a thermal conductivity of $2 \times 10^{-2}$ cal/cm.sec.°C. or less. Generally, the material for constituting the annular member preferably has a thermal conductivity of $2 \times 10^{-2}$ cal/cm.sec.°C. or less for preventing rapid cooling of a molten thermoplastic resin in the cavity. When the annular member is formed from a material having a thermal conductivity greater than the above value, the annular member may rapidly cool the molten thermoplastic resin in the cavity. The core pin attaching member can be formed of a metal, and the annular member can be attached to the core pin attaching member, for example, with an adhesive.

When the core pin has a diameter of greater than 10 mm in the mold assembly used for producing a molded article having a hole, directed to the third and fourth aspects of the present invention, a flame sprayed layer formed may be formed on a surface of that portion of the core pin which is present in the cavity by flame-spraying ceramic or glass (seventh type mold assembly), instead of the core pin being formed of ceramic or glass. In this case, the material for forming the flame sprayed layer is selected from ceramic or glass having a thermal conductivity of $2 \times 10^{-2}$ cal/cm.sec.°C. or less. The ceramic includes zirconia, alumina and $K_2O$-$TiO_2$, more specifically, $ZrO_2$, $ZrO_2$-$CaO$, $ZrO_2$-$Y_2O_3$, $ZrO_2$-$MgO$, $K_2O$-$TiO_2$, $Al_2O_3$, $Al_2O_3$-$TiC$, $Ti_3N_2$ and 3 $Al_2O_3$-2 $SiO_2$. The glass includes soda-lime glass, quartz glass, heat resisting glass and glass-ceramics. In particular, the flame sprayed layer is preferably formed by spraying ceramic having a thermal conductivity of $2 \times 10^{-2}$ cal/cm.sec.°C. or less such as $ZrO_2$-$Y_2O_3$ or 3 $Al_2O_3$-2 $SiO_2$.

In other words, in the above mold assembly of any one of the first to seventh types, at least a surface of the that portion of the core pin which is present in the cavity is formed of ceramic or glass. That is, the whole surface of the core pin may be formed of ceramic or glass, the surface of that portion of the core pin which is present in the cavity may be formed of ceramic or glass, that portion of the core pin which forms all the surface of the core pin and has a certain depth (thickness) from the surface may be formed of ceramic or glass, or the core pin as a whole may be formed of ceramic or glass. In these cases, that portion of the core pin which is present in the cavity has an opposite surface facing the cavity wall of the insert block, and a clearance ($C_0$) between the opposite surface and the cavity wall of the insert block is preferably 0.003 mm to 0.03 mm.

For achieving the above tenth object of the present invention, the method of producing a molded article having a hole directed to the fourth aspect of the present invention uses the mold assembly directed to the third or fourth aspect of the present invention or the mold assembly of any one of the above first to seventh types, and comprises filling a molten thermoplastic resin into the cavity formed by the mold, the core pin, the insert block and the cover plate, to produce a molded article having a hole.

In the insert block of the present invention, the mold assembly directed to the first to fourth aspects of the present invention and the method of producing a molded article directed to the first to fourth aspects of the present invention, the insert block is required to have a thermal conductivity of $2 \times 10^{-2}$ cal/cm.sec.°C. or less for preventing rapid cooling of a molten thermoplastic resin in the cavity. When the insert block is formed from a material having thermal conductivity greater than the above value, a molten thermoplastic resin in the cavity is rapidly cooled by the insert block. As a result, a molded article formed of the thermoplastic resin only has an appearance equivalent to that of a molded article produced by the use of a general mold formed from carbon steel, and the development of a solidification layer or a skin layer cannot be prevented.

The insert block can be produced from ceramic or glass having a thermal conductivity of $2 \times 10^{-2}$ cal/cm.sec.°C. or less. The ceramic includes zirconia, alumina and $K_2O$-$TiO_2$ such as $ZrO_2$, $ZrO_2$-$CaO$, $ZrO_2$-$Y_2O_3$, $ZrO_2$-$MgO$, $K_2O$-$TiO_2$, $Al_2O_3$, $Al_2O_3$-$TiC$, $Ti_3N_2$ and 3 $Al_2O_3$-2 $SiO_2$. The glass includes soda-lime glass, quartz glass, heat resisting glass and glass-ceramics. In particular, the insert block is preferably produced from ceramic having a thermal conductivity of $2 \times 10^{-2}$ cal/cm.sec.°C. or less such as $ZrO_2$, $ZrO_2$-$Y_2O_3$ or 3 $Al_2O_3$-2 $SiO_2$.

Otherwise, the insert block is preferably produced from glass-ceramics having a crystallinity of at least 10%, preferably at least 60%, more preferably 70 to 100%. When the crystallinity is at least 10%, a crystal is uniformly dispersed in the whole of glass, and the glass is therefore remarkably improved in the heat shock strength and in interfacial debonding or delamination, so that the damage of the insert block at a molding time can be greatly decreased. When the crystallinity is less than 10%, an interfacial debonding or delamination is liable to occur on the surface at a molding time. Preferably, the cavity wall (the surface which constitutes part of the cavity) of the insert block has a surface roughness $R_{max}$ of 0.03 μm or less, the glass-ceramics forming the insert block has a coefficient of linear expansion of $1 \times 10^{-6}$/K. or less, and the heat shock strength is at least 400° C.

The heat shock strength refers to a temperature at which a 100 mm×100 mm×3 mm sheet of glass breaks when it is heated to the temperature and then placed in water at 25° C. The heat shock strength of 400° C. means that a 100 mm×100 mm×3 mm sheet of glass is not broken when it is heated to 400° C. and placed in water at 25° C. When heat resisting glass is measured for the above heat shock strength, it shows only about 180° C. Therefore, when a molten resin having a temperature (e.g., about 300° C.) higher than the above is brought into contact with the insert block, the insert block may be distorted and the insert block may break. The heat shock strength has something to do with the crystallinity of glass, and when the insert block is formed of glass-ceramics having a crystallinity of at least 10%, the breaking of the insert block at a molding time can be reliably prevented.

The glass-ceramics includes glass in which β-eucryptite type crystal and β-spodumene type crystal are formed as main crystal, obtained by adding a small amount of a nucleating agent such as $TiO_2$ and $ZrO_2$ to a raw material glass, melting the glass at a temperature of at least 1600° C., shaping it by a pressing, blowing, rolling or casting method, further heat-treating it for crystallization, and thereby growing a crystal of $Li_2O$-$Al_2O_3$-$SiO_2$ system in glass. Further, the glass-ceramics include glass obtained by melting CaO-$Al_2O_3$-$SiO_2$ glass at 1400° to 1500° C., placing it in water to pulverizing it into small particles, integrating the particles, shaping the particles into the form of a plate on a refractory setter and heat-treating the shaped product to form a β-wollastonite crystal. Further, the glass-ceramics includes glass which a mica crystal is formed by heat-treating $SiO_2$-$B_2O_3$-$Al_2O_3$-MgO-$K_2O$-F glass and glass in which a cordierite crystal is formed by heat-treating MgO-$Al_2O_3$-$SiO_2$ glass. In the present invention, the insert block is preferably produced from glass-ceramics having a β-eucryptite crystal or β-spodumene crystal having excellent strength and heat resistance.

In the above glass-ceramics, the amount of crystal particles in the glass matrix can be represented on the basis of an index of crystallinity. The crystallinity can be determined by measuring the glass-ceramics for amounts of a crystal phase and an amorphous phase with an analyzer such as an X-ray diffraction apparatus.

when the insert block is formed of ceramic, at least one thin layer of the above material used for forming the insert block may be formed on cavity wall of the insert block by a surface treatment method such as an ion plating method. The material fills in pores of the ceramic to improve the molded article in surface properties.

When the insert block is formed of ceramic, a convex form of a projected surface of the ceramic may be replicated to the surface of a molded article in some cases since the ceramic is porous. The glass-ceramics has fine crystal particles, the inter-particle adhesion thereof is excellent, and it is not porous. Therefore, the glass-ceramics has an advantage in that a mirror surface is easily formed as the surface of a molded article.

When the insert block is formed of amorphous glass such as soda-lime glass, heat resisting glass or quartz glass, molding a thermoplastic resin having affinity and excellent adhesion to these materials (e.g., a polyamide resin such as a polyamide 6, polyamide 66 or polyamide MXD6 or a polyester resin such as a PBT or PET resin) may have the following problem. The insert block and the resin firmly adhere to each other and the insert block undergoes interfacial debonding or delamination when a molded article is released from the mold. This problem can be overcome by producing the insert block from the glass-ceramics. The glass-ceramics has high inter-crystal-particle strength sufficient for preventing the interfacial debonding or delamination, and the insert block of the glass-ceramics is free of the breaking problem even when used for a long period of time.

When a molded article is required to have a mirror surface property (definition), the surface roughness $R_{max}$ of the cavity wall (the surface which constitutes part of the cavity) of the insert block is preferably 0.03 μm or less. When the surface roughness $R_{max}$ is greater than 0.03 μm, the mirror surface property is insufficient, and the properties required for a molded article, e.g., surface smoothness (mirror surface property or definition), are sometimes not satisfied. For this purpose, the cavity wall of the insert block can be diamond-lapped to attain a surface roughness $R_{max}$ of 0.03 μm or less, and further, may be lapped with cerium oxide as required. The lapping can be carried out with a lapping machine. The glass-ceramics can form a mirror surface at a cost which is about half of the cost required for lapping general carbon steel, so that the cost of the production of the mold assembly can be decreased. The surface roughness $R_{max}$ can be measured according to JIS B0601. For producing a molded article having a delustering surface or a hairlines surface, a fine uneven surface or hairlines can be formed on the cavity wall of the insert block by sand blast treatment or etching.

The insert block is preferably formed of ceramic or glass having a coefficient of linear expansion of $12 \times 10^{-6}$/K. or less. The term coefficient of linear expansion is an average in the temperature range of from 50° C. to 300° C. As a result, the deformation and breaking of the insert block caused by a difference in the expansion and shrinkage between different materials used for the mold and the insert block can be effectively prevented. For example, when the insert block is set in the mold (or in optionally the core) of carbon steel to mold a thermoplastic resin, both the mold and the insert block heat-expand due to the heat of the thermoplastic resin and the heat of water or oil in a mold temperature adjusting apparatus. When the coefficient of linear expansion exceeds the above value, the insert block may break in some cases due to a difference in the coefficient of liner expansion if a clearance (D) between the insert block attaching portion provided in the mold and the insert block is not adequate. When the insert block is formed of glass-ceramics, the coefficient of linear expansion can be $1 \times 10^{-6}$/K. or less. It is preferred to carry out the lapping at a final stage of insert block manufacturing processing.

When the insert block has a thickness of less than 0.5 mm. the insert block has almost no heat insulation effect, which leads to rapid cooling of a molten thermoplastic resin in the cavity. As a result, the development of a solidification layer and a skin layer can be no longer prevented. Further, there is a high possibility of poor appearances such as a weldmark and a flow mark taking place, and when a thermoplastic resin containing an inorganic fiber is used as a raw material for a molded article, the inorganic fiber is easily deposited on the surface of the molded article. When a crystalline thermoplastic resin is used, the crystallinity of the resin is decreased. When a thermoplastic resin containing a metal powder or metal flakes is used, a molded article is likely to have metal powder or metal flakes exposed on the surface. Further, the decalcomania or replication of the cavity wall of the insert block to the surface of the molded article is degraded, or a molded article is poor in the mirror surface property. The insert block can be fixed to the mold, for example, with a thermosetting adhesive. When the insert block has a thickness of less than 0.5 mm. the insert block retains a nonuniform stress if the coating thickness of the adhesive is nonuniform. As a result, the surface of a molded article may have undulations, or the insert block may break under the pressure of a filled molten thermoplastic resin. When the insert block has a thickness of greater than 10 mm, the heat insulation effect of the insert block is large to excess, and it is therefore required to prolong the cooling time of the resin in the cavity. Otherwise, the molded article may be deformed after it is released from the mold. There is therefore a problem in that the molding cycle is prolonged. When the above-specified insert block is used, a molded article can be produced at a constant mold temperature, no special equipment is required, and the molding can be carried out at a general molding cycle. The thickness of the insert block formed of glass or ceramic is more preferably 1 to 7 mm. particularly preferably 2 to 5 mm.

In the mold assembly directed to the first to fourth aspect of the present invention and in the method of producing a molded article directed to the first to fourth aspect of the present invention, the clearance (C) between the insert block and the cover plate is 0.001 mm to 0.03 mm (0.001 mm≦C≦0.03 mm), preferably 0.003 mm to 0.03 mm (0.003 mm≦C≦0.03 mm). The clearance (C) is a gap between the insert block and the cover plate and it is measured along the thickness direction of the insert block. More specifically, the minimum value of the clearance (C) can be set such that the peripheral portion of the insert block undergoes no fine cracking at the time of attaching the cover plate, that the insert block and the cover plate are not brought into contact with each other (and that the insert block does not break) when the insert block heat-expands at the time of increasing the temperature of the mold, and that the insert block is not damaged by an impact at the time of clamping the mold. When the clearance (C) is greater than 0.03 mm, a molten thermoplastic resin penetrates the gap between the insert block and the cover plate to cause a cracking on the insert block and cause mold flashes on a molded article.

When the amount (ΔS) of the overlapping is less than 0.1 mm, a craze which occurs on the peripheral portion of the insert block at the time of preparing the insert block grows to a crack as the result of the contact to a molten thermoplastic resin, and the insert block may sometimes break. Although not specially limited, the upper limit of the amount (ΔS) of the overlapping is preferably about 2 mm. The term "overlapping" refers to a distance from the edge surface (side face) of the cover plate to the edge surface (side face) of the insert block. This distance is measured along the direction in parallel with the cavity wall of the insert core.

The clearance (D) between the insert block attaching portion of the mold and the insert block can be close to 0, while the clearance (D) is practically preferably 0.005 mm or more. The clearance (D) refers to a gap between the side wall of the insert block attaching portion of the mold and the edge surface (side face) of the insert block, measured in the direction in parallel with the cavity wall of the insert block. Although depending upon the coefficient of linear expansion of the material for constituting the insert block, it is sometimes difficult to prevent the breaking of the insert block caused by a difference in coefficients of linear expansion between the material for constituting the insert block attaching portion and the material for constituting the insert block when the clearance (D) is small to excess. The clearance (D) can be set such that the above problem does not take place. When the clearance (D) is large to excess, the position of the insert block deviates and the positional stability of the insert block against the insert block attaching portion is insufficient. As a result, the insert block may break. The clearance (D) is therefore preferably not greater than about 2 mm.

In the insert block of the present invention, the mold assembly directed to the first to fourth aspects of the present invention and the method of producing a molded article directed to the first to fourth aspects of the present invention, the material for constituting the insert block can be processed by a generally grinding method to form an uneven surface or a curvature, and the insert block can be formed in any form except for specially complicated form. The insert block can be produced by placing a ceramic powder or molten glass in a shaping mold, press-molding it and then heat-treating the shaped product. Further, the insert block can be produced by placing plate-like glass on a tooling and allowing it to shape itself in a furnace. In the final step, the lapping treatment can be easily carried out.

When a molded article having a curved surface is produced, the insert block attaching portion of the mold is processed (prepared) such that the surface of the insert block attaching portion has a curvature to meet with the opposite surface of the insert block (the surface facing the mold, i.e., the surface which is not the cavity wall of the insert block), and the cover plate is also processed (prepared) to meet with the curvature of the cavity wall of the insert block. In this case as well, the so-prepared insert block is disposed in the insert block attaching portion of the mold, and the so-prepared cover plate is overlapped with the insert block, while the relationships of ΔS≧0.1 mm and 0.001 mm≦C≦0.03 mm are maintained.

When there is no risk that the so-prepared insert block having a predetermined form drops from the insert block attaching portion of the mold to be damaged at the time of disposing the insert block, or when the insert block can be disposed in the insert block attaching portion without any adhesive, the insert block can be directly disposed in the insert block attaching portion without any adhesive. Otherwise, the insert block may be bonded to the insert block attaching portion with a thermosetting adhesive such as an epoxy-containing, urethane-containing or acrylic adhesive. For preventing the nonuniformity in the thickness of the adhesive from causing a strain or warpage on the insert block, it is preferred to apply the adhesive such that its thickness is as small as possible and as uniform as possible.

When the insert block produced by thermally bending glass is disposed to the mold, each side face of the insert block is inevitably not in parallel with the side walls of the insert block attaching portion. In this case, the insert block can be disposed to the insert block attaching portion with taking care not to cause damage on the peripheral portion of the insert block such that the insert block and the insert block attaching portion have a clearance (D) of 2 mm or less. It is conceivable that the insert block prepared by thermally bending glass is ground (prepared) to have side faces which can be in parallel with the side walls of the insert block attaching portion. Since, however, the insert block comes to have edge portions having highly acute angles, and it may be damaged at the time of disposing it in the insert block attaching portion. It is therefore preferred to prepare the insert block attaching portion such that its side walls are in parallel with the side faces of the insert block.

Generally, for preventing the warpage of a molded article caused by the shrinkage of a resin after the molding, it is preferred to eliminate a difference in temperature between the fixed mold member and the movable mold member (or between the first and second mold members) at the time of releasing a molded article from the mold by taking into consideration the thermal conductivity of each of the fixed mold member and the movable mold member (or the first and second mold members) and the thermal conductivity and thickness of the insert block.

When an engineering plastic or a super engineering plastic having excellent heat resistance and strength but having poor moldability is used, the mold temperature is generally set at 80° C. or higher for its molding, while poor appearances such as a flow mark take place in many cases. In contrast, in the present invention, molded articles having excellent appearances can be obtained even if the mold temperature is set at 80° C. or lower since the mold assembly of the present invention produces an excellent heat insulation effect. Further, when the mold assembly of the present invention is used, a thermoplastic resin containing a metal powder or metal flakes or containing an inorganic fiber is free from a phenomenon of deposition of them on the surface of the molded article, and the molded article has excellent appearances such as mirror surface property. This is because the insert block can delay the cooling and solidification of an injected molten thermoplastic resin to improve the flowability and the decalcomania or replication of the molten thermoplastic resin.

Further, for example, a molded article obtained by molding a polyoxymethylene resin as a crystalline thermoplastic resin with a mold of carbon steel at a mold temperature of 100° C. has an about 50 μm thick amorphous skin layer formed on its surface. In contrast, in the method of producing a molded article directed to the first aspect of the present invention, no skin layer is formed on the molded article, and the molded article is remarkably improved in resistance to frictional wear and abrasion and resistance to climate.

Further, for example, a molded article obtained by molding a polymer alloy with a mold of a metal at a mold temperature of 80° C. is poor in gloss on the surface. In contrast, in the method of producing a molded article directed to the first aspect of the present invention, the molded article obtained even at a mold temperature of 80° C. has remarkably excellent gloss on the surface.

Further, since the flowability of a molten thermoplastic resin is improved, the pressure for injecting the molten thermoplastic resin can be set at a lower level, to decrease the residual stress in the molded article. As a result, the molded article is improved in quality. Further, decreasing the injection pressure leads to a decrease in the thickness of a mold and a decrease in the size of a molding machine, which finally leads to a decrease in the cost of molded articles.

The insert block of the present invention is produced from a raw material having a low coefficient of heat expansion, and further, it is produced independently of a mold and disposed inside the mold. Therefore, the insert block not only has a high heat insulation effect but also is easy to maintain. The insert block formed of glass-ceramics has a low coefficient of linear expansion and a high heat shock strength, and it is therefore almost free of breaking and cracking.

The mold assembly of the present invention has a high heat insulation effect based on the insert block and therefore can be prevent rapid cooling of a molten thermoplastic resin filled in the cavity, so that the occurrence of poor appearances such as a weld-mark and a flow mark can be effectively prevented. Further, since the insert block is maintained in the ranges of the predetermined clearance (C) and amount (ΔS) of the overlapping, the appearance of end portions of a molded article is not impaired, nor does mold flashes occur on end portions of the molded article. Further, since a molten thermoplastic resin is not brought into contact with fine crazes remaining on the peripheral portion of the insert block, the breaking of the insert block can be prevented.

In the mold assembly directed to the third or fourth aspect of the present invention, the core pin is formed of ceramic or glass, or at least the surface of that portion of the core pin which is present in the cavity is formed of ceramic or glass, whereby a molten resin which is divided into two flows by the core pin and then converges is not much cooled. As a result, the resultant molded article is almost free of a weldline. Further, since the cavity wall of the insert block and the opposite surface of the core pin which is present in the cavity have a defined clearance ($C_0$), the core pin and the insert block are no longer brought into contact with each other, and the core pin and the insert block can be used in the operation for a long period of time.

The method of producing a molded article, provided by the present invention, uses a mold assembly having the insert block having heat insulation properties and the cover plate. Therefore, the rapid cooling of a molten thermoplastic resin filled in or injected into the cavity can be moderated. As a result, a molded article having an excellent mirror surface property can be reliably and easily produced even at a low mold temperature, and the formation of a solidification layer or a skin layer can be prevented. Further, as a result of moderating the rapid cooling of a molten thermoplastic resin, the molten thermoplastic resin is improved in flowability, so that a molded article can be produced from a thermoplastic resin having a high content of an inorganic fiber, and that the deposition of inorganic fibers on the surface of the molded article can be prevented. Moreover, owing to the improved flowability of a molten thermoplastic resin, the pressure for the injection of the molten thermoplastic resin can be set at a lower level, and the stress remaining in a molded article can be decreased. As a result, the molded article is improved in quality. Furthermore, the thickness of a molded article formed of a thermoplastic resin containing an inorganic fiber can be decreased, which has been considered to be impossible. Further, when a thermoplastic resin containing a metal powder or metal flakes is used, a molded article having a deeply and glossily metallic color tone can be easily and reliably obtained at a generally employed mold temperature of 40° to 80° C. Further, since the residual strain in a molded article obtained in the present invention is small, the molded article is almost free from undergoing cracking caused by a coating composition solution or a hard coating composition solution. Further, the molded article obtained in the present invention is excellent in definition, and the molded article has an appearance excellent in definition even after a coating or a hard coating is formed thereon. When, for example, a molded article of a mirror is produced according to the method of producing a molded article directed to the first aspect of the present invention, the number of parts therefor can be decreased and the production cost of the mirror can be decreased since the method of the present invention has high mass-productivity over a conventional method of producing it from glass and since parts to be assembled to the mirror can be also integrally produced by molding. When, for example, a molded article of a reflector is produced according to the method of producing a molded article directed to the first aspect of the present invention, the number of parts therefor can be decreased and the production cost of the reflector can be decreased since the method of the present invention has excellent mass-productivity and since parts to be assembled to the reflector can be also integrally produced by molding. Further, the reflector is free from being deformed by heat from a light source, and the amount of expansion under heat is also very small.

When the method of producing a molded article directed to the second aspect of the present invention is employed, a molded article can be produced even from a molten thermoplastic resin having poor flowability. Further, the pressure for injecting a molten thermoplastic resin can be decreased, and the pressure exerted on the insert block can be consequently decreased, which leads to the effective prevention of the deformation and breaking of the insert block. In addition thereto, the residual stress in a molded article can be further decreased, and the molded article has a high quality. Further, since the surface of the molded article can be uniformly compressed, the occurrence of a sink mark on the surface of a molded article can be decreased.

In the method of producing a molded article directed to the third aspect of the present invention, a pressurized fluid is introduced into a molten thermoplastic resin injected into the cavity, and the resin in the cavity is consequently pressured toward the cavity wall. As a result, the occurrence of a sink mark on a molded article can be reliably prevented. Further, since the cooling of a molten resin in contact with the insert block to solidness is delayed, there can be avoided a phenomenon in which the resin which starts solidification in the vicinity of the cavity wall and the resin inside the molten thermoplastic resin are mixed the with each other. As a result, it is made possible to prevent the occurrence of color shading and a poor appearance on that surface of a molded article which is near a thick wall portion of the molded article.

BRIEF DESCRIPTION OF THE DRAWINGS

The present invention will be specifically explained with reference to drawings hereinafter.

FIG. 10 is a schematic view of a mold assembly as a whole in Example 26 before mold closing.

DESCRIPTION OF PREFERRED EMBODIMENTS

Figure 1A:
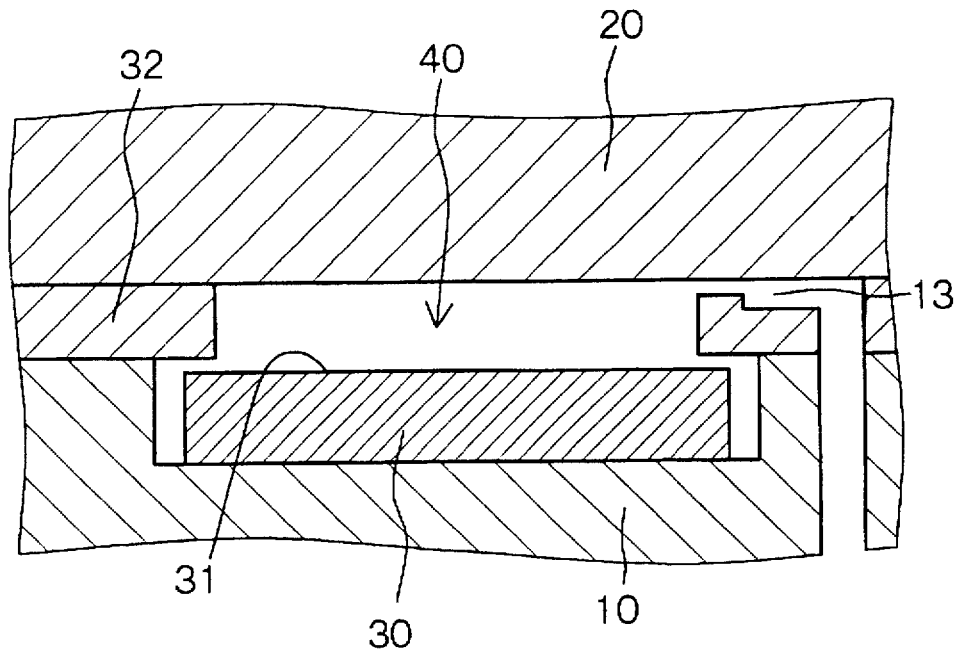
FIGS. 1A, 1B and 1C are a schematic partial cross section of a preferred embodiment of a mold assembly in Example 1 and schematic partial cross sections of the mold assembly being assembled.

Molded articles obtained in Examples and Comparative Examples were measured for definition with a definition measuring apparatus (ICP-2DP, supplied by Suga Testing Machines) under the following conditions.

Measurement range: 20 mm diameter

Incidence and light receiving angle: 60 degrees

Optical comb width: 0.5 mm

Measurement portion: Portions having a large curvature were selected and cut from a molded article, and measured. In the measurement, the measurement portions were arranged with a sample holder weighing 3 kg such that those portions became as flat as possible. Ten (10) points were measured to determine an average.

Molded articles were measured for a coefficient of linear expansion according to ASTM D696, and for deflection temperatures under load according to ASTM D648 under a load of 455 pa.

Examples 1 to 25 are concerned with the mold assembly directed to the first aspect of the present invention.

Further, Examples 1 to 7 are concerned with the second production method in the method of producing a molded article directed to the first aspect of the present invention, i.e., the method of producing a molded article from a thermoplastic resin containing an inorganic fiber.

Examples 8 to 12 are concerned with the No. 2A production method in the method of producing a molded article directed to the first aspect of the present invention. Specifically, Examples 8 to 10 are concerned with the method of producing a molded article constituting a mirror, and Examples 11 and 12 are concerned with the method of producing a molded article constituting a reflector.

Examples 13 and 14 are concerned with the No. 2B production method in the method of producing a molded article directed to the first aspect of the present invention. Specifically, Examples 13 and 14 are concerned with the method of producing a molded article constituting an exterior member of an automobile.

Examples 15 and 16 are concerned with the No. 2C production method in the method of producing a molded article directed to the first aspect of the present invention. Specifically, Examples 15 and 16 are concerned with the method of producing a molded article constituting a pillar of an automobile.

Examples 17 and 18 are concerned with the second production method in the method of producing a molded article directed to the first aspect of the present invention. Specifically, Examples 17 and 18 are concerned with the method of producing a molded article constituting a door handle of an automobile.

Examples 19 and 20 are concerned with the third production method in the method of producing a molded article directed to the first aspect of the present invention. Specifically, Examples 19 and 20 are concerned with the method of producing a molded article from a crystalline thermoplastic resin.

Example 21 is concerned with the fourth production method in the method of producing a molded article directed to the first aspect of the present invention. Specifically, Example 21 is concerned with the method of producing a molded article from a polymer alloy.

Examples 22 to 25 are concerned with the fifth production method in the method of producing a molded article directed to the first aspect of the present invention. Examples 22 to 24 use, as a thermoplastic resin, a crystalline thermoplastic resin containing aluminum flakes or chromium oxide powder. Example 25 uses, as a thermoplastic resin, an amorphous thermoplastic resin containing chromium oxide powder.

Examples 26 and 27 are concerned with the mold assembly directed to the second aspect of the present invention. Further, Examples 26 and 27 are concerned with the method of producing a molded article directed to the second aspect of the present invention (method of producing a molded article by an injection compression molding method).

Example 28 is concerned with the method of producing a molded article directed to the third aspect of the present invention (method of producing a molded article by a gas-assisted injection molding method).

Examples 29 to 46 are concerned with the mold assembly directed to the third or fourth aspect of the present invention.

Examples 44 to 46 are concerned with the method of producing a molded article directed to the fourth aspect of the present invention.

For making the description easily understandable, Examples Numbers and Comparative Example Numbers are corresponding to each other wherever it is possible.

EXAMPLE 1

Examples 1 to 25 are concerned with the mold assembly directed to the first aspect of the present invention. Further, Examples 1 to 7 are concerned with the second production method in the method of producing a molded article directed to the first aspect of the present invention.

Figure 1B:
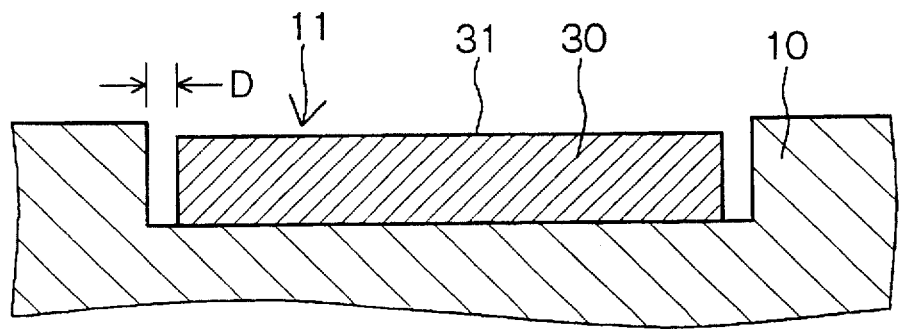
Figure 1C:
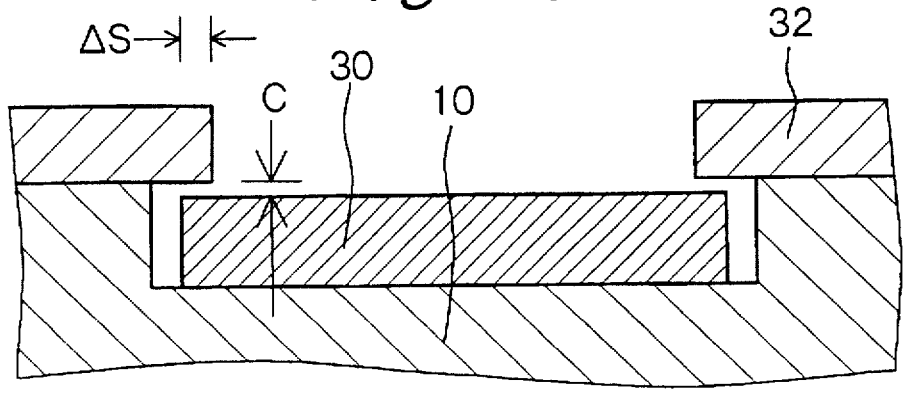

FIG. 1A shows a schematic partial cross section of a mold assembly in Example 1. A cross section is a view of cut surfaces alone. FIGS. 1B and 1C show schematic cross sections of the mold assembly which is being assembled.

In the mold assembly in Example 1, a cavity 40 had a size of 100.00 mm×100.00 mm×2.00 mm, and had the form of a rectangular parallelepiped. In Example 1, an insert block 30 was produced by grinding quartz glass, and had a plate shape. A cavity wall 31 of the insert block 30 was lapped and finished with diamond lapping and cerium oxide lapping. The insert block 30 had the following specification.

Material: Quartz glass
Thermal conductivity: $0.32 \times 10^{-2}$ cal/cm.sec.°C.
Coefficient of linear expansion: $0.58 \times 10^{-6}$/K.
Size: 101.00 mm×101.00 mm×3.00 mm Surface roughness $R_{max}$ of cavity wall 31 of insert block: 0.02 μm A fixed mold member 10 was formed from carbon steel S55C. The fixed mold member 10 was produced such that an insert block attaching portion 11 had an inner dimension of 101.20 mm×101.20 mm×3.02 mm (depth). The insert block 30 was temporarily bonded to the insert block attaching portion 11 with a two-package epoxy adhesive (not shown) (see FIG. 1B). After the above adhesion bonding, the clearance (D) between the insert block 30 and the insert block attaching portion 11 was measured with a spacer gage to show a lowest clearance of 0.05 mm.

A cover plate 32 was formed from carbon steel S55C. The cover plate 32 had an inner dimension of 100.00 mm×100.00 mm. The cover plate 32 was fixed to the fixed mold member 10 with bolts (not shown) (see FIG. 1C). The average clearance (C) between the insert block 30 and the cover plate 32 was 0.019 mm. The amount (ΔS) of overlapping of the cover plate 32 and the insert block 30 was 0.5 mm. FIG. 1C omits a gate portion.

A movable mold member 20 was formed from carbon steel S55C.

The completed mold assembly (see FIG. 1A) was attached to an injection molding machine. When the mold assembly was heated up to 130° C. and then rapidly cooled to 40° C. with a mold temperature controller, the insert block 30 formed of quartz glass did not have any damage such as cracking.

An injection molding machine (model PS-80, manufactured by Nissei Jushi Kogyo Kabushiki Kaisha) was use. The mold assembly was heated to 60° C., and under the following injection molding conditions, the following polycarbonate resin containing a glass fiber as an inorganic fiber was injected into a cavity 40 through a gate portion 13, and the cavity 40 was completely filled with the molten resin. Twenty seconds after the completion of the injection, a molded article was released from the mold.

Thermoplastic resin: GS2020MKR supplied by Mitsubishi Engineering-Plastics Corp., glass fiber content 20% by weight, the glass fiber having an average length of 200 μm and an average diameter of 13 μm.

Molding conditions
Mold temperature: 60° C.
Resin temperature: 310° C.
Injection pressure: 500 kgf/cm$_2$-G The surface of the molded article (surface which had been in contact with the cavity wall 31 of the insert block 30) had a mirror surface property as far as end portions of the molded article in spite of the low mold temperature. The molded article was surface-measured for definition to show that the definition was as high as 90% when the complete definition was 100%. When no insert block was used, it was required to set the mold temperature at 120° to 140° C.

Further, the above molding was repeated in 10000 cycles to show that the insert block had no damage such as cracking.

COMPARATIVE EXAMPLE 1A

Figure 54A:
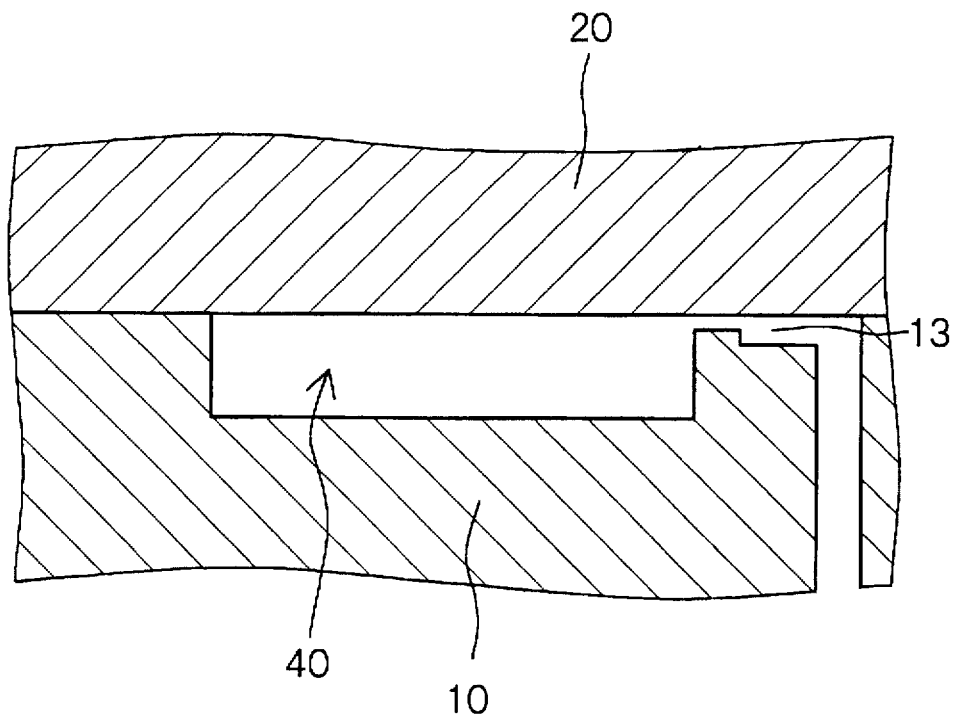
FIGS. 54A and 54B are schematic partial cross sections of a conventional mold assembly in which no insert block is disposed and a conventional mold assembly to which no cover plate is attached.

FIG. 54A shows a schematic partial cross section of a mold assembly used in Comparative Example 1A. The mold assembly had a fixed mold member 10 formed from carbon steel S55C, having a cavity wall which was mirror-surface-finished by polishing with #2000 paper, and a movable mold member 20 having the same structure as that in Example 1. With this mold assembly, an attempt was made to injection-mold the same thermoplastic resin containing an inorganic fiber as that used in Example 1 under the same conditions as those in Example 1. However, the molten resin failed to fill in the cavity 40 completely, since the molten resin had poor flowability. The injection pressure was increased by 200 kgf/cm$_2$-G, or the injection molding was carried out at an injection pressure of 700 kgf/cm$_2$-G. The resultant molded article had molding defects such as a flow mark and streaks. The molded article was surface-measured for definition to show that the definition was 5% when the complete definition was 100%. That is, the definition in Comparative Example 1A was greatly poor as compared with that in Example 1.

COMPARATIVE EXAMPLE 1B

Comparative Example 1B used the same insert block 30 as that used in Example 1 and (structurally) the same movable mold member 20 as that used in Example 1. A fixed mold member 10 was formed from carbon steel S55C. Unlike Example 1, the fixed mold member 10 was produced such that an insert block attaching portion 11 had an inner dimension of 101.20 mm×101.20 mm and 5.02 mm (depth). Then, the insert block 30 having a thickness of 3.00 mm was temporarily bonded to the insert block attaching portion 11 with a two-package epoxy-containing adhesive. Unlike Example 1, no cover plate was used, as shown in a schematic cross section of FIG. 54B.

The same thermoplastic resin containing an inorganic fiber as that used in Example 1 was injection-molded under the same conditions as those in Example 1. As a result, the resultant molded article was poor in appearance, and the peripheral portion of the insert block 30 formed of quartz glass underwent cracking in the 5th molding cycle.

COMPARATIVE EXAMPLE 1C

Example 1 was repeated except that the clearance (C) between the cover plate 32 and the insert block 30 was changed to 0.003 mm, 0.02 mm and 0.04 mm. When the clearance (C) was 0.04 mm, the molten resin penetrated a space between the insert block 30 and the cover plate 32, so that it was impossible to release a molded article from the mold. When the clearance (C) was set at 0.003 mm and 0.02 mm, the above problem did not occur at all.

COMPARATIVE EXAMPLE 1D

Example 1 was repeated except that the amount (ΔS) of overlapping of the cover plate and the insert block was changed to 0.05 mm. As a result, a cracking occurred on the peripheral portion of the insert block, and after 10th cycle, the insert block underwent cracking.

EXAMPLE 2

Example 2 used an insert block having the following specification. A cavity wall 31 of the insert block 30 was lapped and finished with diamond lapping and cerium oxide lapping. The mold assembly had the same structure, the same component sizes and the same dimensions as those in Example 1. The clearance (C), the clearance (D) and the amount (ΔS) of the overlapping were measured to show the same values as those in Example 1.

Material: Glass-ceramics of spodumene type crystal (trade name: Neoceram N-11, supplied by Nippon Denki Glass Kabushiki Kaisha)

Crystallinity: 90%

Density: 2.50 g/cm$^3$

Thermal conductivity: 0.4×10$^{-2}$ cal/cm.sec.°C.

Coefficient of linear expansion: 0.8×10$^{-6}$/K.

Heat shock strength: 600° C.

Surface roughness $R_{max}$ of cavity wall 31 of insert block: 0.02 μm

The completed mold assembly (see FIG. 1A) was attached to an injection molding machine. When the mold assembly was heated up to 130° C. and then rapidly cooled to 40° C. with a mold temperature controller, the insert block 30 formed of glass-ceramics did not have any damage such as cracking.

The mold assembly attached to the same injection molding machine as that used in Example 1 was heated to 60° C., and under the following injection molding conditions, the following polyamide MXD6 resin containing a glass fiber was injected into the cavity 40 through the gate portion 13, and the cavity 40 was completely filled with the molten resin. Twenty seconds after the completion of the injection, a molded article was released from the mold.

Thermoplastic resin: Reny 1002F supplied by Mitsubishi Engineering-Plastics Corp., glass fiber content 30% by weight, the glass fiber having an average length of 200 μm and an average diameter of 13 μm.

Molding conditions

Mold temperature: 60° C.

Resin temperature: 280° C.

Injection pressure: 400 kgf/cm$_2$-G

The surface of the molded article (surface which had been in contact with the cavity wall 31 of the insert block 30) had a mirror surface property as far as end portions of the molded article in spite of the low mold temperature. The molded article was surface-measured for definition to show that the definition was as high as 95% when the complete definition was 100%. When no insert block was used, it was required to set the mold temperature at about 100° C.

Further, the above molding was repeated in 10000 cycles to show that the insert block had no damage such as cracking.

COMPARATIVE EXAMPLE 2A

Figure 54B:
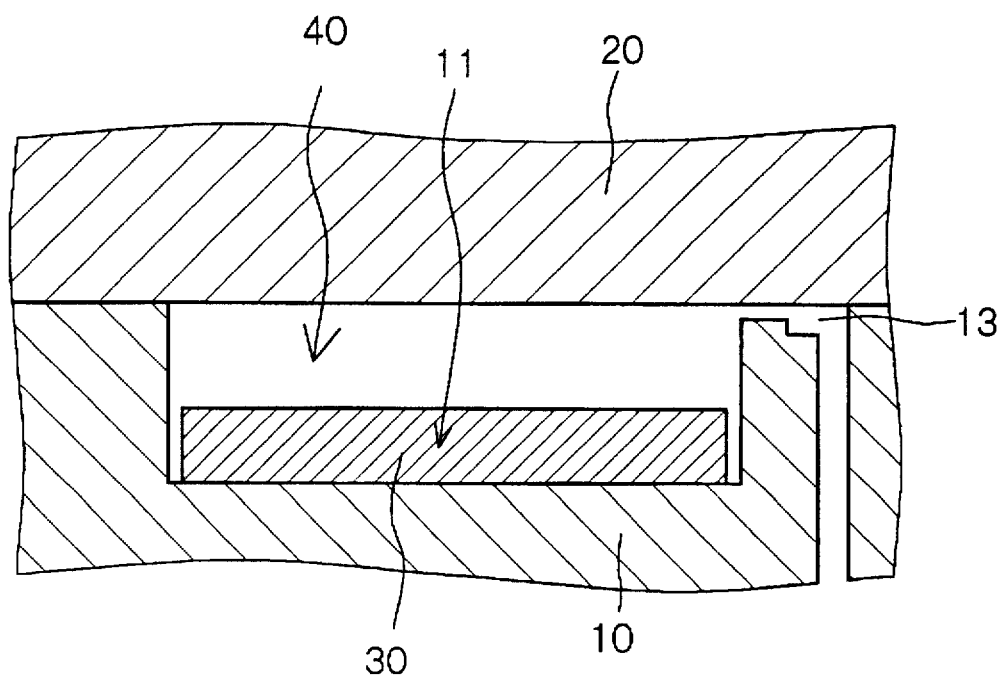

The same insert block formed of glass-ceramics as that used in Example 2 was disposed in a fixed mold member having the same structure as that in Comparative Example 1B (see FIG. 54B). The insert block and the insert block attaching portion were arranged to have the clearance (D) of 0 mm and 0.5 mm. No cover plate was used. The same thermoplastic resin containing an inorganic fiber as that used in Example 2 was injection-molded under the same molding conditions as those in Example 2. When the clearance (D) was 0 mm, the insert block underwent cracking on its peripheral portions. When the clearance (D) was 0.5 mm, the obtained molded article was poor in appearance of circumferential portions. In the 20th cycle of the molding, the molded article had mold flashes on the circumferential portions.

COMPARATIVE EXAMPLE 2B

Example 2 was repeated except that the clearance (C) between the cover plate and the insert block was changed to 0.003 mm, 0.02 mm and 0.04 mm. When the clearance (C) was 0.04 mm, the molten resin penetrated a space between the insert block and the cover plate, so that it was impossible to release a molded article from the mold. When the clearance (C) was set at 0.003 mm and 0.02 mm, the above problem did not occur at all.

COMPARATIVE EXAMPLE 2C

Comparative Example 2B was repeated except that the insert block was replaced with an insert block formed of quartz glass and that the clearance (C) between the cover plate and the insert block was changed to 0.02 mm and 0.04 mm. When the clearance (C) was 0.04 mm, the molten resin penetrated a space between the insert block and the cover plate, so that it was impossible to release a molded article from the mold. When the clearance (C) was set at 0.02 mm, it was possible to carry out the molding up to the 20th cycle without any problem. However, the insert block of quartz glass had an interfacial debonding (delamination) and broke since the ply adhesion of the quartz was lower than the adhesion between the quartz and the polyamide MXD6 resin.

COMPARATIVE EXAMPLE 2D

Example 2 was repeated except that the amount (ΔS) of overlapping of the cover plate and the insert block was changed to 0.05 mm. As a result, a cracking occurred on the peripheral portion of the insert block, and after 10th cycle, the insert block underwent cracking.

EXAMPLE 3

Figure 2:
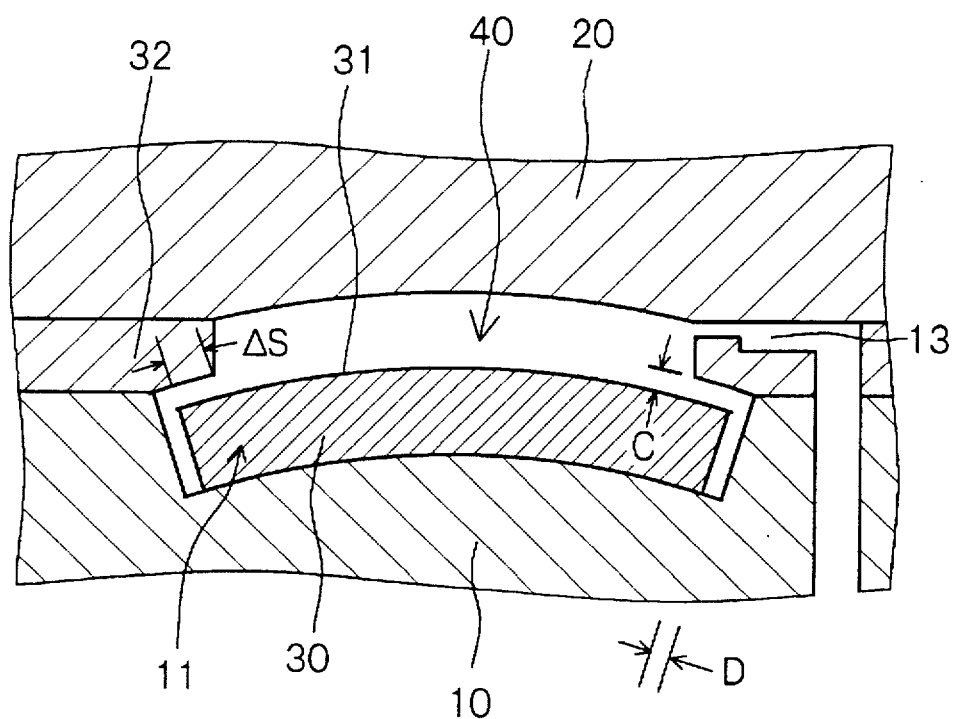
FIG. 2 is a schematic partial cross section of a mold assembly in Example 3.

FIG. 2 shows a schematic partial cross section of a mold assembly in Example 3. A cavity 40 had a size of 200.00 mm×50.00 mm×2.00 mm. An insert block 30 had a cavity wall 31 having a radius of curvature of 500 mm, and had a size of 201.00 mm×51.00 mm×3.00 mm. The insert block was formed of glass-ceramics (crystallinity: 90%) whose properties were the same as those of the glass-ceramics used in Example 2. The cavity wall 31 of the insert block 30 was lapped and finished with diamond lapping and cerium oxide lapping, and had a surface roughness $R_{max}$ of 0.02 μm.

A fixed mold member 10 was formed from carbon steel S55C. The fixed mold member 10 was produced such that an insert block attaching portion 11 had an inner dimension of 201.20 mm×51.20 mm×3.02 mm (depth). The bottom portion of the insert block attaching portion 11 had the same radius of curvature as that of the surface of the insert block 30 opposite to the cavity wall 31 thereof. The insert block 30 was temporarily bonded to the insert block attaching portion 11 with a two-package epoxy adhesive (not shown). After the above adhesion bonding, a clearance (D) between the insert block 30 and the insert block attaching portion 11 was measured with a spacer gage to show a lowest clearance of 0.07 mm.

A cover plate 32 was formed from carbon steel S55C. A surface of the cover plate 32 facing the cavity wall 31 of the insert block 30 had a radius of curvature of 500 mm. The cover plate 32 was fixed to the fixed mold member 10 with bolts (not shown). The average clearance (C) between the insert block 30 and the cover plate 32 was 0.019 mm. The amount (ΔS) of overlapping of the cover plate 32 and the insert block 30 was 0.5 mm.

A movable mold member 20 was formed from carbon steel S55C. The surface of the movable mold member which constituted the cavity had a radius of curvature of 500 mm.

The completed mold assembly (see FIG. 2) was attached to an injection molding machine. When the mold assembly was heated up to 130° C. and then rapidly cooled to 40° C. with a mold temperature controller, the insert block 30 formed of glass-ceramics did not have any damage such as cracking.

The mold assembly attached to the same injection molding machine as that used in Example 1 was heated to 60° C., and under the following injection molding conditions, the following polycarbonate resin containing a glass fiber was injected into the cavity 40 through a gate portion 13, and the cavity 40 was completely filled with the molten resin. Twenty seconds after the completion of the injection, a molded article was released from the mold.

Thermoplastic resin: Iupilon GS2020MR2 supplied by Mitsubishi Engineering-Plastics Corp., glass fiber content 20% by weight, the glass fiber having an average length of 200 μm and an average diameter of 13 μm.

Molding conditions

Mold temperature: 60° C.

Resin temperature: 300° C.

Injection pressure: 500 kgf/cm$_2$-G

The surface of the molded article (surface which had been in contact with the cavity wall 31 of the insert block 30) had a mirror surface property as far as end portions of the molded article in spite of the low mold temperature. The molded article was surface-measured for definition to show that the definition was as high as 90% when the complete definition was 100%.

Further, the above molding was repeated in 10000 cycles to show that the insert block had no damage such as cracking.

EXAMPLE 4

In Example 4, an insert block 30 was produced by grinding glass-ceramics having the following specification. A cavity wall 31 of the insert block 30 was lapped and finished with diamond lapping and cerium oxide lapping.

Material: Glass-ceramics of spodumene type crystal (trade name: Neoceram N-0, supplied by Nippon Denki Glass Kabushiki Kaisha)

Crystallinity: 70%

Density: 2.51 g/cm$^3$

Thermal conductivity: $0.4 \times 10^{-2}$ cal/cm.sec.°C.

Coefficient of linear expansion: $-0.6 \times 10^{-6}$/K.

Heat shock strength: 800° C.

Surface roughness $R_{max}$ of cavity wall 31 of insert block: 0.02 μm

The mold assembly had the same structure, the same component sizes and the same dimensions as those in Example 1. After temporarily bonding the insert block 30 to the insert block attaching portion 11 (see FIG. 1B), the clearance (D) between the insert block 30 and the insert block attaching portion 11 was measured with a spacer gage to show a lowest clearance of 0.05 mm.

A cover plate 32, formed from carbon steel S55C, had the same inner dimension as that in Example 1. The cover plate 32 was fixed to the fixed mold member 10 with bolts (not shown) (see FIG. 1C). The average clearance (C) between the insert block 30 and the cover plate 32 was 0.019 mm. The amount ($\Delta S$) of overlapping of the cover plate 32 and the insert block 30 was 0.5 mm.

A movable mold member 20 was formed from carbon steel S55C. The mold assembly (see FIG. 1A) was assembled with the movable mold member 20 and the fixed mold member 10 shown in FIG. 1C.

The complete mold assembly was attached to an injection molding machine. When the mold assembly was heated up to 130° C. and then rapidly cooled to 40° C. with a mold temperature controller, the insert block 30 formed of glass-ceramics did not have any damage such as cracking.

The mold assembly attached to the same injection molding machine as that used in Example 1 was heated to 100° C., and under the following injection molding conditions, the following polycarbonate resin containing a glass fiber was injected into the cavity 40 through the gate portion 13, and the cavity 40 was completely filled with the molten resin. Twenty seconds after the completion of the injection, a molded article was released from the mold.

Thermoplastic resin: GS2020M supplied by Mitsubishi Engineering-Plastics Corp., glass fiber content 20% by weight, the glass fiber having an average length of 300 μm and an average diameter of 13 μm.

Molding conditions

Mold temperature: 100° C.

Resin temperature: 310° C.

Injection pressure: 500 kgf/cm$_2$-G

The surface of the molded article (surface which had been in contact with the cavity wall 31 of the insert block 30) had a mirror surface property as far as end portions of the molded article in spite of the low mold temperature. The molded article was surface-measured for definition to show that the definition was as high as 90% when the complete definition was 100%. The molded article was measured for a flexural modulus to show that the flexural modulus was 5.0 GPa.

Further, the above molding was repeated in 10000 cycles to show that the insert block had no damage such as cracking.

COMPARATIVE EXAMPLE 4A

Comparative Example 4A used the same mold assembly as that used in Comparative Example 1A as shown in FIG. 54A. The mold assembly had a fixed mold member 10 formed from preharden steel (manufactured by Uddeholm, brand name: Stavax) and having a cavity wall which was mirror-surface-finished by polishing with #2000 paper and diamond paste, and a movable mold member 20 having the same structure as that of Example 4. With this mold assembly, an attempt was made to injection-mold the same thermoplastic resin containing an inorganic fiber as that used in Example 4 under the same conditions as those in Example 4. However, the molten resin failed to fill in the cavity 40 completely, since the molten resin had poor flowability. The injection pressure was increased by 200 kgf/cm$_2$-G, or the injection molding was carried out at an injection pressure of 700 kgf/cm$_2$-G. The resultant molded article was surface-measured for definition to show that the definition was 7% when the complete definition was 100%. That is, the mirror surface property in Comparative Example 4A was greatly poor as compared with that in Example 4.

COMPARATIVE EXAMPLE 4B

Comparative Example 4B used the same insert block 30 as that used in Example 4, and (structurally) the same mold assembly as that used in Comparative Example 1B. Unlike Example 4, no cover plate was used, as shown in a schematic cross section of FIG. 54B.

The same thermoplastic resin containing an inorganic fiber as that used in Example 4 was injection-molded under the same conditions as those in Example 4. As a result, the resultant molded article was poor in appearance, and the molded article had mold flashes on the circumferential portions. Further, the insert block 30 underwent cracking in the 15th molding cycle.

COMPARATIVE EXAMPLE 4C

Example 4 was repeated except that the clearance (C) between the cover plate 32 and the insert block 30 was changed to 0.003 mm, 0.02 mm and 0.04 mm. When the clearance (C) was 0.04 mm, the molten resin penetrated a space between the insert block 30 and the cover plate 32, so that it was impossible to release a molded article from the mold. When the clearance (C) was set at 0.003 mm and 0.02 mm, the above problem did not occur at all.

COMPARATIVE EXAMPLE 4D

Example 4 was repeated except that the amount ($\Delta S$) of overlapping of the cover plate and the insert block was changed to 0.05 mm. As a result, a cracking occurred on the peripheral portion of the insert block, and after 5th cycle, the insert block underwent cracking.

COMPARATIVE EXAMPLE 4E

Comparative Example 4E used the same mold assembly as that used in Example 4. A polycarbonate resin containing 30% by weight of a silane-coupled glass fiber and a polycarbonate resin containing 50% by weight of a silane-coupled glass fiber were used for forming a molded article. Two kinds of silane-coupled glass fibers were used. One had an average length of 420 μm and an average diameter of 13 μm. The other had an average length of 420 μm and an average diameter of 15 μm. The injection molding conditions were the same as those of Example 4, except the resin temperature was set at 330° C.

The surface of the resultant molded article had a glass fiber exposed. The molded article was surface-measured for definition. Table 3 shows the results. All molded articles obtained had a flexural modulus of at least 4.5 GPa.

TABLE 3

| Average Length of Fiber (μm) | 420 | | | |
|---|---|---|---|---|
| Average Diameter of Fiber (μm) | 13 | | 15 | |
| Fiber Content (% by Weight) | 30 | 50 | 30 | 50 |
| Definition (%) | 20 | 15 | 10 | 7 |

TABLE 4

| Average Length of Fiber (μm) | 70 | | | | 300 | | | |
|---|---|---|---|---|---|---|---|---|
| Average Diameter of Fiber (μm) | 6 | | 13 | | 6 | | 13 | |
| Fiber Content (% by Weight) | 30 | 50 | 30 | 50 | 30 | 50 | 30 | 50 |
| Definition (%) | 93 | 87 | 93 | 87 | 92 | 85 | 92 | 85 |

EXAMPLE 5

Example 5 used the same mold assembly as that used in Example 4. A polycarbonate resin containing 30% by weight of a silane-coupled glass fiber and a polycarbonate resin containing 50% by weight of a silane-coupled glass fiber were used for forming a molded article. The average lengths and average diameters of the silane-coupled glass fibers used are shown in Table 4. The injection molding conditions were the same as those in Example 4, except the resin temperature was set at 330° C.

The surface of the molded article (surface which had been in contact with the cavity wall 31 of the insert block 30) had a mirror surface property as far as end portions of the molded article. The molded article was surface-measured for definition. Table 4 shows the results. The molded articles were measured for a flexural modulus to show that the flexural modulus was at least 4.5 GPa.

EXAMPLE 6

Example 6 used the same mold assembly as that used in Example 4. A polycarbonate resin containing 20% by weight of an aluminum borate whisker fiber having an average length of 10 μm and an average diameter of 0.1 μm was used for forming a molded article under the same injection-molding conditions as those of Example 4.

The surface of the molded article (surface which had been in contact with the cavity wall 31 of the insert block 30) had a mirror surface property as far as end portions of the molded article. The molded article was surface-measured for definition to show that the definition was as high as 95%. The molded article obtained was measured for a flexural modulus to show that the flexural modulus was 6.0 GPa.

EXAMPLE 7 AND COMPARATIVE EXAMPLE 7

Example 7 used the same mold assembly as that used in Example 4. A polycarbonate resin containing 30% by weight of a glass fiber having an average length of 70 μm and an average diameter of 9 μm was used for forming a molded article under the same injection-molding conditions as those in Example 4. In spite of the mold temperature at 100° C., there was obtained a molded article on the surface of which inorganic fibers were not deposited and having an excellent mirror surface property. The molded article was surface-measured for definition to show that the definition was as high as 90%. The molded article obtained was measured for a flexural modulus to show that the flexural modulus was 4.9 GPa.

Comparative Example 7 used the same mold assembly as that used in Comparative Example 4A (see FIG. 54A). A molded article was formed from the same thermoplastic resin as that used in Example 7 and under the same injection-molding conditions as those in Example 4. The surface of the molded article obtained had inorganic fibers exposed, and the molded article had extremely poor surface definition. Then, the mold temperature increased up to 120° C. However, inorganic fibers were deposited on the surface of the molded article obtained, and the molded article had extremely poor definition. The molded article was surface-measured for definition to show that the definition was only 5%.

EXAMPLE 8

Examples 8 to 12 are concerned with the No. 2A production method in the method of producing a molded article directed to the first aspect of the present invention, that is, the method of producing a molded article directed to the first aspect of the present invention including the step of forming a light reflection thin film on at least part of the surface of the molded article. Specifically, Examples 8 to 10 are concerned with the method of producing a molded article constituting a mirror, and Examples 11 and 12 are concerned with the method of producing a molded article constituting a reflector.

The molded article constituting a mirror part is preferably required to have the following physical property values.

Flexural modulus: at least 5.0 GPa

Coefficient of linear expansion: $3.0 \times 10^{-5}$/K. or less

Deflection temperature under load: at least 100° C.

Definition: at least 85%

For satisfying the above physical property values, it is preferred to use a thermoplastic resin containing an inorganic fiber which satisfies the following requirements.

Average length: 5 to 100 μm

Average diameter: 0.1 to 15 μm

Content: 15 to 80% by weight

Figure 3A:
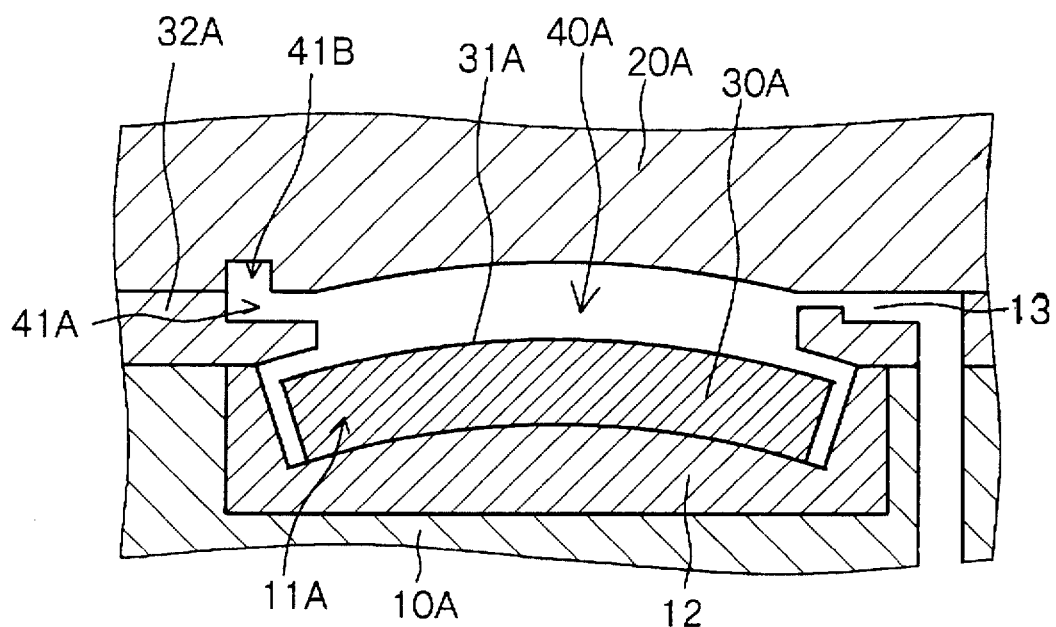
FIGS. 3A, 3B and 3C are a schematic partial cross section of a preferred embodiment of a mold assembly in Example 8 and schematic partial cross sections of the mold assembly being assembled.
Figure 3B:
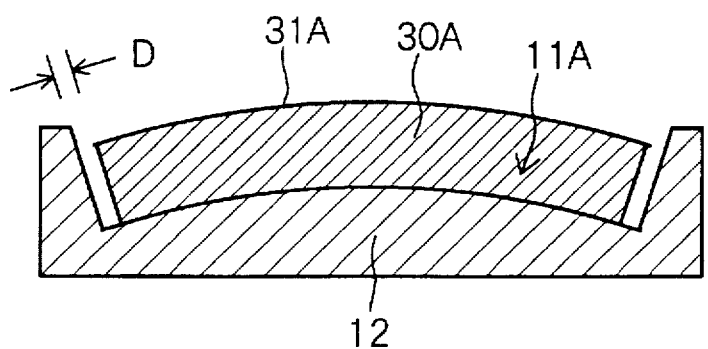
Figure 3C:
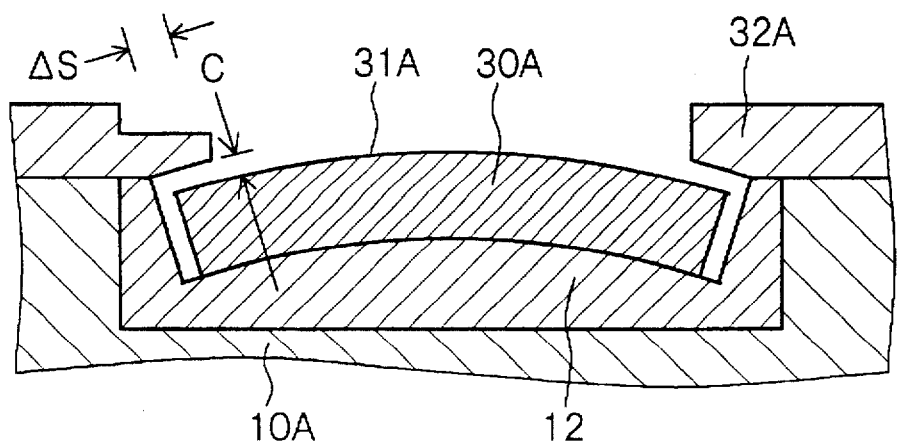

FIG. 3A shows a schematic partial cross section of a mold assembly in Example 8. FIGS. 3B and 3C show schematic cross sections of the mold assembly which is being assembled. The mold assembly is assembled according to the order of FIG. 3B, FIG. 3C and FIG. 3A. A mirror part formed of a thermoplastic resin to be formed had a dimension of 270 mm (length)×80 mm (width)×2 mm (thickness) and its mirror surface had a radius of curvature of 500 mm.

In Example 8, an insert block 30A was produced by grinding the same glass-ceramics (crystallinity: 70%) as that used in Example 4. The insert block had a size of 271.00 mm×81.00 mm×4.00 mm and a cavity wall 31A of the insert block 30A had a radius of curvature of 500 mm. The insert block was produced by placing glass-ceramics plate of 280 mm×90 mm×4.00 mm on a tooling which was formed of ceramic and had a radius of curvature of 500 mm, allowing it to shape itself in a furnace at 800° C. and then grinding it.

A fixed mold member 10A was formed from carbon steel S55C. That portion of the fixed mold member 10A where the insert block 30A was to be disposed comprised a core 12 formed from carbon steel S55C. An insert block attaching portion 11A was provided in the core 12. The core 12 was produced such that the insert block attaching portion 11A had an inner dimension of 271.20 mm×81.20 mm×4.02 mm (depth). The bottom portion of the insert block attaching portion 11A had the same radius of curvature as that of the surface of the insert block 30A opposite to cavity wall 31A thereof.

The insert block 30A was temporarily bonded to the insert block attaching portion 11A of the core 12 with a two-package epoxy adhesive (not shown)(see FIG. 3B). After the above adhesion bonding, the cavity wall 31A of the insert block 30A was lapped and finished with diamond lapping and cerium oxide lapping. The cavity wall 31A of the insert block 30A had surface roughness $R_{max}$ of 0.02 μm. Then, the core 12 was attached to the fixed mold member 10A (see FIG. 3C). The clearance (D) between the insert block 30A and the insert block attaching portion 11A was measured with a spacer gauge to show a lowest clearance of 0.05 mm.

A cover plate 32A was formed from carbon steel S55C. The cover plate 32A had an inner dimension of 270.00 mm×80.00 mm. After cutting and grinding a carbon steel plate to produce the cover plate including a portion 41A for an assembly portion in a mirror part, the cover plate 32A was fixed to the fixed mold member 10A with bolts (not shown) (see FIG. 3C). The average clearance (C) between the insert block 30A and the cover plate 32A was 0.019 mm. The amount (ΔS) of overlapping of the cover plate 32A and the insert block 30A was 0.5 mm. FIG. 3C omits a gate portion.

A movable mold member 20A was formed from carbon steel S55C. A cavity wall including a portion 41B for producing an assembly portion in the mirror part was provided in the movable mold member 20A. A mold assembly (see FIG. 3A) was assembled with the movable mold member 20A and the fixed mold member 10A shown in FIG. 3C.

The completed mold assembly (see FIG. 3A) was attached to an injection molding machine. When the mold assembly was heated up to 130° C. and then rapidly cooled to 40° C. with a mold temperature controller, the insert block 30A formed of glass-ceramics did not have any damage such as cracking.

An injection molding machine (model 150MTS, manufactured by Mitsubishi Heavy Industries, Ltd.) was use. The mold assembly was heated to 80° C., and under the following injection-molding conditions, the following polycarbonate resin containing 20% by weight of an aluminum borate whisker fiber was injected into the cavity 40A through a gate portion 13, and the cavity 40A was completely filled with the molten resin. Twenty seconds after the completion of the injection, a molded article was released from the mold.

Aluminum borate whisker fiber:

Average length: 10 μm

Average diameter: 0.1 μm.

Molding conditions

Mold temperature: 80° C.

Resin temperature: 310° C.

Injection pressure: 500 kgf/cm$_2$-G

The surface of the molded article constituting a mirror part (surface which had been in contact with the cavity wall 31A of the insert block 30A) had a mirror surface property as far as end portions of the molded article in spite of the low mold temperature. The molded article was surface-measured for definition to show that the definition was as high as 95% when the complete definition was 100%. The molded article had the following physical property values and satisfied the physical property values required for a mirror part.

Flexural modulus: 6.0 GPa

Coefficient of linear expansion: $2.5 \times 10^{-5}$/K.

Deflection temperature under load: 145° C.

Further, the above molding was repeated in 10000 cycles to show that the insert block 30A had no damage such as cracking.

A light reflection thin film having a thickness of 120 nm was formed by vacuum-depositing aluminum on the surface of the molded article which had been in contact with the cavity wall 31A of the insert block 30A, and a molded article constituting a mirror formed of a thermoplastic resin was obtained. The mirror had fine definition (mirror surface property) similar to that of a mirror formed of glass, and a subject was clearly imaged on the surface of the mirror formed of a thermoplastic resin.

A molding cycle was about 40 seconds per molded article and was good in mass productivity. Further, since the assembly portion was integrally formed in the mirror part, the mirror could be easily attached to an automobile, and attaching operation of the mirror to an automobile could be improved. When the mold assembly as shown in FIG. 1A is used, a mirror part having a plate-like form can be produced.

COMPARATIVE EXAMPLE 8A

Figure 55A:
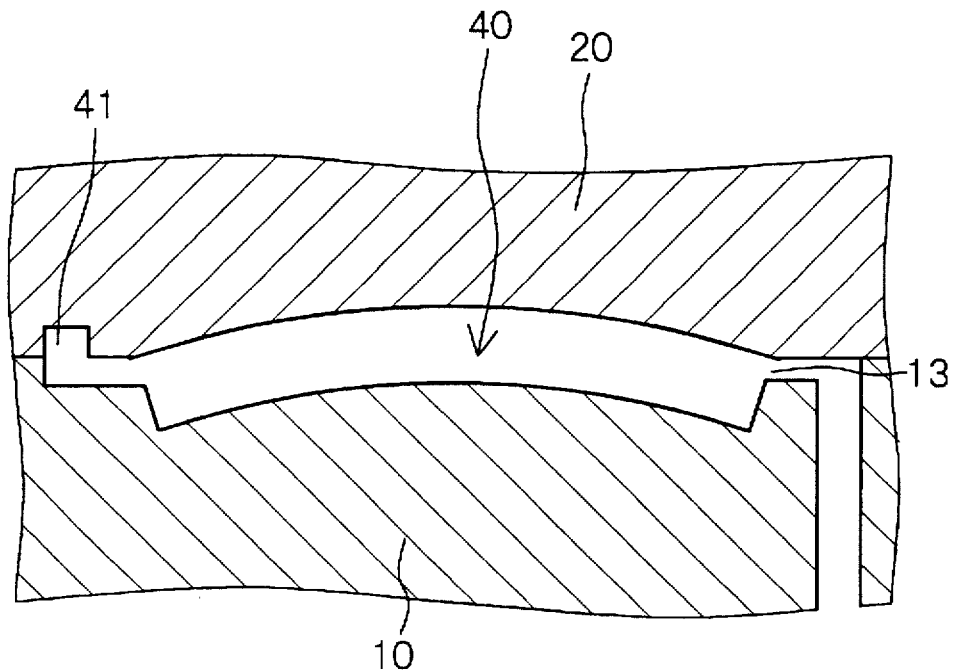
FIGS. 55A and 55B are schematic partial cross sections of conventional mold assemblies structurally different from those in FIGS. 54A and 54B, in which no insert block is disposed or no cover plate is attached.

FIG. 55A shows a schematic partial cross section of a mold assembly used in Comparative Example 8A. The mold assembly had a fixed mold member 10 formed from Stavax steel, having a cavity wall which was mirror-surface-finished by polishing with #2000 paper and diamond paste, and a movable mold member 20 having the same structure as that in Example 8. Reference numeral 41 indicates a portion for forming an assembly portion. With this mold assembly, an attempt was made to injection-mold the same thermoplastic resin containing an inorganic fiber as that used in Example 8 under the same conditions as those in Example 8. However, the molten resin failed to fill in the cavity 40 completely, since the molten resin had poor flowability. The injection pressure was increased by 200 kgf/cm$_2$-G, or the injection-molding was carried out at an injection pressure of 700 kgf/cm$_2$-G. The resultant molded article had molding defects such as a flow mark and streaks. The molded article was surface-measured for definition to show that the definition was 7% when the complete definition was 100%. That is, the mirror surface property in Comparative Example 8A was greatly poor as compared with that in Example 8.

COMPARATIVE EXAMPLE 8B

Figure 55B:
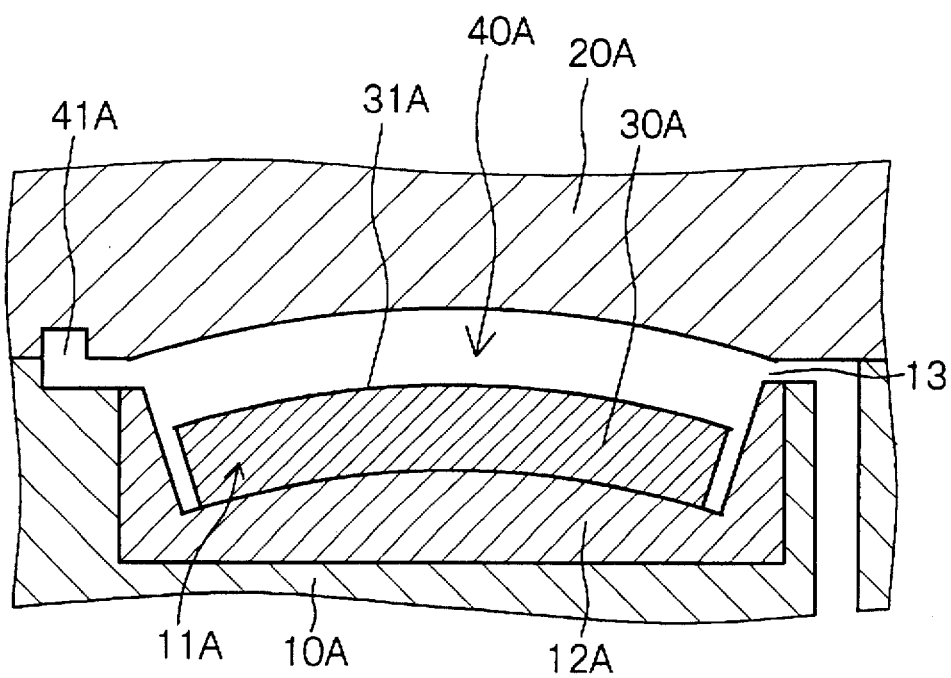

Comparative Example 8B used the same mold assembly as that used in Example 8, except that no cover plate was used (see FIG. 55B). That is, the insert block 30A was not covered by a cover plate. With this mold assembly, an attempt was made to injection-mold the same thermoplastic resin containing an inorganic fiber as that used in Example 8 under the same conditions as those in Example 8. The obtained molded article was poor in appearance of circumferential portions and had mold flashes on the circumferential portions. After 15th cycle, the insert block 30A underwent cracking.

COMPARATIVE EXAMPLE 8C

Example 8 was repeated except that the clearance (C) between the cover plate 32A and the insert block 30A was changed to 0.003 mm, 0.02 mm and 0.04 mm. When the clearance (C) was 0.04 mm, the molten resin penetrated a space between the insert block 30A and the cover plate 32A, so that it was impossible to release a molded article from the mold. When the clearance (C) was set at 0.003 mm and 0.02 mm, the above problem did not occur at all.

COMPARATIVE EXAMPLE 8D

Example 8 was repeated except that the amount (ΔS) of overlapping of the cover plate 32A and the insert block 30A was changed to 0.05 mm. As a result, a cracking occurred on a peripheral portion of the insert block 30A, and after 5th cycle, the insert block 30A underwent cracking.

EXAMPLE 9 AND COMPARATIVE EXAMPLE 9

Example 9 and Comparative Example 9 used the same mold assembly as that used in Example 8. A polycarbonate resin containing 10% by weight of a silane-coupled glass fiber and a polycarbonate resin containing 50% by weight of a silane-coupled glass fiber were used for forming a molded article. Two kinds of silane-coupled glass fibers were used. One had an average length of 70 µm and an average diameter of 10 µm. The other had an average length of 300 µm and an average diameter of 10 µm. The injection-molding conditions were the same as those of Example 8, except the resin temperature was set at 330° C.

The molded articles constituting mirror parts were surface-measured for definition and various physical properties, and Table 5 shows the results. In "Case 1" in Table 5, the average length and the average radius of the inorganic fiber were within the predetermined ranges, while the content of the inorganic fiber was 10% by weight or short of the content of the inorganic fiber which a thermoplastic resin is required to have for satisfying the properties required of a molded article as a mirror part. In "Case 2" in Table 5 (Example 9), the average length, the average radius and the content of the inorganic fiber were within the range of requirements which a thermoplastic resin is to fulfill for satisfying the properties required of a molded article as a mirror part. In "Case 3" in Table 5, the average radius of the inorganic fiber was within the predetermined range, while the average length of the inorganic fiber was 300 µm and the content of the inorganic fiber was 10% by weight. These average length and the content of the inorganic fiber were out of the range of requirements which a thermoplastic resin is to fulfill for satisfying the properties required of a molded article as a mirror part. In "Case 4" in Table 5, the average radius of the inorganic fiber and the content of the inorganic fiber were within the predetermined ranges, while the average length of the inorganic fiber was 300 µm and was out of the range of requirements which a thermoplastic resin is to fulfill for satisfying the properties required of a molded article as a mirror part.

Example 8 was repeated using the above thermoplastic resin for injection-molding mirror parts. The resultant molded articles in Case 1, Case 3 and Case 4 did not satisfy the requirements for a mirror part.

For the molded article constituting a mirror part obtained in Case 2 (Example 9), a light reflection thin film having a thickness of 120 nm was formed by vacuum-depositing aluminum on the surface of the molded article which had been in contact with the cavity wall 31A of the insert block 30A, and a molded article constituting a mirror formed of a thermoplastic resin was obtained. The mirror had fine definition (mirror surface property) similar to that of a mirror formed of glass, and a subject was clearly imaged on the surface of the mirror formed of a thermoplastic resin.

Example 10 and Comparative Example 10

With the mold assembly of Example 8, an attempt was made to injection-mold a thermoplastic resin containing 30% by weight of a glass fiber under the same conditions as those in Example 8. The glass fiber had an average length of 70 µm and an average diameter of 10 µm. In spite of the mold temperature at 100° C., there was obtained a molded article constituting a mirror part, on the surface of which inorganic fibers were not deposited, and having an excellent mirror surface property. The molded article was surface-measured for definition to show that the definition was as high as 90%. The molded article had the following physical property values.

TABLE 5

| Case No. | 1 | 2 | 3 | 4 |
| --- | --- | --- | --- | --- |
| Average Length of Fiber (µm) | 70 | 70 | 300 | 300 |
| Average Diameter of Fiber (µm) | 10 | 10 | 10 | 10 |
| Fiber Content (% by Weight) | 10 | 50 | 10 | 50 |
| Flexural Modulus (GPa) | 2.5 | 5.0 | 3.5 | 8.8 |
| Coefficient of Linear Expansion (×10$^{-5}$/K) | 5.2 | 2.8 | 2.8 | 2.1 |
| Deflection Temperature Under | 142 | 145 | 143 | 147 |

TABLE 5-continued

| Case No. | 1 | 2 | 3 | 4 |
| --- | --- | --- | --- | --- |
| Load (°C.) | | | | |
| Definition (%) | 93 | 87 | 89 | 74 |
| Evaluation | × | ○ | × | × |

Flexural modulus: 5.1 GPa

Coefficient of linear expansion: $2.8 \times 10^{-5}$/K

Deflection temperature under load: 143° C.

A light reflection thin film having a thickness of 120 nm was formed by vacuum-depositing aluminum on the surface which had been in contact with the cavity wall 31A of the insert block 30A, and a molded article constituting a mirror formed of a thermoplastic resin was obtained. The mirror had fine definition (mirror surface property) similar to that of a mirror formed of glass, and a subject was clearly imaged on the surface of the mirror formed of a thermoplastic resin.

With the same mold assembly as that used in Comparative Example 8A (see FIG. 55A), an attempt was made to injection-mold the same thermoplastic resin as that used in Example 10 under the same conditions as those in Example 8. Inorganic fibers were deposited on the surface of the resultant molded article, and the molded article had a poor mirror surface property. Then, the mold temperature was changed to 120° C. However, the surface of the resultant molded article had inorganic fibers exposed, and the molded article had a poor mirror surface property. The molded article was surface-measured for definition to show that the definition was only 5%.

Example 11

The molded constituting a reflector part is required to have the following physical property values.

Flexural modulus: at least 5.0 GPa

Coefficient of linear expansion: $3.0 \times 10^{-5}$/K or less

Deflection temperature under load: at least 140° C.

Definition: at least 80%

For satisfying the above physical property values, it is preferred to use a thermoplastic resin containing an inorganic fiber which satisfies the following requirements.

Average length: 5 to 100 μm

Average diameter: 0.1 to 15 μm

Content: 15 to 80% by weight

Figure 4:
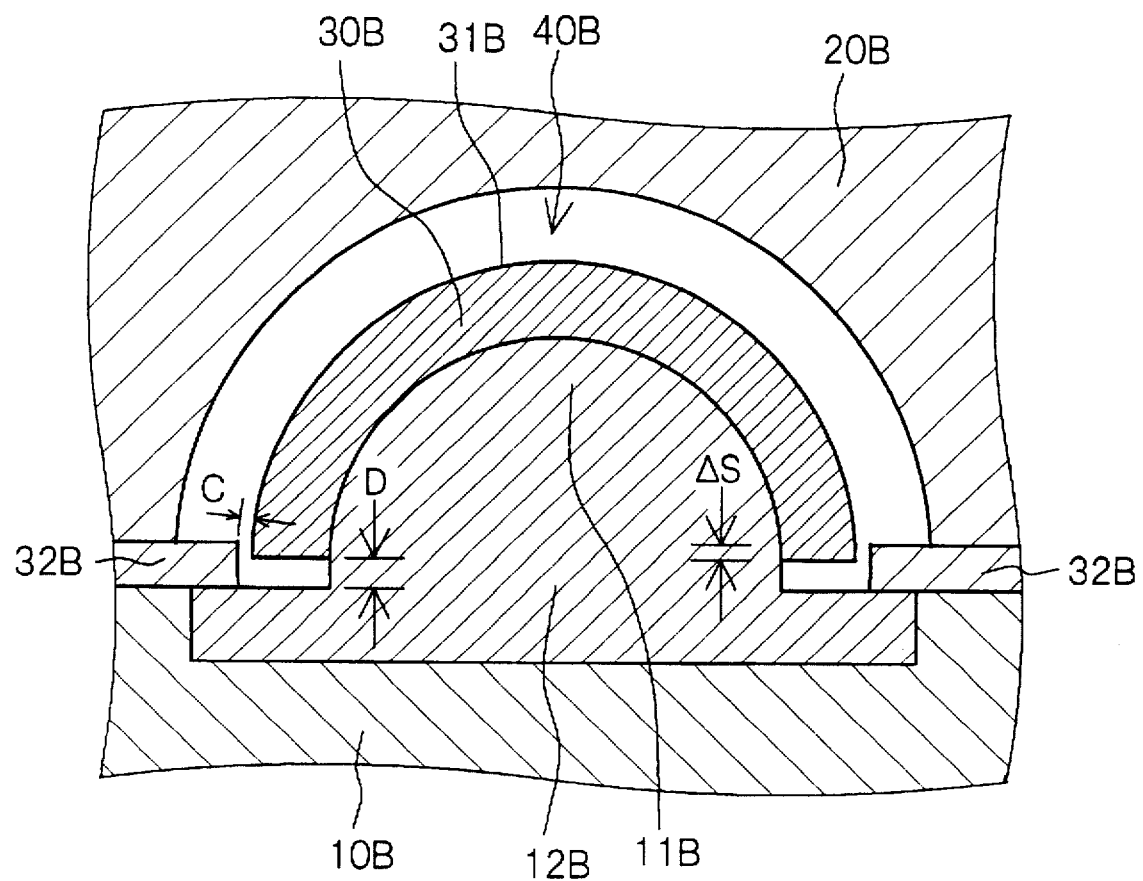
FIG. 4 is a schematic partial cross section of a mold assembly in Example 11.

FIG. 4 shows a schematic partial cross section of a mold assembly in Example 11. An insert block 30B was produced by pouring molten glass in a shaping mold, press-molding it, then crystallizing-treating the shaped glass in a furnace at 800° C. for obtaining glass-ceramics, and shaping and lapping it. The properties of the glass-ceramics used in Example 11 were the same as those used in Example 4 (crystallinity: 70%).

A core 12B was produced from a carbon steel S55C such that the bottom portion of an insert block attaching portion 11B had the same radius of curvature as that of the surface of the insert block 30B opposite to a cavity wall 31B thereof. Then, the insert block 30B was temporarily bonded to the insert block attaching portion 11B of the core 12B with a two-package epoxy adhesive (not shown). After the above adhesion bonding, the clearance (D) between the insert block 30B and the insert block attaching portion 11B was measured with a spacer gauge to show a lowest clearance of 0.05 mm. The cavity wall 31B of the insert block 30B was lapped and finished with diamond lapping and cerium oxide lapping. The cavity wall 31B of the insert block 30B had a surface roughness $R_{max}$ of 0.02 μm. Then, the core 12B was attached to the fixed mold member 10B.

A cover plate 32B was formed from carbon steel S55C. The cover plate 32B was fixed to the fixed mold member 10B with bolts (not shown). The average clearance (C) between the insert block 30B and the cover plate 32B was 0.019 mm. The amount ($\Delta S$) of overlapping of the cover plate 32B and the insert block 30B was 0.5 mm.

A movable mold member 20B was formed from carbon steel S55C.

The mold assembly was assembled with the fixed mold member 10B and the movable mold member 20B (see FIG. 4). The completed mold assembly was attached to an injection molding machine. When the mold assembly was heated up to 130° C. and then rapidly cooled to 40° C. with a mold temperature controller, the insert block 30B formed of glass-ceramics did not have any damage such as cracking.

The same injection molding machine as that used in Example 8 was use. The mold assembly was heated to 80° C., and under the following injection-molding conditions, the following polycarbonate resin containing 20% by weight of an aluminum borate whisker fiber was injected into a cavity 40B through a gate portion (not shown), and the cavity 40B was completely filled with the molten resin. Twenty seconds after the completion of the injection, a molded article was released from the mold.

Aluminum Borate Whisker Fiber

Average length: 10 μm

Average diameter: 0.1 μm.

Molding Conditions

Mold temperature: 80° C.

Resin temperature: 310° C.

Injection pressure: 500 kgf/cm$^2$-G

The surface of the molded article (surface which had been in contact with the cavity wall 31B of the insert block 30B) had a mirror surface property as far as end portions of the molded article in spite of the low mold temperature. The molded article was surface-measured for definition to show that the definition was as high as 95% when the complete definition was 100%. The molded article constituting a reflector part had the following physical property values. Further, the above molding was repeated in 10000 cycles to show that the insert block 31B had no damage such as cracking.

Flexural modulus: 6.0 GPa

Coefficient of linear expansion: $2.5 \times 10^{-5}$/K

Deflection temperature under load: 145° C.

A light reflection thin film having a thickness of 120 nm was formed by vacuum-depositing aluminum on the surface of the molded article constituting a reflector part, which had been in contact with the cavity wall 31B of the insert block 30A, and a molded article constituting a reflector formed of a thermoplastic resin was obtained. The reflector had fine definition (mirror surface property) similar to that of a reflector formed of BMC, and an subject was clearly imaged on the surface of the mirror formed of a thermoplastic resin containing an inorganic fiber. A molding cycle was about 40 seconds per molded article and was good in mass productivity.

Comparative Example 11A

Comparative Example 11A used a mold assembly provided with a mold formed from Stavax steel and having a surface-finished cavity wall. The mold assembly used in Comparative Example 11A had the same structure as that of the mold assembly used in Example 11 except that an insert block and a cover plate were not provided. With this mold assembly, an attempt was made to injection-mold the same thermoplastic resin containing an inorganic fiber as that used in Example 11 under the same conditions as those in Example 11. However, the molten resin failed to fill in the cavity completely, since the molten resin had poor flowability. The injection pressure was increased by 200 kgf/cm$^2$-G, or the injection-molding was carried out at an injection pressure of 700 kgf/cm$^2$-G. The resultant molded article constituting a reflector part had a poor appearance and inorganic fibers were deposited on the surface of the molded article. The molded article was surface-measured for definition to show that the definition was 7% when the complete definition was 100%. That is, the mirror surface property in Comparative Example 11A was greatly poor as compared with that in Example 11.

Comparative Example 11B

Comparative Example 11B used the same mold assembly as that used in Example 11 except that no cover plate was used. With this mold assembly, an attempt was made to injection-mold the same thermoplastic resin containing an inorganic fiber as that used in Example 11 under the same conditions as those in Example 11. The obtained molded article was poor in appearance of circumferential portions and had mold flashes on the circumferential portions. After 15th cycle, the insert block underwent cracking.

Comparative Example 11C

Example 11 was repeated except that the clearance (C) between the cover plate 32B and the insert block 30B was changed to 0.04 mm. The molten resin penetrated a space between the insert block 30B and the cover plate 32B, so that it was impossible to release a molded article from the mold.

Comparative Example 11D

Example 11 was repeated except that the amount (ΔS) of overlapping of the cover plate 32B and the insert block 30B was changed to 0.05 mm. As a result, a cracking occurred on a peripheral portion of the insert block 30B, and after 5th cycle, the insert block underwent cracking.

Example 12

Example 12 used the same mold assembly as that used in Example 11. A polycarbonate resin containing 50% by weight of a silane-coupled glass fiber was used. The glass fiber had an average length of 70 μm and an average diameter of 10 μm. Injection-molding was carried out under the same injection-molding conditions as those in Example 11 except that the resin temperature was set at 330° C. The molded article was surface-measured for definition and measured for physical properties. Table 6 shows the results.

Comparative Examples 12A to 12C

Comparative Examples 12A to 12C used the same mold assembly as that used in Example 11. Polycarbonate resins containing a silane-coupled glass fiber shown in Table 6 were used, and injection-moldings were carried out under the same injection-molding conditions as those in Example 12. The molded articles were surface-measured for definition and measured for physical properties. Table 6 shows the results.

It is clear from Comparative Examples 12B and 12C that the definition decreases since an average length of the inorganic fiber exceeds 100 μm. Further, it is clear from Comparative Example 12A that the coefficient of linear expansion required for a molded article constituting a reflector part (3.0×10$^{-5}$/K) is not satisfied since the content of an inorganic fiber is less than 15% by weight.

Example 13

Examples 13 and 14 are concerned with the No. 2B production method in the method of producing a molded article directed to the first aspect of the present invention, that is, the method of producing a molded article directed to the first aspect of the present invention including the step of forming a coating on at least part of the surface of the molded article. Specifically, Examples 13 and 14 are concerned with the method of producing a molded article constituting an exterior member of an automobile. The molded article constituting an exterior part is required to have the following physical property values.

Flexural modulus: at least 4.0 GPa
Coefficient of linear expansion: 4.0×10$^{-5}$/K or less
Deflection temperature under load: at least 100° C.
Definition: at least 85%
For satisfying the above physical property

TABLE 6

|  | Example | Comparative Example | | |
|---|---|---|---|---|
|  | 12 | 12A | 12B | 12C |
| Average Length of Fiber (μm) | 70 | 70 | 450 | 450 |
| Average Diameter of Fiber (μm) | 10 | 10 | 10 | 10 |
| Fiber Content (%) by Weight) | 50 | 10 | 10 | 50 |
| Coefficient of Linear Expansion (×10$^{-5}$/K) | 2.8 | 5.2 | 2.8 | 2.1 |
| Deflection Temperature Under Load (°C.) | 145 | 142 | 143 | 147 |
| Definition (%) | 87 | 93 | 79 | 64 | values, it is preferred to use a thermoplastic resin containing an inorganic fiber which satisfies the following requirements.

Figure 5:
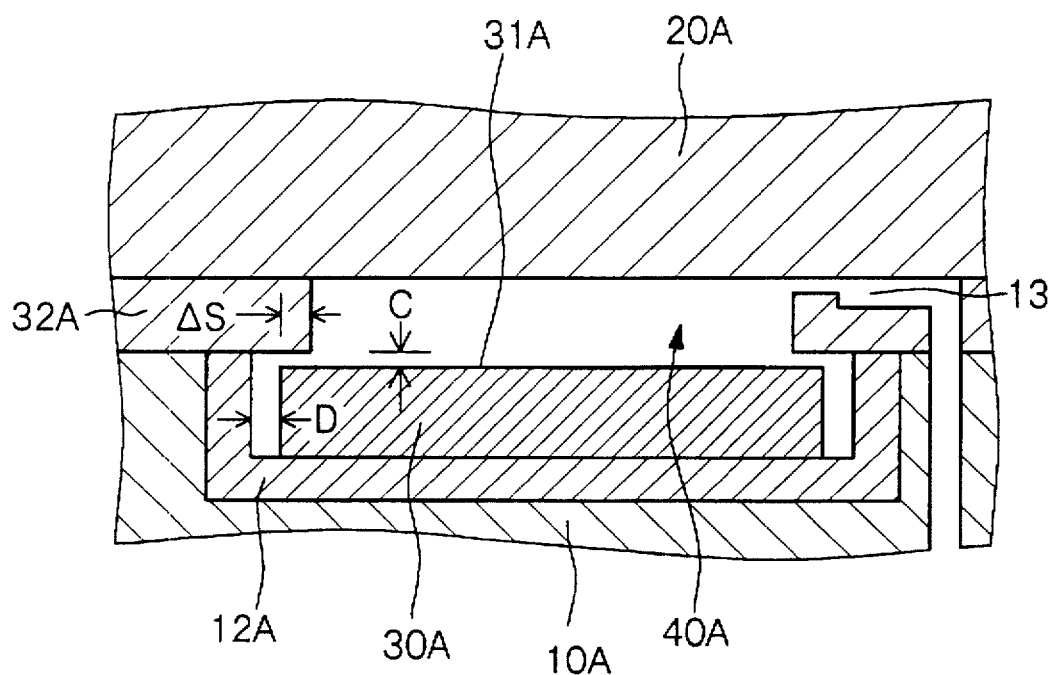
FIG. 5 is a schematic partial cross section of a mold assembly in Example 13.

Average length: 5 to 400 μm
Average diameter: 0.1 to 15 μm
Content: 15 to 80% by weight In Example 13, an insert block 30A was formed of the same glass-ceramics (crystallinity: 70%) as that used in Example 4. The insert block 30A had a plate-like shape having a size of 471.00 mm×451.00 mm×4.00 mm (thickness). FIG. 5 shows a schematic partial cross section of a mold assembly in Example 13. In this mold assembly, the insert block 30A was disposed in an insert block attaching portion 11A of a core 12A which was attached in a fixed mold member 10A. The insert block attaching portion 11A of the core 12A had an inner dimension of 471.20 mm×451.20 mm. The insert block 30A was temporarily bonded to the insert block attaching portion 11A with a two-package epoxy adhesive (not shown). The clearance (D) between the insert block 30A and the insert block attaching portion 11A was measured with a spacer gauge to show a lowest clearance of 0.05 mm. After the above adhesion bonding, a cavity wall 31A of the insert block 30A was lapped and finished with diamond lapping and cerium oxide lapping. The cavity wall 31A of the insert block 30A had a surface roughness R$_{max}$ of 0.02 μm. Then, the core 12 was attached to the fixed mold member 10A.

A cover plate 32A was formed from carbon steel S55C. The cover plate 32A had an inner dimension of 470.00 mm×450.00 mm. The cover plate 32A was fixed to the fixed mold member 10A with bolts (not shown). The average clearance (C) between the insert block 30A and the cover plate 32A was 0.019 mm. The amount (ΔS) of overlapping of the cover plate 32A and the insert block 30A was 0.5 mm.

A movable mold member 20A was formed from carbon steel S55C. A mold assembly for forming a molded article constituting an exterior part for an exterior member of an automobile was assembled with the movable mold member 20A and the fixed mold member 10A as shown in FIG. 5. The molded article constituting an exterior part had a size of 470 mm (length)×450 mm (width)×3 mm (thickness). The completed mold assembly (see FIG. 5) was attached to an injection molding machine. When the mold assembly was heated up to 130° C. and then rapidly cooled to 40° C. with a mold temperature controller, the insert block 30A formed of glass-ceramics did not have any damage such as cracking.

An injection molding machine (model 550MM, manufactured by Mitsubishi Heavy Industries, Ltd.) was use. The mold assembly was heated to 80° C., and under the following injection-molding conditions, the following polycarbonate resin containing 20% by weight of an aluminum borate whisker fiber was injected into a cavity 40A through a gate portion 13, and the cavity 40A was completely filled with the molten resin. Twenty seconds after the completion of the injection, a molded article was released from the mold.

Aluminum Borate Whisker Fiber

Average length: 10 μm

Average diameter: 0.1 μm.

Molding Conditions

Mold temperature: 80° C.

Resin temperature: 310° C.

Injection pressure: 500 kgf/cm$^2$-G

The surface of the molded article (surface which had been in contact with the cavity wall 31A of the insert block 30A) had a mirror surface property as far as end portions of the molded article in spite of the low mold temperature. The molded article was surface-measured for definition to show that the definition was as high as 95% when the complete definition was 100%. The molded article had the following physical property values.

Flexural modulus: 6.0 GPa

Coefficient of linear expansion: $2.5 \times 10^{-5}$/K

Deflection temperature under load: 145° C.

Further, the above molding was repeated in 10000 cycles to show that the insert block 30A had no damage such as cracking.

A coating was formed on the surface of the molded article constituting an exterior part by applying an urethane coating composition to the surface of the molded article by a spraying method and by curing the resultant coating in an oven at 140° C. for 2 hours. As a result, the molded article constituting an exterior member of an automobile having an excellent definition (the mirror surface property) was obtained, and a subject was clearly imaged on the surface of the exterior member of an automobile formed of a thermoplastic resin. A molding cycle was about 40 seconds per molded article and was good in mass productivity.

Comparative Example 13A

Comparative Example 13A used a mold assembly provided with a mold formed from Stavax steel and having a surface-finished cavity wall. The mold assembly used in Comparative Example 13A had the same structure as that of the mold assembly used in Example 13 except that an insert block and a cover plate were not provided. With this mold assembly, an attempt was made to injection-mold the same thermoplastic resin containing an inorganic fiber as that used in Example 13 under the same conditions as those in Example 13. However, the molten resin failed to fill in the cavity completely, since the molten resin had poor flowability. The injection pressure was increased by 200 kgf/cm$^2$-G, or the injection-molding was carried out at an injection pressure of 700 kgf/cm$^2$-G. The resultant molded article constituting an exterior part had a poor appearance and inorganic fibers were deposited on the surface of the molded article. The molded article was surface-measured for definition to show that the definition was 7% when the complete definition was 100%. That is, the mirror surface property in Comparative Example 13A was greatly poor as compared with that in Example 13.

Comparative Example 13B

Comparative Example 13B used the same mold assembly as that used in Example 13 except that no cover plate was used. With this mold assembly, an attempt was made to injection-mold the same thermoplastic resin containing an inorganic fiber as that used in Example 13 under the same conditions as those in Example 13. The obtained molded article was poor in appearance of circumferential portions and had mold flashes on the circumferential portions. After 15th cycle, the insert block 30A underwent cracking.

Comparative Example 13C

Example 13 was repeated except that the clearance (C) between the cover plate 32A and the insert block 30A was changed to 0.04 mm. The molten resin penetrated a space between the insert block 30A and the cover plate 32A, so that it was impossible to release a molded article from the mold.

Comparative Example 13D

Example 13 was repeated except that the amount (ΔS) of overlapping of the cover plate 32A and the insert block 30A was changed to 0.05 mm. As a result, a cracking occurred on a peripheral portion of the insert block 30A, and after 5th cycle, the insert block 30A underwent cracking.

Example 14

Example 14 used the same mold assembly as that used in Example 13. A polycarbonate resin containing 50% by weight of a silane-coupled glass fiber was used for forming a molded article. The glass fiber had an average length of 70 μm and an average diameter of 10 μm. The injection-molding conditions were the same as those of Example 13, except the resin temperature was set at 330° C. The molded article constituting an exterior part whose surface was not yet coated with a coating composition was surface-measured for definition and measured for physical properties. Table 7 shows the results.

Comparative Examples 14A to 14C

Comparative Examples 14A to 14C used the same mold assembly as that used in Example 13. Polycarbonate resins containing a silane-coupled glass fiber shown in Table 7 were used, and injection-moldings were carried out under the same injection-molding conditions as those in Example 14. The molded articles were surface-measured for definition and measured for physical properties. Table 7 shows the results.

It is clear from Comparative Examples 14B and 14C that the definition decreases since an average length of the inorganic fiber exceeds 400 µm. Further, it is clear from Comparative Example 14A that the coefficient of linear expansion required for a molded article constituting an exterior part ($3.0 \times 10^{-5}$/K) and the flexural modulus are not satisfied since the content of an inorganic fiber is less than 15% by weight.

Example 15

Examples 15 and 16 are concerned with the No. 2C production method in the method of producing a molded article directed to the first aspect of the present invention, that is, the method of producing a molded article directed to the first aspect of the present invention including the step of forming a hard coating on at least part of the surface of the molded article. Specifically, Examples 15 and 16 are concerned with the method of producing a molded article constituting a pillar of an automobile. The molded as a pillar part is required to have the following physical property values.

Flexural modulus: at least 4.0 GPa

TABLE 7

|  | Example | Comparative Example | | |
|---|---|---|---|---|
|  | 14 | 14A | 14B | 14C |
| Average Length of Fiber (µm) | 70 | 70 | 500 | 500 |
| Average Diameter of Fiber (µm) | 10 | 10 | 10 | 10 |
| Fiber Content (% by Weight) | 50 | 10 | 10 | 50 |
| Flexural Modulus (GPa) | 5.0 | 2.5 | 3.5 | 8.8 |
| Coefficient of Linear Expansion ($\times 10^{-5}$/K) | 2.8 | 5.2 | 2.8 | 2.1 |
| Deflection Temperature Under Load (°C.) | 145 | 142 | 143 | 147 |
| Definition (%) | 87 | 93 | 76 | 52 |

Coefficient of linear expansion: $4.0 \times 10^{-5}$/K or less

Deflection temperature under load: at least 100° C.

Definition: at least 80%

For satisfying the above physical property values, it is preferred to use a thermoplastic resin containing an inorganic fiber which satisfies the following requirements.

Average length: 5 to 400 µm

Average diameter: 0.1 to 15 µm

Content: 15 to 80% by weight

Figure 6A:
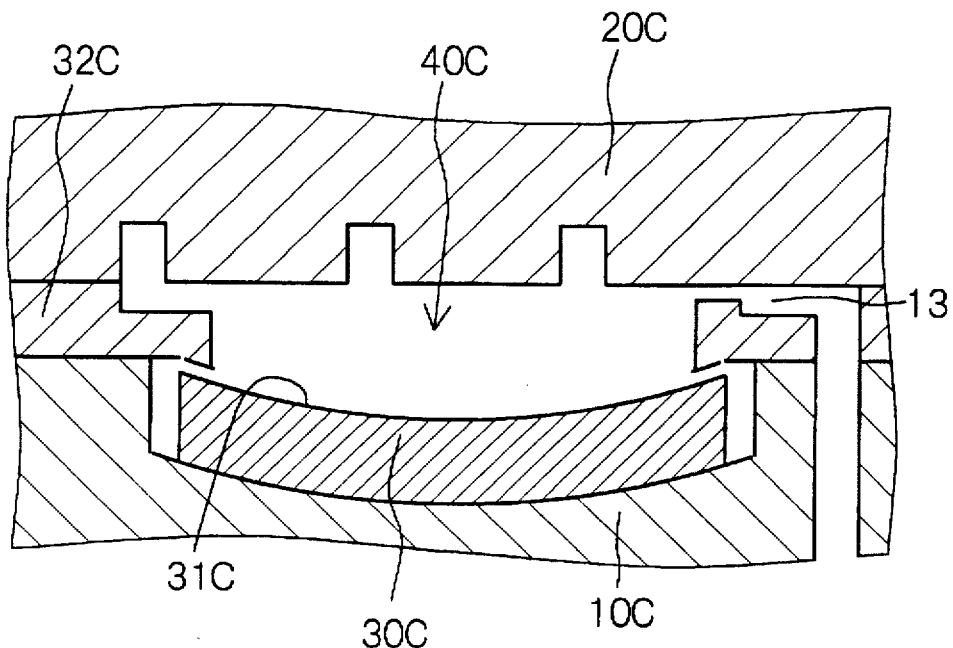
FIGS. 6A, 6B and 6C are schematic partial cross sections of a mold assembly in Example 15.
Figure 6B:
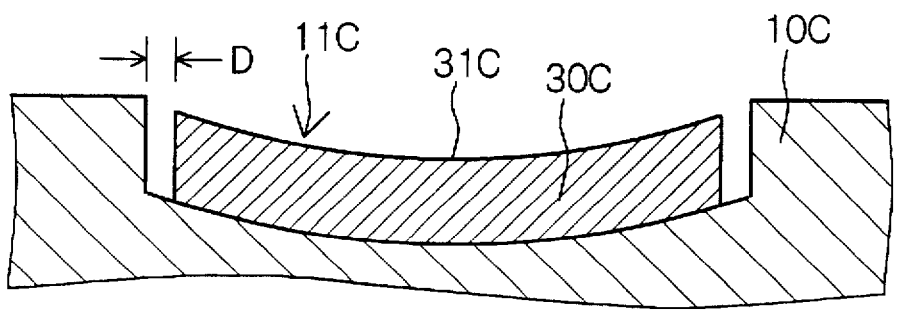
Figure 6C:
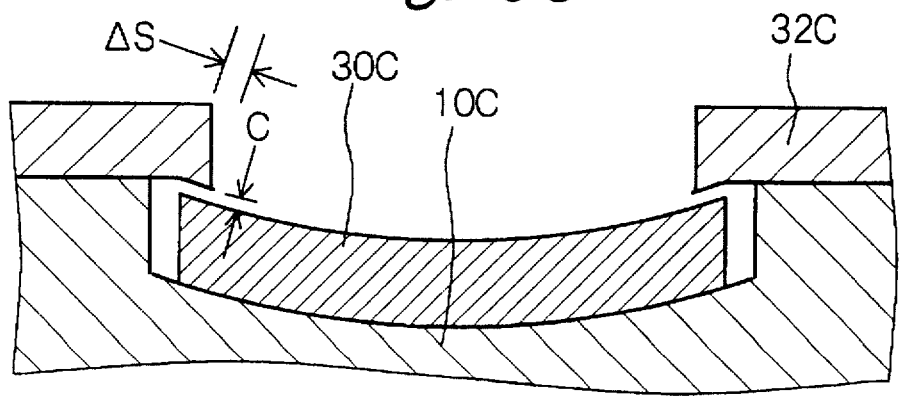

FIGS. 6A, 6B and 6C show a schematic partial cross section of a mold assembly in Example 15. An insert block 30C was produced and disposed as shown in FIG. 6B. The insert block 30C was formed of a glass-ceramics plate of 271.00 mm (length)×81.00 mm (width)×4.00 mm (thickness). The glass-ceramics had the same crystallinity of 70% and properties as those of glass-ceramics used in Example 4. The insert block was produced by placing a glass-ceramics plate on a shaping mold formed of ceramic and having a radius of curvature of 500 mm in a furnace at 800° C. and shaping itself in the furnace. A cavity wall 31C of the insert block 30C was lapped and finished with diamond lapping and cerium oxide lapping. The cavity wall 31C of the insert block 30C had a surface roughness $R_{max}$ of 0.02 µm.

An insert block attaching portion 11C provided in a fixed mold member 10C had an inner dimension of 271.20 mm×81.20 mm. The bottom portion of the insert block attaching portion 11C had the same radius of curvature as that of the surface of the insert block 30C opposite to the cavity wall 31C thereof. The insert block 30C was temporarily bonded to the insert block attaching portion 11C with a two-package epoxy adhesive (not shown)(see FIG. 6B). The clearance (D) between the insert block 30C and the insert block attaching portion 11C was measured with a spacer gauge to show a lowest clearance of 0.05 mm.

A cover plate 32C was formed from carbon steel S55C (see FIG. 6C). The cover plate 32C had an inner dimension of 270.00 mm×80.00 mm and the surface thereof facing the cavity wall 31C of the insert block 30C had a radius of curvature of 500 mm. The cover plate 32C was fixed to the fixed mold member 10C with bolts (not shown). The average clearance (C) between the insert block 30C and the cover plate 32C was 0.019 mm. The amount (ΔS) of overlapping of the cover plate 32C and the insert block 30C was 0.5 mm.

A mold assembly for forming a molded article constituting a pillar part for a pillar of an automobile was assembled with the movable mold member 20C and the fixed mold member 10C as shown in FIG. 6A. The molded article constituting a pillar of an automobile had a size of 270 mm×80 mm×2 mm (thickness) and had a radius of curvature of 500 mm. The completed mold assembly was attached to an injection molding machine. When the mold assembly was heated up to 130° C. and then rapidly cooled to 40° C. with a mold temperature controller, the insert block 30C formed of glass-ceramics did not have any damage such as cracking.

The same injection molding machine as that used in Example 8 was use. The mold assembly was heated to 80° C., and under the following injection-molding conditions, the following polycarbonate resin containing 20% by weight of an aluminum borate whisker fiber was injected into the cavity 40C through a gate portion 13, and the cavity 40C was completely filled with the molten resin. Twenty seconds after the completion of the injection, a molded article constituting a pillar part was released from the mold.

Aluminum Borate Whisker Fiber

Average length: 10 µm

Average diameter: 0.1 µm.

Molding Conditions

Mold temperature: 80° C.

Resin temperature: 310° C.

Injection pressure: 500 kgf/cm²-G

The surface of the molded article (surface which had been in contact with the cavity wall 31C of the insert block 30C) had a mirror surface property as far as end portions of the molded article in spite of the low mold temperature. The molded article was surface-measured for definition to show that the definition was as high as 95% when the complete definition was 100%. The molded article constituting a pillar part had the following physical property values. Further, the above molding was repeated in 10000 cycles to show that the insert block 30C had no damage such as cracking.

Flexural modulus: 6.0 GPa

Coefficient of linear expansion: $2.5 \times 10^{-5}$/K

Deflection temperature under load: 145° C.

A hard coating was formed on the surface of the molded article constituting a pillar part by applying an acrylic hardcoating solution to the surface of the molded article constituting a pillar part by a dipping method, and by curing the resultant coating. The obtained molded article constituting a pillar of an automobile having excellent definition (the mirror surface property) was obtained, and had an excellent appearance similar to a pillar of an automobile formed of a thermoplastic resin containing no inorganic fiber. Further, no cracking occurred on the molded article constituting a pillar of an automobile.

Comparative Example 15A

Comparative Example 15A used a mold assembly provided with a mold formed from Stavax steel and having a surface-finished cavity wall. The mold assembly used in Comparative Example 15A had the same structure as that of the mold assembly used in Example 15 except that an insert block and a cover plate were not provided. With this mold assembly, an attempt was made to injection-mold the same thermoplastic resin containing an inorganic fiber as that used in Example 15 under the same conditions as those in Example 15. However, the molten resin failed to fill in the cavity completely, since the molten resin had poor flowability. The injection pressure was increased by 200 kgf/cm$^2$-G, or the injection-molding was carried out at an injection pressure of 700 kgf/cm$^2$-G. The resultant molded article constituting a pillar part had a poor appearance and inorganic fibers were deposited on the surface of the molded article. The molded article was surface-measured for definition to show that the definition was 7% when the complete definition was 100%. That is, the mirror surface property in Comparative Example 15A was greatly poor as compared with that in Example 15. A hard coating was formed on the surface of the obtained molded article. Such a molded article had a poor appearance, and cracking occurred on end portions of the molded article constituting a pillar of an automobile.

Comparative Example 15B

Comparative Example 15B used the same mold assembly as that used in Example 15 except that no cover plate was used. With this mold assembly, an attempt was made to injection-mold the same thermoplastic resin containing an inorganic fiber as that used in Example 15 under the same conditions as those in Example 15. The obtained molded article was poor in appearance of circumferential portions and had mold flashes on the circumferential portions. After 15th cycle, the insert block 30C underwent cracking.

Comparative Example 15C

Example 15 was repeated except that the clearance (C) between the cover plate 32C and the insert block 30C was changed to 0.04 mm. The molten resin penetrated a space between the insert block 30C and the cover plate 32C, so that it was impossible to release a molded article from the mold.

Comparative Example 15D

Example 15 was repeated except that the amount (ΔS) of overlapping of the cover plate 32C and the insert block 30C was changed to 0.05 mm. As a result, a cracking occurred on a peripheral portion of the insert block 30C, and after 5th cycle, the insert block 30A underwent cracking.

Example 16

Example 16 used the same mold assembly as that used in Example 15. A polycarbonate resin containing 50% by weight of a silane-coupled glass fiber was used for forming a molded article. The glass fiber had an average length of 70 μm and an average diameter of 10 μm. The injection-molding conditions were the same as those of Example 15, except the resin temperature was set at 330° C. The molded article constituting a pillar part whose surface was not yet coated with a coating composition was surface-measured for definition and measured for physical properties. Table 8 shows the results.

Comparative Examples 16A to 16C

Comparative Examples 16A to 16C used the same mold assembly as that used in Example 15. Polycarbonate resins containing a silane-coupled glass fiber shown in Table 8 were used, and injection-moldings were carried out under the same injection-molding conditions as those in Example 16. The molded articles constituting a pillar part were surface-measured for definition and measured for physical properties. Table 8 shows the results. It is clear from Comparative Examples 16B and 16C that the definition decreases since the inorganic fiber had an average length of 500 μm. Further, it is clear from Comparative Example 16A that the coefficient of linear expansion required for a molded article constituting a pillar part (3.0×10$^{-5}$/K) and the flexural modulus are not satisfied since the content of an inorganic fiber is less than 15% by weight.

Example 17

Examples 17 and 18 are concerned with the second production method in the method of producing a molded article directed to the first aspect of the present invention. Specifically, Examples 17 and 18 are concerned with the method of producing a molded article constituting a door handle of an automobile. The molded as a door handle of an automobile is required to have the following physical property values.

Flexural modulus: at least 5.0 GPa

Coefficient of linear expansion: 3.0×10$^{-5}$/K or less

Deflection temperature under load: at least 140° C.

Definition: at least 85% for a mirror part

For satisfying the above physical property values, it is preferred to use a thermoplastic resin containing an inorganic fiber which satisfies the following requirements.

Average length: 5 to 400 μm

Average diameter: 0.1 to 15 μm

Content: 15 to 80% by weight

Figure 7:
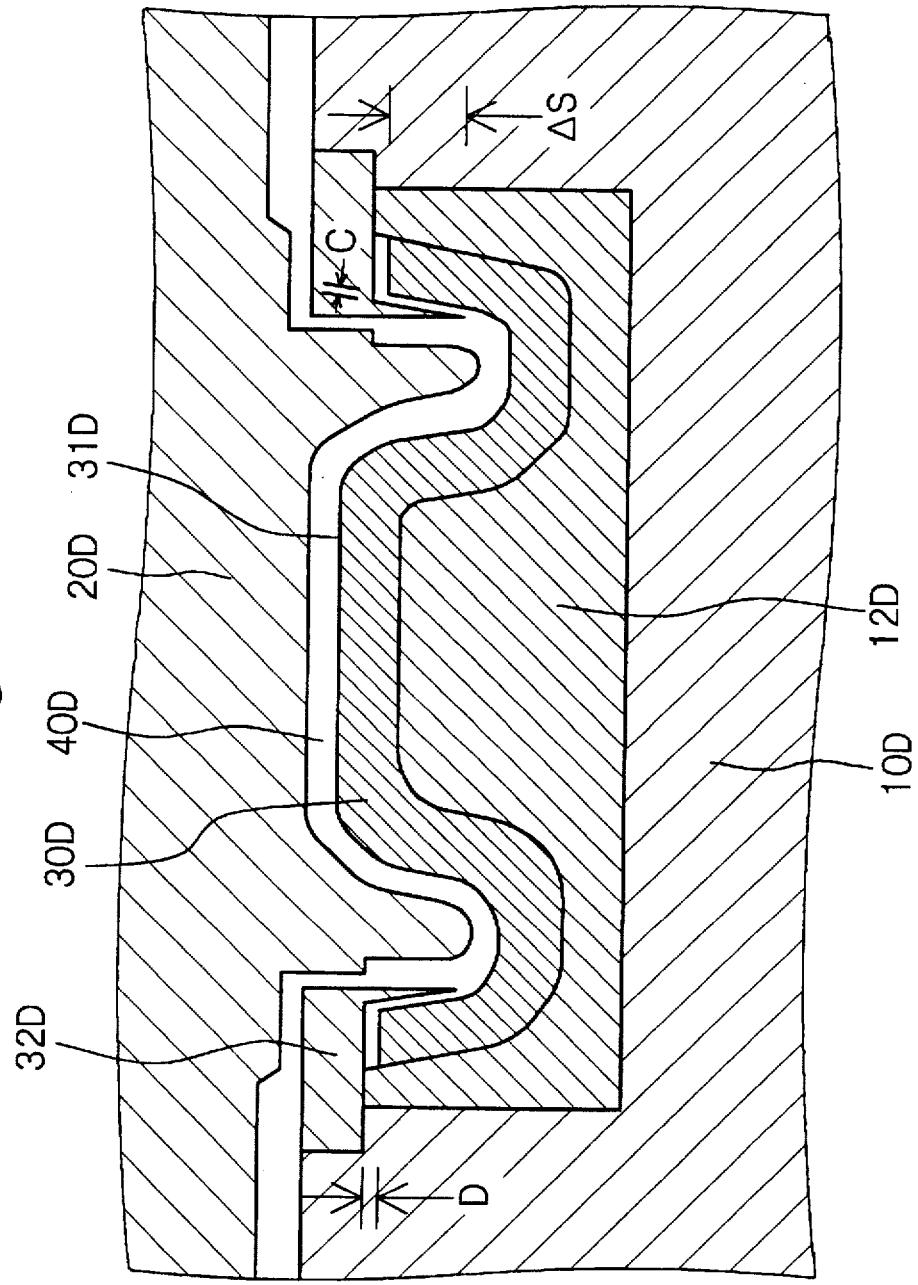
FIG. 7 is a schematic partial cross section of a mold assembly in Example 17.

FIG. 7 shows a schematic partial cross section of a mold assembly for forming a molded article constituting a door handle of an automobile in Example 17.

An insert block 30D was produced by pouring molten glass in a shaping mold formed of metal, press-molding it, then crystallizing-treating it in a furnace at 800° to 900° C. for obtaining glass-ceramics, and shaping and lapping it. The properties of the glass-ceramics used in Example 17 were the same as those used in Example 4 (crystallinity: 70%). As the processes for lapping and disposing the insert block 30D are the same as those explained in Example 8, the detailed description is omitted. The cavity wall 31D of the insert block 30D had a surface roughness R$_{max}$ of 0.02 μm.

TABLE 8

|  | Example | Comparative Example | | |
|---|---|---|---|---|
|  | 16 | 16A | 16B | 16C |
| Average Length of Fiber (μm) | 70 | 70 | 500 | 500 |
| Average Diameter of Fiber (μm) | 10 | 10 | 10 | 10 |

TABLE 8-continued

|  | Example | Comparative Example | | |
|---|---|---|---|---|
|  | 16 | 16A | 16B | 16C |
| Fiber Content (% by Weight) | 50 | 10 | 10 | 50 |
| Flexural Modulus (GPa) | 5.0 | 2.5 | 3.5 | 8.8 |
| Coefficient of Linear Expansion (×10$^{-5}$/K) | 2.8 | 5.2 | 2.8 | 2.1 |
| Deflection Temperature Under Load (°C.) | 145 | 142 | 143 | 147 |
| Definition (%) | 87 | 93 | 76 | 52 |

A cover plate 32D was formed from carbon steel S55C. The cover plate 32D was fixed to a fixed mold member 10D with bolts (not shown). The average clearance (C) between the insert block 30D and the cover plate 32D was 0.019 mm. The amount (ΔS) of overlapping of the cover plate 32D and the insert block 30D was 1.0 mm. A movable mold member 20D was formed from carbon steel S55C. A mold assembly was assembled with the movable mold member 20D and the fixed mold member as shown in FIG. 7. The completed mold assembly was attached to an injection molding machine. When the mold assembly was heated up to 130° C. and then rapidly cooled to 40° C. with a mold temperature controller, the insert block 30D formed of glass-ceramics did not have any damage such as cracking.

The same injection molding machine as that used in Example 8 was use. The mold assembly was heated to 80° C., and under the following injection-molding conditions, the following polycarbonate resin containing 20% by weight of an aluminum borate whisker fiber was injected into a cavity 40D through a gate portion (not shown), and the cavity 40D was completely filled with the molten resin. Twenty seconds after the completion of the injection, a molded article was released from the mold.

Aluminum Borate Whisker Fiber

Average length: 10 μm

Average diameter: 0.1 μm.

Molding Conditions

Mold temperature: 80° C.

Resin temperature: 310° C.

Injection pressure: 500 kgf/cm$^2$-G

The surface of the molded article (surface which had been in contact with the cavity wall 31D of the insert block 30D) had a mirror surface property as far as end portions of the molded article in spite of the low mold temperature. The molded article was surface-measured for definition to show that the definition was as high as 95% when the complete definition was 100%. The molded article constituting a door handle of an automobile had the following physical property values. Further, the above molding was repeated in 10000 cycles to show that the insert block 30D had no damage such as cracking.

Flexural modulus: 6.0 GPa

Coefficient of linear expansion: 2.5×10$^{-5}$/K

Deflection temperature under load: 145° C.

Comparative Example 17A

Comparative Example 17A used a mold assembly provided with a mold formed from Stavax steel and having a surface-finished cavity wall. The mold assembly used in Comparative Example 17A had the same structure as that of the mold assembly used in Example 17 except that an insert block and a cover plate were not provided. With this mold assembly, an attempt was made to injection-mold the same thermoplastic resin containing an inorganic fiber as that used in Example 17 under the same conditions as those in Example 17. However, the molten resin failed to fill in the cavity completely, since the molten resin had poor flowability. The injection pressure was increased by 200 kgf/cm$^2$-G, or the injection-molding was carried out at an injection pressure of 700 kgf/cm$^2$-G. The resultant molded article constituting a door handle of an automobile had a poor appearance and inorganic fibers were deposited on the surface of the molded article. The molded article was surface-measured for definition to show that the definition was 7% when the complete definition was 100%. That is, the mirror surface property in Comparative Example 17A was greatly poor as compared with that in Example 17.

Comparative Example 17B

Comparative Example 17B used the same mold assembly as that used in Example 17 except that no cover plate was used. With this mold assembly, an attempt was made to injection-mold the same thermoplastic resin containing an inorganic fiber as that used in Example 17 under the same conditions as those in Example 17. The obtained molded article was poor in appearance of circumferential portions and had mold flashes on the circumferential portions. After 15th cycle, the insert block 30D underwent cracking.

Comparative Example 17C

Example 17 was repeated except that the clearance (C) between the cover plate 32D and the insert block 30D was changed to 0.04 mm. The molten resin penetrated a space between the insert block 30D and the cover plate 32D, so that it was impossible to release a molded article from the mold.

Comparative Example 17D

Example 17 was repeated except that the amount (ΔS) of overlapping of the cover plate 32D and the insert block 30D was changed to 0.05 mm. As a result, a cracking occurred on a peripheral portion of the insert block 30D, and after 5th cycle, the insert block underwent cracking.

Example 18

Example 18 used the same mold assembly as that used in Example 17. A polycarbonate resin containing a silane-coupled glass fiber shown in Table 9 was used for forming a molded article. The injection-molding conditions were the same as those of Example 17 except the resin temperature was set at 330° C. The molded article constituting a door handle of an automobile was surface-measured for definition and measured for physical properties. Table 9 shows the results.

Comparative Examples 18A to 18C

Comparative Examples 18A to 18C used the same mold assembly as that used in Example 17. Polycarbonate resins containing a silane-coupled glass fiber shown in Table 9 were used, and injection-moldings were carried out under the same injection-molding conditions as those in Example 18. The molded articles were surface-measured for definition and measured for physical properties. Table 9 shows the results.

It is clear from Comparative Examples 18B and 18C that the definition decreases since an average length of the inorganic fiber exceeds 400 μm. Further, it is clear from Comparative Example 18A that the coefficient of linear expansion required for a molded article constituting a door handle of an automobile ($3.0\times10^{-5}$/K) and the flexural modulus are not satisfied since the content of an inorganic fiber is less than 15% by weight.

Example 19

Examples 19 and 20 are concerned with the third production method in the method of producing a molded article directed to the first aspect of the present invention. Specifically, Examples 19 and 20 are concerned with the method of producing a molded article from a crystalline thermoplastic resin.

An insert block used in Example 19 was formed of the same glass-ceramics (crystallinity:70%) as that used in Example 4. The structure of a mold assembly in Example 19 was the same as that shown in FIG. 5. The surface roughness $R_{max}$ and the size of the insert block 30A, the inner dimension of the insert block attaching portion 11A of the core 12A, the size of the cover plate 32A and the size of the cavity 40A were the same as those in Example 1. The clearance (D) between the insert block 30A and the insert block attaching portion 11A was measured with a spacer gauge to show a lowest clearance of 0.05 mm. The average clearance (C) between the insert block 30A and the cover plate 32A was 0.019 mm. The amount (ΔS) of overlapping of the cover plate 32A and the insert block 30A was 0.5 mm.

The completed mold assembly was attached to an injection molding machine. When the mold assembly was

TABLE 9

|  | Example | Comparative Example | | |
| --- | --- | --- | --- | --- |
|  | 18 | 18A | 18B | 18C |
| Average Length of Fiber (μm) | 70 | 70 | 500 | 500 |
| Average Diameter of Fiber (μm) | 10 | 10 | 10 | 10 |
| Fiber Content (% by Weight) | 50 | 10 | 10 | 50 |
| Flexural Modulus (GPa) | 5.9 | 2.5 | 4.3 | 9.2 |
| Coefficient of Linear Expansion ($\times10^{-5}$/K) | 2.8 | 5.2 | 2.8 | 1.9 |
| Definition (%) | 87 | 83 | 76 | 52 | heated up to 130° C. and then rapidly cooled to 40° C. with a mold temperature controller, the insert block 30A formed of glass-ceramics did not have any damage such as cracking.

The same injection molding machine as that used in Example 8 was use. The mold assembly was heated to 80° C., and under the following injection-molding conditions, the polyoxymethylene resin as a crystalline thermoplastic resin ("Iupital F20-03" supplied by Mitsubishi Engineering-Plastics Corp.) was injected into the cavity 40A through the gate portion 13, and the cavity 40A was completely filled with the molten resin. Twenty seconds after the completion of the injection, a molded article was released from the mold. The molded article had an excellent appearance having a high mirror property.

Molding Conditions

Mold temperature: 80° C.

Resin temperature: 200° C.

Injection pressure: 500 kgf/cm²-G

The above molding was repeated in 10000 cycles to show that the insert block 30A had no damage such as cracking. For the property evaluation of the molded article, the resistance-to-climate test by a sunshine fade tester was carried out to measure the time period before cracking occurred on the molded article.

Figure 8:
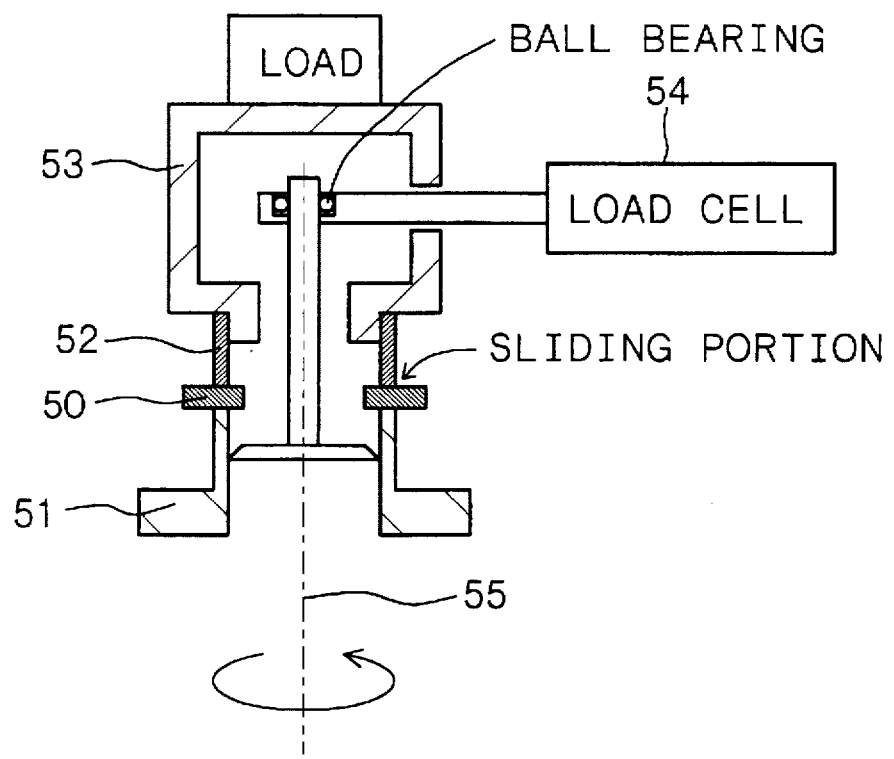
FIG. 8 is a schematic view of the Suzuki method tester used for the evaluation of resistance to frictional wear and abrasion.

The molded article was evaluated for the resistance to frictional wear and abrasion by a thrust-sliding test using a Suzuki method tester and the Suzuki testing method. FIG. 8 outlines the Suzuki method tester. The molded article having the form of a plate, obtained in Example 19, was cut and ground to form a sample 50 having the form of a ring. Separately, a cylindrical molded sample 52 having an inner diameter of 20 mm, an outer diameter 25.6 mm and a height of 15 mm was prepared from the same polyoxymethylene resin as above with a mold of which the cavity wall was formed from carbon steel S55C at a mold temperature of 80° C. at a resin temperature of 200° C. In the test, the sample 50 having the form of a ring was bonded to a sample holder 51, and the cylindrical molded sample 52 was attached to a sample holder 53. That surface of the sample 50 having the form of a ring which had been in contact with the cavity wall 31A of the insert block 30A was brought into contact with the bottom surface of the cylindrical molded sample 52.

While a load of a predetermined surface pressure was applied to the cylindrical molded sample 52 attached to the sample holder 53, the sample 50 having the form of a ring, which was in contact with the cylindrical molded sample 52, was turned at a predetermined linear velocity with a motor (not shown).

A dynamic coefficient of friction (μ) when an equilibrium state was reached after the passage of a predetermined period of time was determined on the basis of the following equation.

$$\mu=(f\cdot r)/(N\cdot R)$$

in which f is a frictional force measured with a load cell 54 attached to the sample 50 having the form of a ring, r is a distance from the center of a rotation axis 55 to the load cell 54, N is a load, and R is an average radius of the cylindrical molded sample 52. The load can be obtained by (surface pressure)×(sliding surface area). The measurement for the dynamic coefficient of friction (μ) was carried out under the following conditions, and the dynamic coefficient of friction was calculated.

Surface pressure: 3 kgf/cm²

Linear velocity: 10 cm/second

Measurement time: 20 hours

Further, the measurement for a critical PV value (product of surface pressure and linear velocity) was carried out under the following conditions, and the critical PV value was calculated.

Surface pressure: Increased at a rate of 1 kgf/cm² per minute

Linear velocity: 10 cm/second

The above "critical PV value" refers to a product of surface pressure and linear velocity. When the surface pressure is increased while maintaining the linear velocity at a constant level, a test piece is melted and destroyed due to frictional heat. The critical PV value is a product of the surface pressure and the linear velocity at the moment when the test piece is destroyed by being melted. The critical PV value can be also measured with the Suzuki method tester.

Table 10 shows the results of the resistance to climate based on the sunshine fade tester and the resistance to frictional wear and based on the thrust-sliding test.

Comparative Example 19A

Comparative Example 19A used a mold assembly provided with a mold formed from Stavax steel and having a surface-finished cavity wall. The mold assembly used in Comparative Example 19A had the same structure as that of the mold assembly used in Example 19 except that an insert block and a cover plate were not provided. The structure of the mold assembly was substantially the same as that shown in FIG. 54A. With this mold assembly, an attempt was made to injection-mold the same crystalline thermoplastic resin as that used in Example 19 under the same conditions as those in Example 19.

However, the molten resin failed to fill in the cavity completely, since the molten resin had poor flowability. The injection pressure was increased by 200 kgf/cm$^2$-G, or the injection-molding was carried out at an injection pressure of 700 kgf/cm$^2$-G. The resultant molded article had a poor appearance such as a flow mark.

The molded articles were measured for the resistance to frictional wear and the resistance to climate. Table 10 shows the results.

TABLE 10

|  | Resistance to climate (Time period before cracking arises) | Dynamic coefficient of friction | Critical PV value |
| --- | --- | --- | --- |
| Example 19 | 250 hrs | 0.08 | 125 |
| Comparative Example 19A | 70 hrs | 0.19 | 100 |

Comparative Example 19B

Comparative Example 19B used the same mold assembly as that used in Example 19 except that no cover plate was used. With this mold assembly, an attempt was made to injection-mold the same crystalline thermoplastic resin as that used in Example 19 under the same conditions as those in Example 19. The obtained molded article was poor in appearance of circumferential portions and had mold flashes on the circumferential portions. After 15th cycle, the insert block 30A underwent cracking.

Comparative Example 19C

Example 19 was repeated except that the clearance (C) between the cover plate 32A and the insert block 30A was changed to 0.04 mm. The molten resin penetrated a space between the insert block 30A and the cover plate 32A, so that it was impossible to release a molded article from the mold.

Comparative Example 19D

Example 19 was repeated except that the amount (ΔS) of overlapping of the cover plate 32A and the insert block 30A was changed to 0.05 mm. As a result, a cracking occurred on a peripheral portion of the insert block 30A, and after 5th cycle, the insert block underwent cracking.

Example 20

In Example 20, the same mold assembly as that used in Example 19 was used, except that the insert block 30A was formed of ZrO$_2$ and had a cavity wall 31A having the surface roughness R$_{max}$ of 0.03 μm with lapping. ZrO$_2$ has a thermal conductivity of 0.8×10$^{-2}$ cal/cm.sec.°C.

With this mold assembly, under the following injection-molding conditions, the same polyoxymethylene resin as a crystalline thermoplastic resin as that used in Example 19 was injected into the cavity 40A through the gate portion 13, and the cavity 40A was completely filled with the molten resin. Twenty seconds after the completion of the injection, a molded article was released from the mold. The molded article had an excellent appearance having a high mirror property as far as end portions of the molded article Molding Conditions Mold temperature: 110° C.

Resin temperature: 200° C.

Injection pressure: 680 kgf/cm$^2$-G

Example 21

Example 21 is concerned with the fourth production method in the method of producing a molded article directed to the first aspect of the present invention. Specifically, Example 21 is concerned with the method of producing a molded article from a polymer alloy.

An insert block 30A used in Example 21 was formed of the same glass-ceramics (crystallinity:70%) as that used in Example 4. The insert block 30A had a size of 271.00 mm (length)×81.00 mm (width)×4.00 mm (thickness). The structure of the mold assembly in Example 21 was the same as that shown in FIG. 5. The insert block attaching portion 11A provided in the core 12A had an inner dimension of 271.20 mm×81.20 mm. The insert block 30A was temporarily bonded to the insert block attaching portion 11A of the core 12 with a two-package epoxy adhesive (not shown). The clearance (D) between the insert block 30A and the insert block attaching portion 11A was measured with a spacer gauge to show a lowest clearance of 0.05 mm. After the above adhesion bonding, a cavity wall 31A of the insert block 30A was lapped and finished with diamond lapping and cerium oxide lapping. The cavity wall 31A of the insert block 30A had surface roughness R$_{max}$ of 0.02 μm. Then, the core 12 was attached to the fixed mold member 10A.

A cover plate 32A was formed from carbon steel S55C. The cover plate 32A had an inner dimension of 270.00 mm×80.00 mm. The cover plate 32A was fixed to the fixed mold member 10A with bolts (not shown). The average clearance (C) between the insert block 30A and the cover plate 32A was 0.019 mm. The amount (ΔS) of overlapping of the cover plate 32A and the insert block 30A was 0.5 mm. A movable mold member 20A was formed from carbon steel S55C. A mold assembly was assembled with the movable mold member 20A and the fixed mold member 10A. The cavity 40A had a size of 270.00 mm×80.00 mm×2.00 mm and the molded article obtained had a size of 270 mm×80 mm×2 mm.

The completed mold assembly was attached to an injection molding machine. When the mold assembly was heated up to 130° C. and then rapidly cooled to 40° C. with a mold temperature controller, the insert block 30A formed of glass-ceramics did not have any damage such as cracking.

The same injection molding machine as that used in Example 8 was use. The mold assembly was heated to 80° C., and under the following injection-molding conditions, a modified PPE resin as a polymer alloy (AH20 supplied by Mitsubishi Engineering-Plastics Corp.) was injected into the cavity 40A through the gate portion 13, and the cavity 40A was completely filled with the molten resin. Twenty seconds after the completion of the injection, a molded article was released from the mold. The molded article had excellent gloss on its surface as far as end portions of the molded article. The molded article was measured for glossiness with a digital type angle-of-deflection gloss-meter (model UGV- 5D, manufactured by Suga Testing Machines) to show that the glossiness was as high as 99%. The above molding was repeated in 10000 cycles to show that the insert block 30A had no damage such as cracking.

Molding Conditions

Mold temperature: 80° C.

Resin temperature: 280° C.

Injection pressure: 600 kgf/cm$^2$-G

Comparative Example 21A

Comparative Example 21A used a mold assembly provided with a mold formed from Stavax steel and having a surface-finished cavity wall. The mold assembly used in Comparative Example 21A had the same structure as that of the mold assembly used in Example 21 except that an insert block and a cover plate were not provided. With this mold assembly, an attempt was made to injection-mold the same crystalline thermoplastic as that used in Example 21 under the same conditions as those in Example 21.

The molten resin failed to fill in the cavity completely, since the molten resin had poor flowability. The injection pressure was increased by 100 kgf/cm$^2$-G, or the injection-molding was carried out at an injection pressure of 700 kgf/cm$^2$-G. The resultant molded article had poor gloss and had a flow mark on its surface. The molded article was measured for glossiness to show that the glossiness was 22%.

Comparative Example 21B

Comparative Example 21B used the same mold assembly as that used in Example 21 except that no cover plate was used. With this mold assembly, an attempt was made to injection-mold the same crystalline thermoplastic resin as that used in Example 21 under the same conditions as those in Example 21. The obtained molded article was poor in appearance of circumferential portions and had mold flashes on the circumferential portions. After 15th cycle, the insert block 30A underwent cracking.

Comparative Example 21C

Example 21 was repeated except that the clearance (C) between the cover plate 32A and the insert block 30A was changed to 0.04 mm. The molten resin penetrated a space between the insert block 30A and the cover plate 32A, so that it was impossible to release a molded article from the mold.

Comparative Example 21D

Example 21 was repeated except that the amount (ΔS) of overlapping of the cover plate 32A and the insert block 30A was changed to 0.05 mm. As a result, a cracking occurred on a peripheral portion of the insert block 30A, and after 5th cycle, the insert block underwent cracking.

Example 22

Examples 22 to 25 are concerned with the fifth production method in the method of producing a molded article directed to the first aspect of the present invention. Examples 22 to 24 use, as a thermoplastic resin, a crystalline thermoplastic resin containing aluminum flakes or chromium oxide powder. Example 25 uses, as a thermoplastic resin, an amorphous thermoplastic resin containing chromium oxide powder.

An insert block 30A used in Example 22 was formed of the same glass-ceramics (crystallinity:70%) as that used in Example 4. The insert block 30A had a size of 100.00 mm (length)×100.00 mm (width)×4.00 mm (thickness). The structure of the mold assembly in Example 22 was the same as that shown in FIG. 5. The insert block attaching portion 11A provided in the core 12A had an inner dimension of 100.20 mm×100.20 mm×4.02 mm (depth). The insert block 30A was temporarily bonded to the insert block attaching portion 11A of the core 12 with a two-package epoxy adhesive (not shown). The clearance (D) between the insert block 30A and the insert block attaching portion 11A was measured with a spacer gauge to show a lowest clearance of 0.05 mm. After the above adhesion bonding, a cavity wall 31A of the insert block 30A was lapped and finished with diamond lapping and cerium oxide lapping. The cavity wall 31A of the insert block 30A had a surface roughness R$_{max}$ of 0.02 μm. Then, the core 12A was attached to the fixed mold member 10A. A cover plate 32A was formed from carbon steel S55C. The cover plate 32A had an inner dimension of 98.00 mm×98.00 mm. The cover plate 32A was fixed to the fixed mold member 10A with bolts (not shown). The average clearance (C) between the insert block 30A and the cover plate 32A was 0.019 mm. The amount (ΔS) of overlapping of the cover plate 32A and the insert block 30A was 1.0 mm. A movable mold member 20A was formed from carbon steel S55C. A mold assembly was assembled with the movable mold member 20A and the fixed mold member 10A. The cavity 40A had a size of 98.00 mm×98.00 mm×2.00 mm and the molded article obtained had a plate-like shape having a size of 98 mm×98 mm×2 mm.

The completed mold assembly was attached to an injection molding machine. When the mold assembly was heated up to 130° C. and then rapidly cooled to 40° C. with a mold temperature controller, the insert block 30A formed of glass-ceramics did not have any damage such as cracking.

The same injection molding machine as that used in Example 8 was use. The mold assembly was heated to 60° C. A polyamide 6 resin as a crystalline thermoplastic resin (Novamid 1012 supplied by Mitsubishi Engineering-Plastics Corp.) containing aluminum flakes of 20% by weight was used for forming a molded article. The aluminum flakes were measured for an average thickness and an average size, with an image analysis apparatus to show that the average thickness was 15 μm and the average size (diameter) was 60 μm. Pellets of polyamide 6 resin containing aluminum flakes were carbonized, and then the obtained aluminum flakes were measured for an average thickness and an average size to show that the average thickness was 15 μm and the average size (diameter) was 55 μm.

Under the following injection-molding conditions, the molten thermoplastic resin containing aluminum flakes was injected into a cavity 40A through a gate portion 13, and the cavity 40A was completely filled with the molten resin. Twenty seconds after the completion of the injection, a molded article was released from the mold. The surface of the molded article (surface which had been in contact with the cavity wall 31A of the insert block 30A) had a deeply and glossily metallic color tone. The above molding was repeated in 10000 cycles to show that the insert block 30A had no damage such as cracking.

Molding Conditions

Mold temperature: 80° C.

Resin temperature: 260° C.

Injection pressure: 600 kgf/cm$^2$-G

Figure 9:
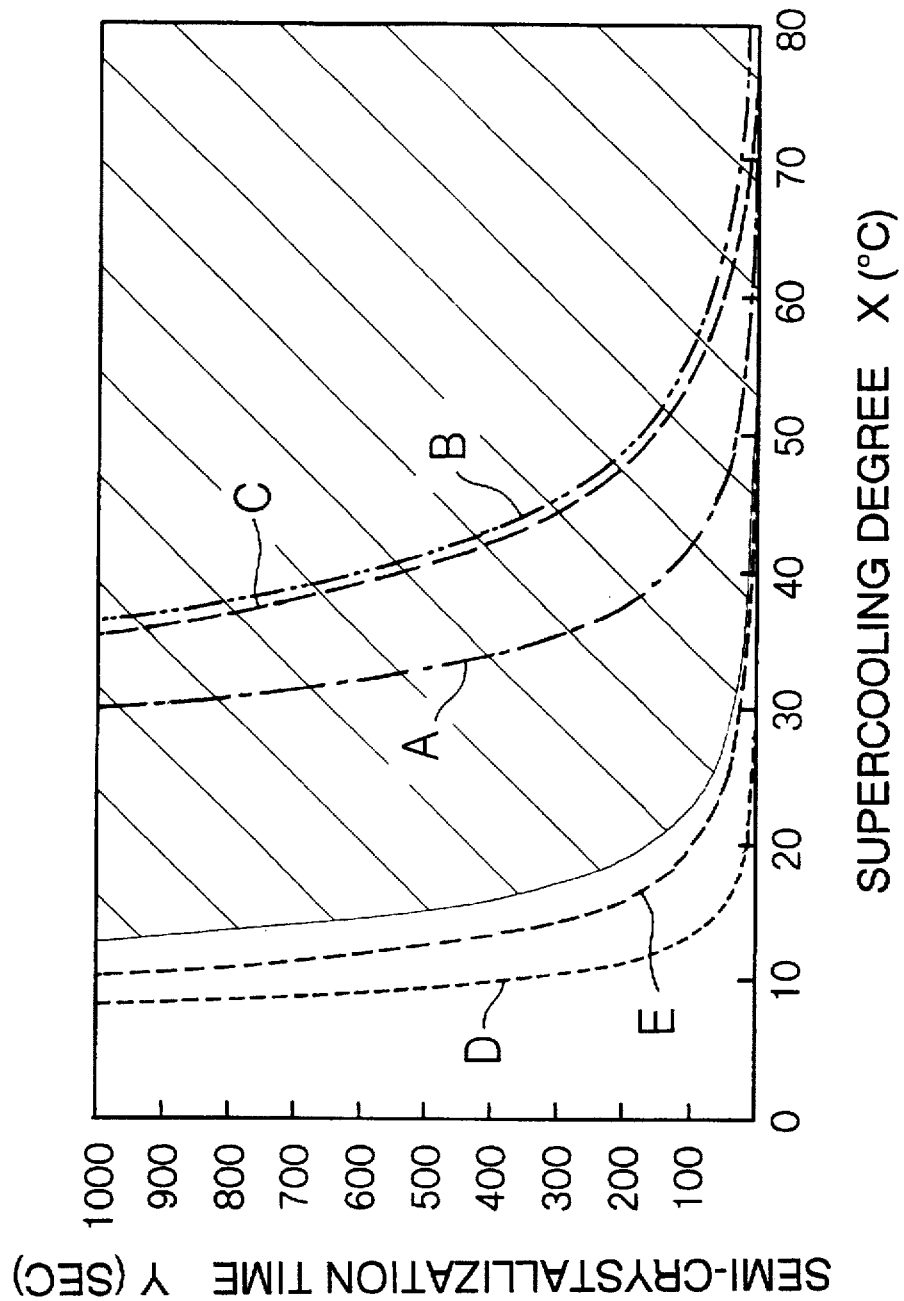
FIG. 9 shows the relationship between the supercooling degree (X) and a semi-crystallization time (Y) of a crystalline thermoplastic resin.

The thermoplastic resin containing aluminum flakes used in Example 22 was measured for a crystallinity, with a Depolarization Light Intensity Crystallization Rate analyzer (model MK-807, manufactured by Kotaki Kabushiki Kaisha). The result is shown by the curve "A" in FIG. 9.

Comparative Example 22A

Comparative Example 22A used a mold assembly provided with a mold formed from Stavax steel and having a surface-finished cavity wall. The mold assembly used in Comparative Example 22A had the same structure as that of the mold assembly used in Example 22 except that an insert block and a cover plate were not provided. With this mold assembly, an attempt was made to injection-mold the same crystalline thermoplastic resin containing aluminum flakes as that used in Example 22 under the same conditions as those in Example 22. However, the molten resin failed to fill in the cavity completely, since the molten resin had poor flowability. The injection pressure was increased by 100 kgf/cm$^2$-G, or the injection-molding was carried out at an injection pressure of 700 kgf/cm$^2$-G. Aluminum flakes were deposited on the surface of the resultant molded article, and the molded article had poor gloss and had a surface far from a deep and glossy appearance.

Comparative Example 22B

Comparative Example 22B used the same mold assembly as that used in Example 22. A polyoxymethylene resin (F20-03 supplied by Mitsubishi Engineering-Plastics Corp.) containing aluminum flakes of 20% by weight was used for forming a molded article. The aluminum flakes were measured for an average thickness and an average size to show that the average thickness was 15 μm and the average size (diameter) was 60 μm. The molded article was formed under the following injection-molding conditions. The thermoplastic resin containing aluminum flakes used in Comparative Example 22B was measured for a crystallinity. The result is shown by the curve "D" in FIG. 9. In the polyoxymethylene resin containing aluminum flakes used in Comparative Example 22B, the relationship between the supercooling degree (X) and the semi-crystallization time (Y) does not satisfy the formula (1). As a result, aluminum flakes were deposited on the surface of the resultant molded article, and the molded article had poor gloss and had a surface far from a deep and glossy appearance.

Molding Conditions

Mold temperature: 60° C.

Resin temperature: 200° C.

Injection pressure: 500 kgf/cm$^2$-G

Comparative Example 22C

Comparative Example 22C used the same mold assembly as that used in Example 22. A polybutylene terephthalate (PBT) resin (5710 supplied by Mitsubishi Engineering-Plastics Corp.) containing aluminum flakes of 20% by weight was used for forming a molded article. The aluminum flakes were measured for an average thickness and an average size to show that the average thickness was 15 μm and the average size (diameter) was 60 μm. The molded article was formed under the following injection-molding conditions. The PBT resin containing aluminum flakes used in Comparative Example 22C was measured for a crystallinity. The result is shown by the curve "E" in FIG. 9. In the PBT resin containing aluminum flakes used in Comparative Example 22C, the relationship between the supercooling degree (X) and the semi-crystallization time (Y) does not satisfy the formula (1). As a result, aluminum flakes were deposited on the surface of the resultant molded article, and the molded article had poor gloss and had a surface far from a deep and glossy appearance.

Molding Conditions

Mold temperature: 60° C.

Resin temperature: 250° C.

Injection pressure: 550 kgf/cm$^2$-G

Example 23

Example 23 used the same mold assembly as that used in Example 22 except that the insert block 30A was formed of $ZrO_2$—$Y_2O_3$. A polyethylene terephthalate (PET) resin (6010G15 supplied by Mitsubishi Engineering-Plastics Corp., containing a glass fiber of 15% by weight) containing aluminum flakes of 20% by weight was used for forming a molded article. The aluminum flakes were measured for an average thickness and an average size to show that the average thickness was 15 μm and the average size (diameter) was 60 μm. The molded article was formed under the following injection-molding conditions. Twenty seconds after the completion of the injection, a molded article was released from the mold.

Molding Conditions

Mold temperature: 100° C.

Resin temperature: 280° C.

Injection pressure: 600 kgf/cm$^2$-G

The surface of the molded article (surface which had been in contact with the cavity wall 31A of the insert block 30A) had a deeply and glossily metallic color tone, and aluminum flakes and glass fibers were not deposited on the surface of the molded article. The PET resin containing aluminum flakes and containing a glass fiber used in Example 23 was measured for a crystallinity. The result is shown by the curve "B" in FIG. 9.

Comparative Example 23A

Comparative Example 23A used the same mold assembly as that used in Example 23. A polyamide 6 resin (1012 supplied by Mitsubishi Engineering-Plastics Corp.) containing aluminum flakes of 20% by weight was used for forming a molded article. The aluminum flakes were measured for an average thickness and an average size to show that the average thickness was 30 μm and the average size (diameter) was 1.2 mm. The molded article was formed under the same injection-molding conditions as those in Example 22. Aluminum flakes were deposited on the surface of the resultant molded article, and the molded article had poor gloss and had a surface far from a deep and glossy appearance.

Comparative Example 23B

Comparative Example 23B used the same mold assembly as that used in Example 23. A polyamide 6 resin (1012 supplied by Mitsubishi Engineering-Plastics Corp.) containing aluminum flakes of 20% by weight was used for forming a molded article. The aluminum flakes were measured for an average thickness and an average size to show that the average thickness was 250 μm and the average size (diameter) was 50 μm. The molded article was formed under the same injection-molding conditions as those in Example 22. Aluminum flakes were deposited on the surface of the resultant molded article, and the molded article had poor gloss and had a surface far from a deep and glossy appearance.

Example 24

Example 24 used the same mold assembly as that used in Example 22, except that the insert block 30A was formed of $ZrO_2$—$Y_2O_3$. A polyethylene terephthalate (PET) resin (6010G15 supplied by Mitsubishi Engineering-Plastics Corp., containing a glass fiber of 15% by weight) containing chromium oxide powder of 20% by weight was used for forming a molded article. The chromium oxide powder was measured for an average particle diameter to show that the average particle diameter was 15 μm.

Under the following injection-molding conditions, the molten thermoplastic resin containing chromium oxide powder was injected into the cavity 40A through the gate portion 13, and the cavity 40A was completely filled with the molten resin. Twenty seconds after the completion of the injection, a molded article was released from the mold. The surface of the molded article (surface which had been in contact with the cavity wall 31A of the insert block 30A) had a deeply and glossily metallic color tone. Metallic powder and glass fibers were not deposited on the surface of the molded article. The above molding was repeated in 10000 cycles to show that the insert block 30A had no damage such as cracking. The PET resin containing chromium oxide powder and a glass fiber used in Example 24 was measured for a crystallinity. The result is shown by the curve "C" in FIG. 9.

Molding Conditions

Mold temperature: 100° C.

Resin temperature: 280° C.

Injection pressure: 600 kgf/cm²-G

Example 25

Example 25 used the same mold assembly as that used in Example 22, except that the insert block 30A was formed of $ZrO_2$—$Y_2O_3$. A polycarbonate resin as an amorphous thermoplastic resin (S3000 supplied by Mitsubishi Engineering-Plastics Corp.) containing chromium oxide powder of 20% by weight was used for forming a molded article. The chromium oxide powder was measured for an average particle diameter to show that the average particle diameter was 15 μm.

Under the following injection-molding conditions, the molten thermoplastic resin containing chromium oxide powder was injected into the cavity 40A through the gate portion 13, and the cavity 40A was completely filled with the molten resin. Twenty seconds after the completion of the injection, a molded article was released from the mold. The surface of the molded article (surface which had been in contact with the cavity wall 31A of the insert block 30A) had a deeply and glossily metallic color. The above molding was repeated in 10000 cycles to show that the insert block 30A had no damage such as cracking.

Molding Conditions

Mold temperature: 60° C.

Resin temperature: 280° C.

Injection pressure: 600 kgf/cm²-G

Example 26

Examples 26 and 27 are concerned with the method of producing a molded article directed to the second aspect of the present invention (injection compression molding method). Examples 26 to 27 are concerned with the mold assembly directed to the second aspect of the present invention.

Figure 11A:
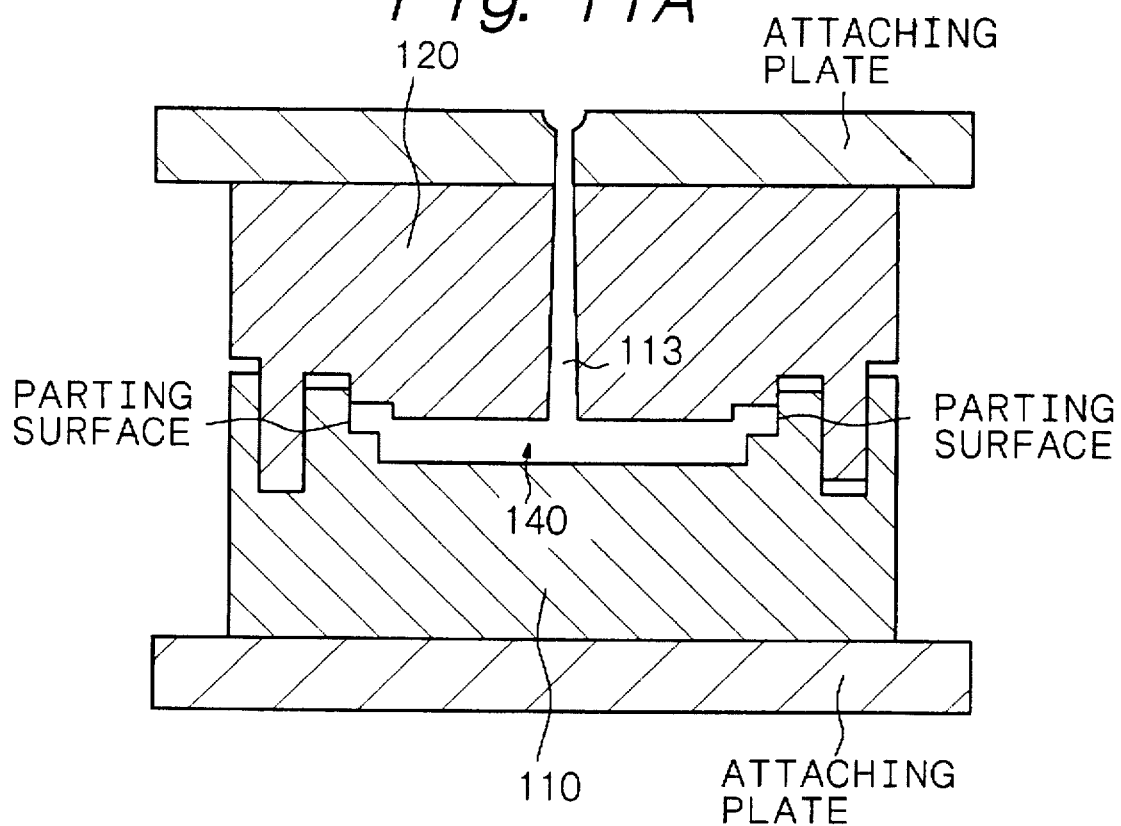
FIGS. 11A and 11B show a state of a closed mold assembly before the injection of a molten resin and a state of the mold assembly after the completion of the injection of a molten resin in Example 26.
Figure 11B:
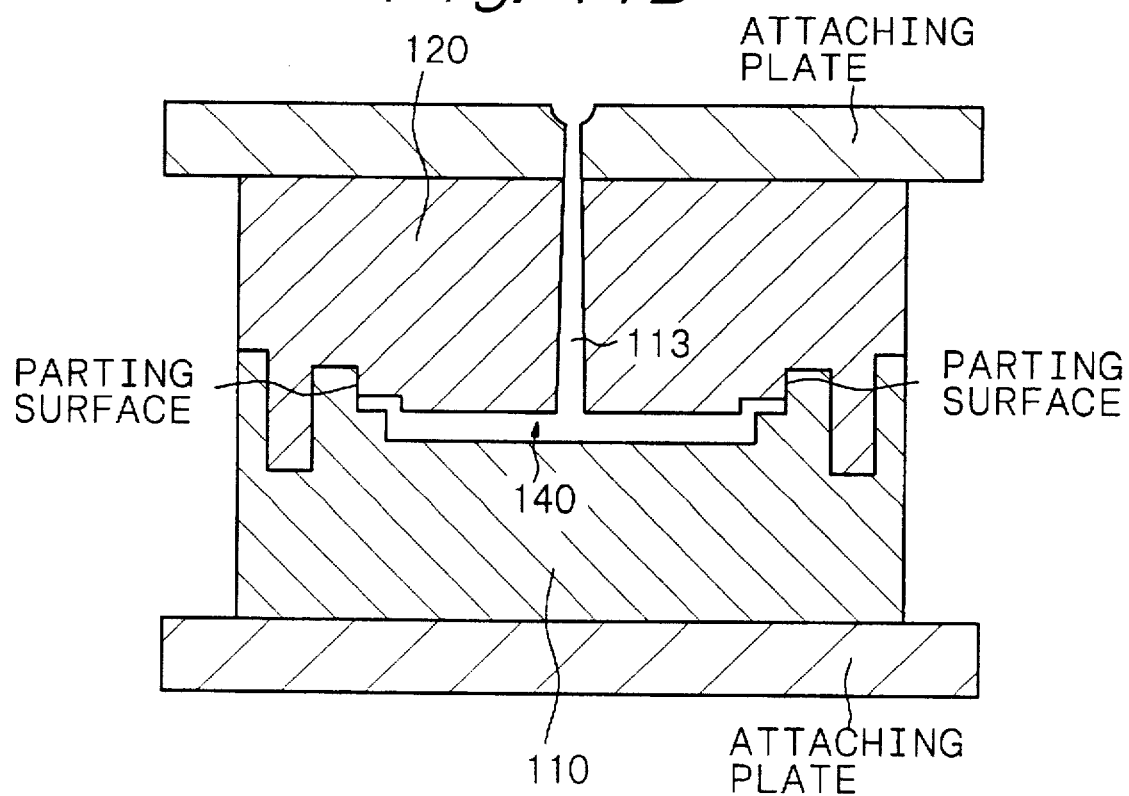

FIG. 10 schematically shows the mold assembly as a whole in Example 26. The mold is constituted of a first mold member 110 (corresponding to a female mold or a cavity member, and to a movable mold member in Example 26) and a second mold member 120 (corresponding to a male mold or a core member, and to a fixed mold member in Example 26). The first and second mold members 110 and 120 are attached to attaching plates, respectively, and the mold can be closed and opened, while FIG. 10 omits the detailed showing of the mechanism for closing and opening the mold. Further, the mold assembly is attached to an injection molding machine, while FIG. 10 also omits the showing of the injection molding machine. When the mold is closed, a cavity 140 for forming a molded article from a thermoplastic resin is formed inside the mold. FIG. 10 shows a state where the mold is opened. FIG. 11A shows a state (Δt>0) where the mold is closed before the injection of a molten resin, and FIG. 11B shows a state (Δt=0) where the first mold member 110 and the second mold member 120 are arranged while the resin (not shown) in the cavity is cooled after the completion of the injection of the molten resin. Numeral 113 indicates a molten resin injection portion formed in the second mold member 120.

Figure 12:
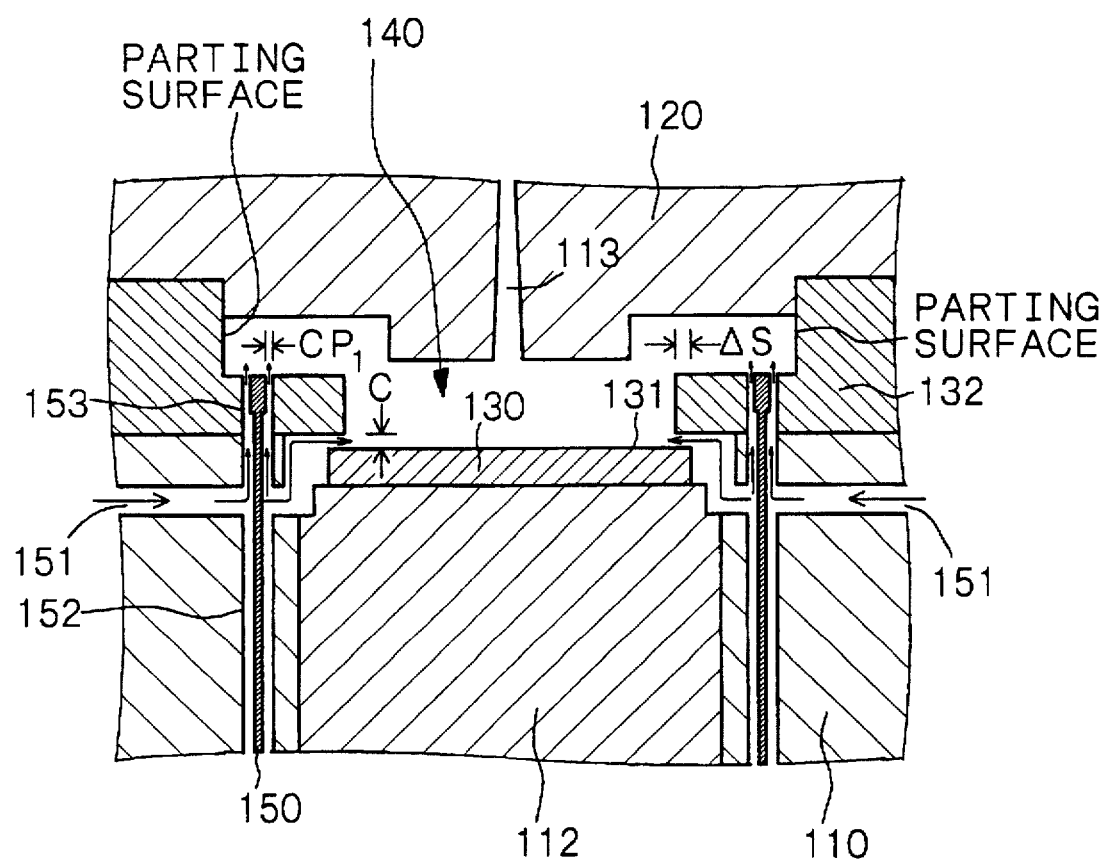
FIG. 12 is a schematic enlarged cross section of a cavity area of the mold assembly in Example 26.

FIG. 12 shows a schematic cross section of the mold assembly in which the cavity 140 and its vicinity are enlarged. In Example 26, an insert block 130 is disposed in the first mold member 110 and constitutes part of the cavity wall. In Example 26, a cavity wall 131 of the insert block 130 constitutes all the cavity wall on the force side part (the first mold member side). In Example 26, the insert block 130 is attached to a core 112.

A cover plate 132 formed from carbon steel S55C is attached to the first mold member 110 in which the insert block 130 is disposed, with bolts (not shown). The cover plate 132 covers peripheral portions of the insert block 130 in a non-contact state in which the amount of overlapping= ΔS and clearance=C, and the cover plate 132 constitutes part of cavity wall.

The first mold member 110 and the cover plate 132 are provided with knock-out pin insertion holes 152 and 153, and the knock-out pins 150 are inserted in these knock-out pin insertion holes 152 and 153. The top end of the knock-out pin 150 faces the cavity 140. The bottom end of the knock-out pin 150 is attached to an actuation apparatus (not shown) comprising, for example, a hydraulic cylinder.

The first mold member 110 has a fluid introduction portion 151. The fluid introduction portion 151 is communicated with a fluid source (not shown) through a tubing (not shown). In this structure, a fluid can be flowed through a space between the knock-out pin 150 and the first mold member 110 (specifically, a space between the knock-out pin 150 and the wall of the knock-out pin insertion hole 153) after a molded article is produced and when a molded article is released from the first mold member 110 with the knock-out pin 150 after the mold is opened. At the same time, a fluid can be flowed through a space between the first mold member 110 and the core 112 and through a space between the insert block 130 and the cover plate 132. The knock-out pin 150 and the first mold member 110 (specially, the knock-out pin 150 and the wall of the knock-out pin insertion hole 153) have a clearance of $CP_1$. Some resins obviate the formation of the fluid introduction portion. It is sometimes not required to flow a fluid through a space between the knock-out pin 150 and the first mold member 110 (specifically, a space between the knock-out pin 150 and the wall of the knock-out pin insertion hole 153)

FIGS. 13A, 13B, 14A and 14B show the steps of assembling the mold assembly in Example 26.

Figure 13A:
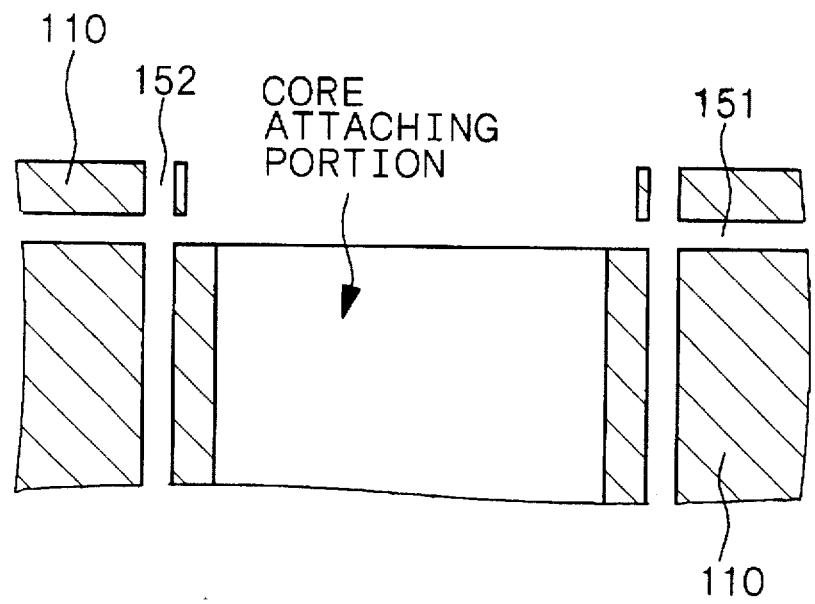
FIGS. 13A and 13B are schematic partial cross sections of a mold, etc., showing the assembly steps of the mold assembly in Example 26.

As shown in a schematic partial cross section of FIG. 13A, the first mold member 110 of carbon steel S55C is produced such that a portion (core attaching portion) has a dimension of 105.00 mm×105.00 mm for attaching the core 112. The fluid introduction portion 151 is formed by boring the first mold member 110. Further, the knock-out pin insertion hole 152 having a diameter of 4.00 mm is formed in the first mold member 110. The fluid introduction portion 151 communicates with the knock-out pin insertion hole 152 and is open to the core attaching portion.

The core 112 of carbon steel S55C is prepared. The vicinity of the top surface of the core 112 to which the insert block 130 is to be disposed had a cross-sectional dimension of 103.00 mm×103.00 mm. The lower portion of the core 112 had a cross-sectional dimension of 105.00 mm×105.00 mm. The insert block 130 was disposed to the top surface of the core 112 with an epoxy-containing adhesive (not shown). The insert block 130 was formed of $ZrO_2$—$Y_2O_3$ and had the form of a sheet having a size of 101.00 mm×101.00 mm×4.00 mm (thickness). The cavity wall 131 of the insert block 130 was lapped and finished with diamond lapping and cerium oxide lapping to have a surface roughness $R_{max}$ of 0.02 μm.

Figure 13B:
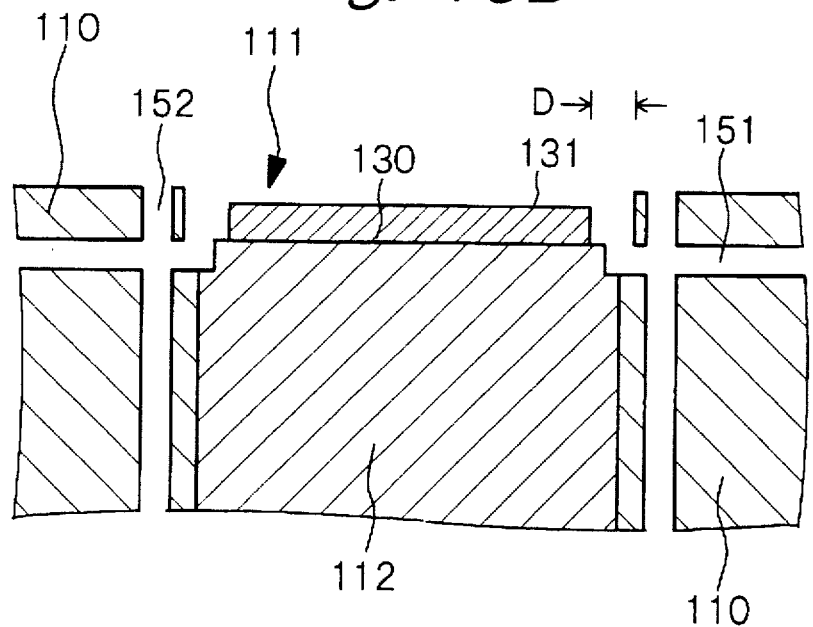

Then, the core 112 was fixed to the first mold member 110 (see a schematic partial cross section of FIG. 13B). The clearance (D) between the insert block attaching portion 111 and the insert block 130 is preferably at least 0.5 mm. The term "clearance (D)" refers to a space between the side wall of the insert block attaching portion 111 and the side face of the insert block 130. When the value of D is less than 0.5 mm, the resistance is large and it may be difficult to flow the fluid through the space between the insert block attaching portion 111 and the insert block 130. Although not specially limited, the upper limit of the value of D is preferably about 10 mm in view of the structure and design of the mold. In Example 26, the value of D was 4 mm.

Figure 14A:
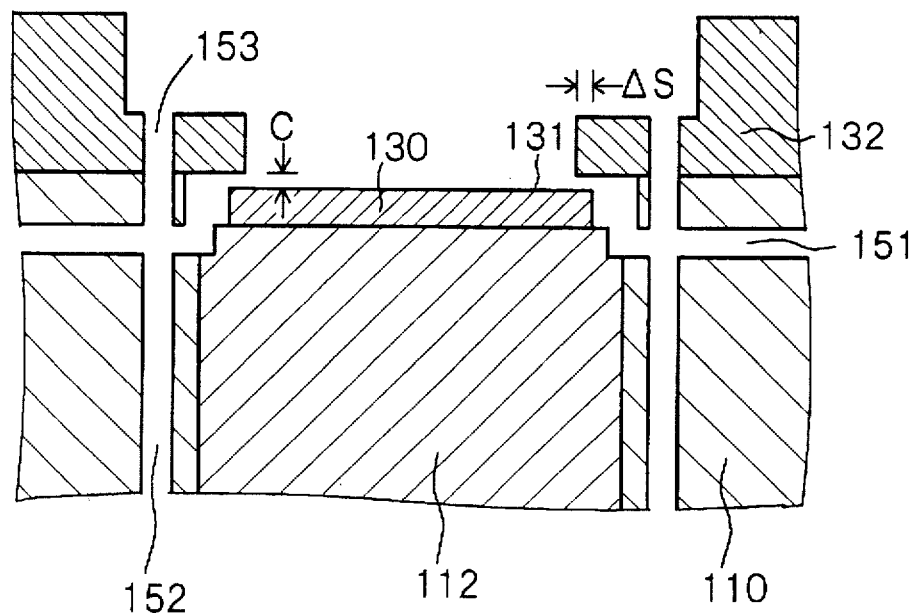
FIGS. 14A and 14B are schematic partial cross-sectional views of a mold, etc., showing the steps of assembling the mold assembly in Example 26 subsequent to FIG. 13B.

Then, the cover plate 132 of carbon steel S55C was fixed to the first mold member 110 with bolts (not shown) such that the average clearance (C) between the cover plate 132 and the cavity wall 131 of the insert block 130 was 0.02 mm and that the amount ($\Delta S$) of overlapping of the cover plate 132 and the peripheral portion of the insert block 130 was 0.5 mm (see a schematic partial cross section of FIG. 14A). The cover plate 132 had a knock-out pin insertion hole 153 which registered with the knock-out pin insertion hole 152 of the first mold member 110.

The second mold member 120 was formed from carbon steel S55C. As shown in FIG. 12, in Example 26, the end surface (side surface) of the cover plate 132 attached to the first mold member 110 and the parting surface of the second mold member 120 formed a telescopic (nesting) structure.

Figure 14B:
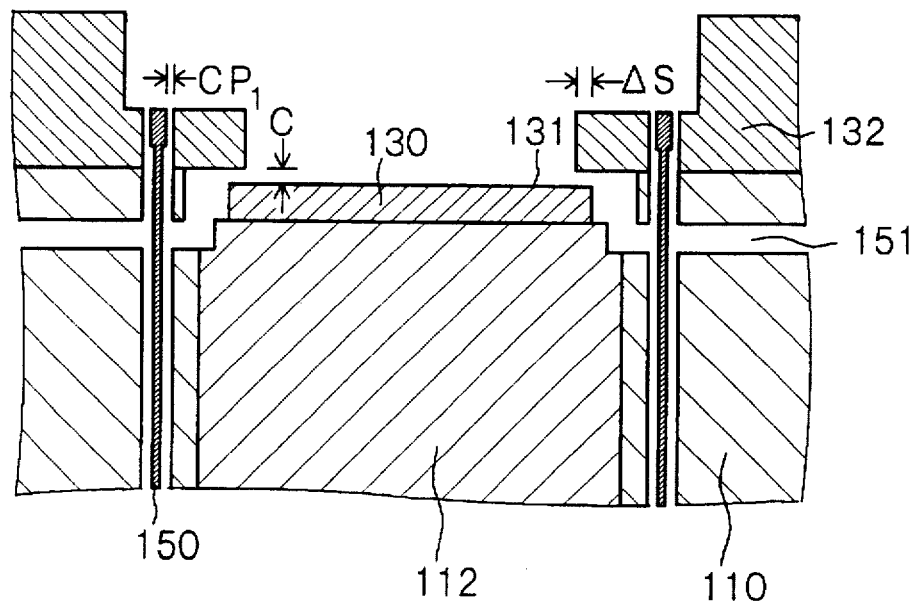
Figure 15:
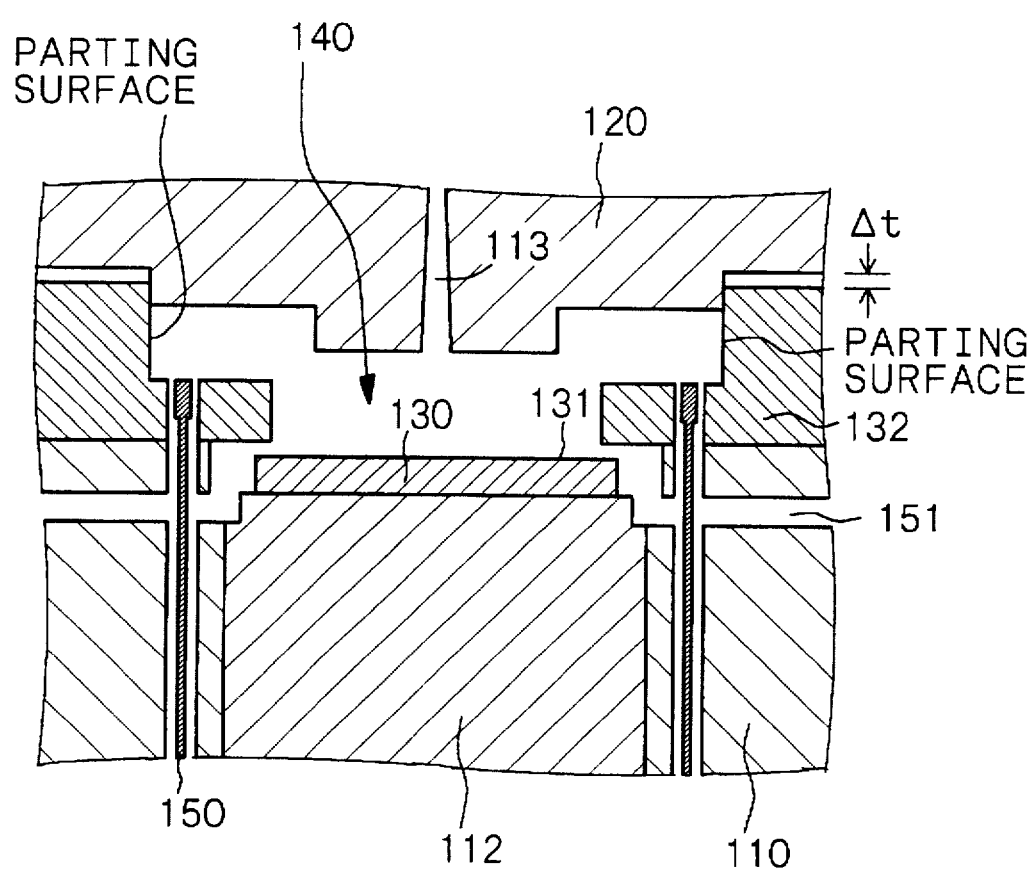
FIG. 15 is a schematic cross section of the molded article in Example 26 just after the mold is closed.

Finally, the knock-out pin 150 was inserted into the knock-out pin insertion hole 152 of the first mold member 110 to complete the mold assembly (see schematic partial cross sections of FIGS. 14B and 15). That portion of the knock-out pin 150 which extended 20 mm from its top portion had a diameter of 3.98 mm, and the knock-out pin 150 and the first mold member 110 therefore had a clearance ($CP_1$) of 0.01 mm. The other portion of the knock-out pin 150 had a diameter of 3.0 mm.

A molded article was to have the form of a flat plate having a size of 100×100 mm and a thickness of 4 mm, excluding a circumferential portion.

The above-completed mold assembly was set in an injection molding machine, and when the mold assembly was heated up to 130° C. and then rapidly cooled to 40° C., the insert block 130 underwent no cracking or had no problem.

The mold assembly was set in a prestrol injection molding machine supplied by Toshiba Machinery Co., Ltd., and heated to 100° C. As a thermoplastic resin which was a raw material, there was used a polyoxymethylene resin containing 10% by weight of a fluorine resin (FL2010, supplied by Mitsubishi Engineering-Plastics Corp.).

First, the first mold member 110 and the second mold member 120 were closed such that the cavity 140 had a greater volume ($V_c$) than the volume ($V_M$) of a molded article to be produced. Specifically, the thickness to of the molded article was 4 mm, and the distance $t_0$ of the cavity 140 in the thickness direction of the molded article when the mold was closed was 6 mm. That is, $\Delta t = t_1 - t_0 = 2$ mm. FIG. 15 is a schematic cross section showing the above state.

Figure 16:
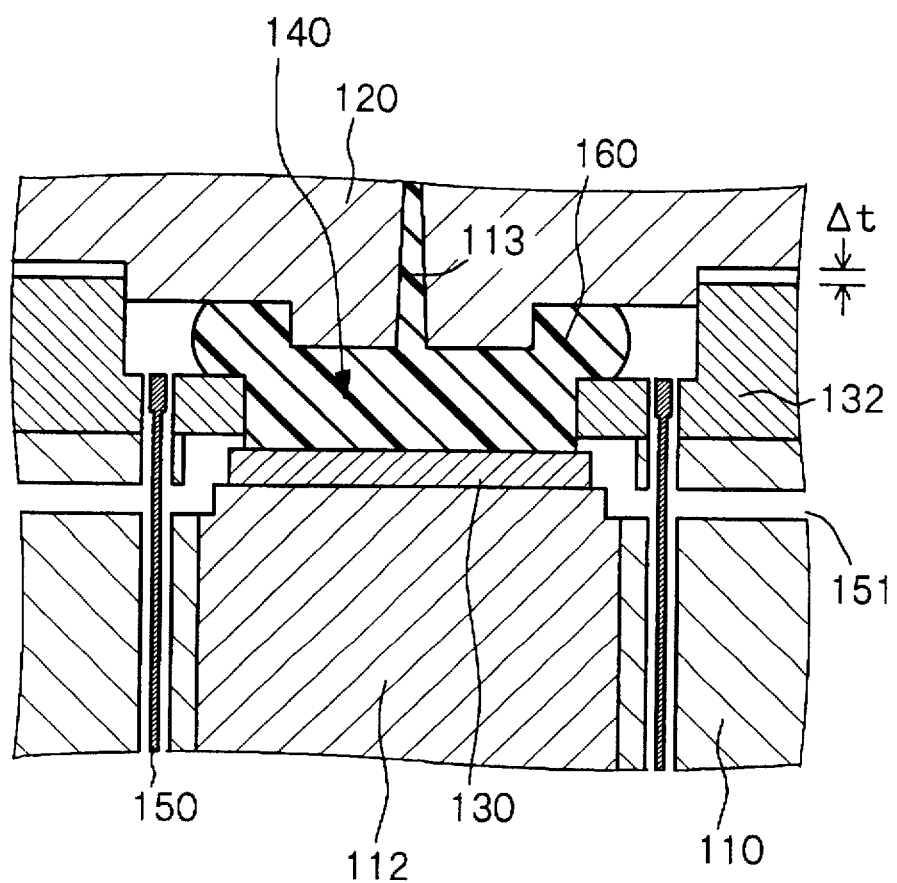
FIG. 16 is a schematic cross section of the mold assembly showing a state just before the completion of the injection of a molten resin into the cavity in Example 26.
Figure 17:
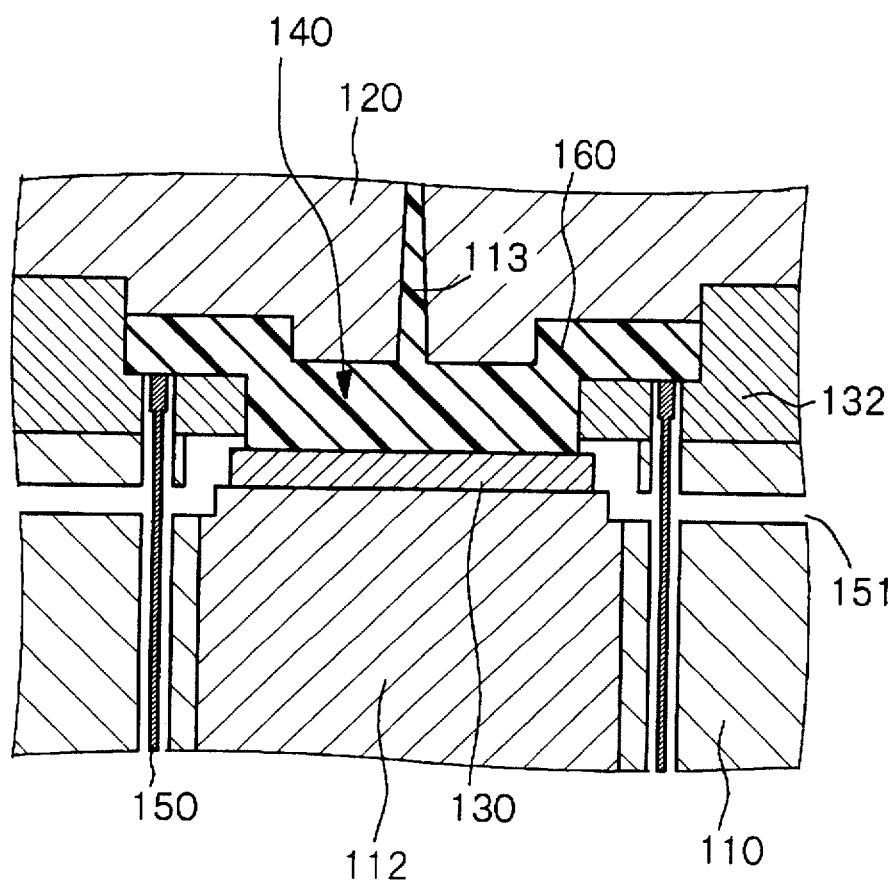
FIG. 17 is a schematic cross section of the mold assembly showing a state in which the resin in the cavity is being cooled in Example 26.

Then, a molten resin 160 was injected into the cavity (volume: $V_c$) 140 through the molten resin injection portion 113 provided on the second mold member 120 from an injection cylinder (not shown) at a resin temperature of 190° C. and at an injection pressure of 200 kgf/cm². FIG. 16 is a schematic cross section showing a state just before the completion of the injection of the molten resin 160 into the cavity 140. At the point of time when the injection of the molten resin was completed, the decreasing of the volume of the cavity 140 was initiated, and after the passage of a predetermined period of time, the volume of the cavity 140 was decreased to the volume ($V_M$) of the mold to be produced. Specifically, the first mold member 110 was moved until the distance of the cavity 140 in the thickness direction of the molded article became 4 mm, and the mold was closed (the resin was compressed). FIG. 17 is a schematic cross section showing the above state. The amount of the molten resin to be injected into the cavity 140 was set such that the cavity was completely filled with the molten resin when the volume of the cavity 140 was decreased to the volume ($V_M$) of the molded article to be produced.

Figure 18A:
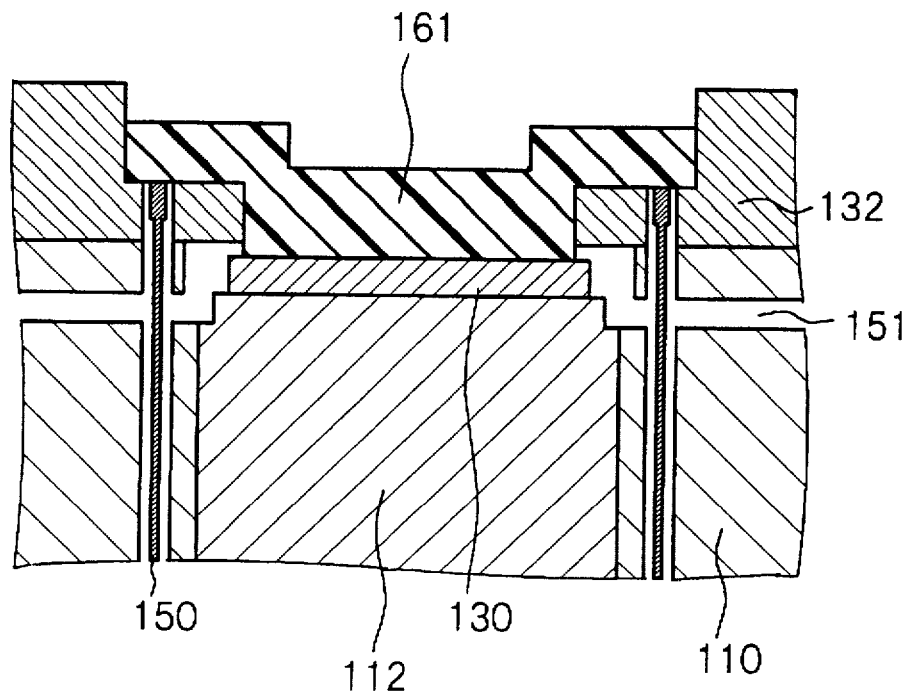
FIGS. 18A and 18B are schematic cross sections of the mold assembly showing states in which the mold is opened and a molded article is released from the mold.
Figure 18B:
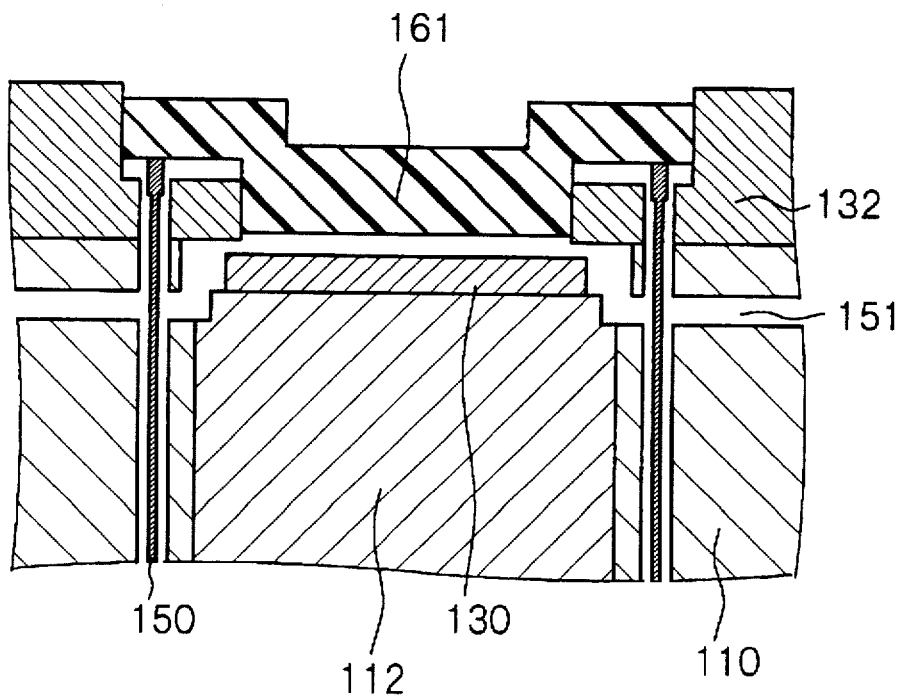

The resin in the cavity 140 was cooled for 30 seconds after the completion of the injection, and then the mold was opened. FIG. 18A is a schematic cross section showing this state. FIGS. 18A and 18B omit the showing of the second mold member 120. Then, the molded article 161 was released from the first mold member 110 with the knock-out pin 150. FIG. 18B is a schematic cross section showing this state. In Example 26, since the wettability between the polyoxymethylene resin and the insert block 130 was not high, the molded article was easily come away from the insert block 130. The molded article had a very fine appearance. Further, the molded article had no sink mark even on its edge portion, and it was excellent in smoothness and flatness. Further, the molding was carried out 10000 cycles, while the insert block 130 underwent no damage such as cracking.

Example 27

Example 27 used the same mold assembly as that used in Example 26. As a thermoplastic resin, unlike Example 26, there was used a polycarbonate resin containing 10% by weight of a glass fiber (GS2010M, supplied by Mitsubishi Engineering-Plastics Corp.). The same molding conditions as those in Example 26 were employed except that the resin temperature was set at 300° C. and that the injection pressure was set at 200 kgf/cm².

Figure 19:
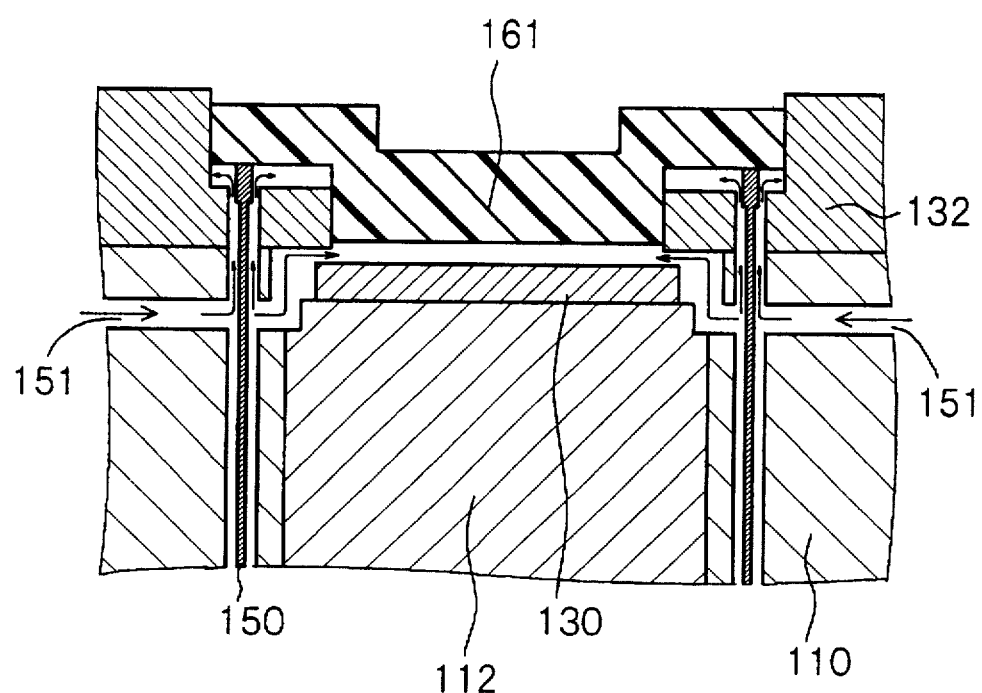
FIG. 19 are a schematic cross section of a mold assembly showing a state in which a molded article is released from the mold.

When a polycarbonate resin is used as a thermoplastic resin, the wettability between the molten resin 160 and the insert block 130 improves and a vacuum state is therefore formed between the resin (molded article) and the cavity wall 131 of the insert block 130, which makes it very difficult to release the molded article from the insert block 130. For avoiding the above phenomenon, after the first mold member 110 and the second mold member 120 were released from each other, a fluid of compressed air having a pressure of 7 kg/cm²-G was flowed through the fluid introduction portion 151 from the fluid source (not shown) comprising an air compressor and through the space between the knock-out pin 150 and the first mold member 110, and concurrently flowed through the space between the first mold member 110 and the core 112 and through the space between the insert block 130 and the cover plate 132. Under the above flow of the compressed air, a molded article 161 was released from the first mold member 110 with the knock-out pin 150. FIG. 19 is a schematic cross section showing the above state.

The molded article 161 was easily released from the insert block 130, and the molded article 161 was therefore easily released from the first mold member 110. The surface of the molded article was free of any deposition of a glass fiber, and the molded article had a very fine appearance. Further, the molded article had no sink mark even on its edge portion, and it was excellent in smoothness and flatness. Further, the molding was carried out 10000 cycles, while the insert block 130 underwent no damage such as cracking.

Comparative Example 27A

Comparative Example 27A used the same thermoplastic resin and the same mold assembly as those used in Example 27. Further, Comparative Example 27A employed the same molding conditions as those in Example 27. The difference of Comparative Example 27A was in that no fluid was flowed through the space between the knock-out pin 150 and the first mold member 110 and through the space between the insert block 130 and the cover plate 132 when a molded article was released from the first mold member 110.

As a result, the molded article firmly adhered to the cavity wall 131 of the insert block 130, and the molded article was not released from the insert block 130. Therefore, the fluid was flowed through the space between the knock-out pin 150 and the first mold member 110 and through the space between the insert block 130 and the cover plate 132. As a result, the molded article 161 successfully came away from the first mold member 110 with the knock-out pin 150.

Comparative Example 27B

Comparative Example 27B used an insert block formed from Stavax steel and having a the cavity wall which was mirror surface-finished by polishing. Except for the above point, the same thermoplastic resin and the same mold assembly as those in Example 27 were used, and the molding was carried out under the same conditions as those in Example 27.

Since the wettability between the resin and the cavity wall of the insert block was not high due to the use of the insert block formed from Stavax steel, a molded article 161 was successfully released from the first mold member 110 with the knock-out pin 150 without flowing any fluid through the space between the knock-out pin 150 and the first mold member 110 and through the space between the insert block 130 and the cover plate 132. However, the surface of the molded article had glass fiber exposed, and had a gloss-less poor appearance.

Comparative Example 27C

Comparative Example 27C used the same mold assembly and the same thermoplastic resin as those used in Example 27. The difference of Comparative Example 27C was in that Δt=0 mm. That is, when the first mold member 110 and the second mold member 120 were clamped, the distance $t_1$ of the cavity 140 in the thickness direction of a molded article was set at 4 mm. The thickness $t_0$ of a molded article to be produced was 4 mm. The other molding conditions were the same as those in Example 27.

As a result, it was required to increase the injection pressure up to 700 kgf/cm² for completely fill the cavity 140 with the molten resin. Further, the molded article had a sink mark on its edge portion although the surface thereof had no inorganic fiber exposed.

Example 28

Figure 20A:
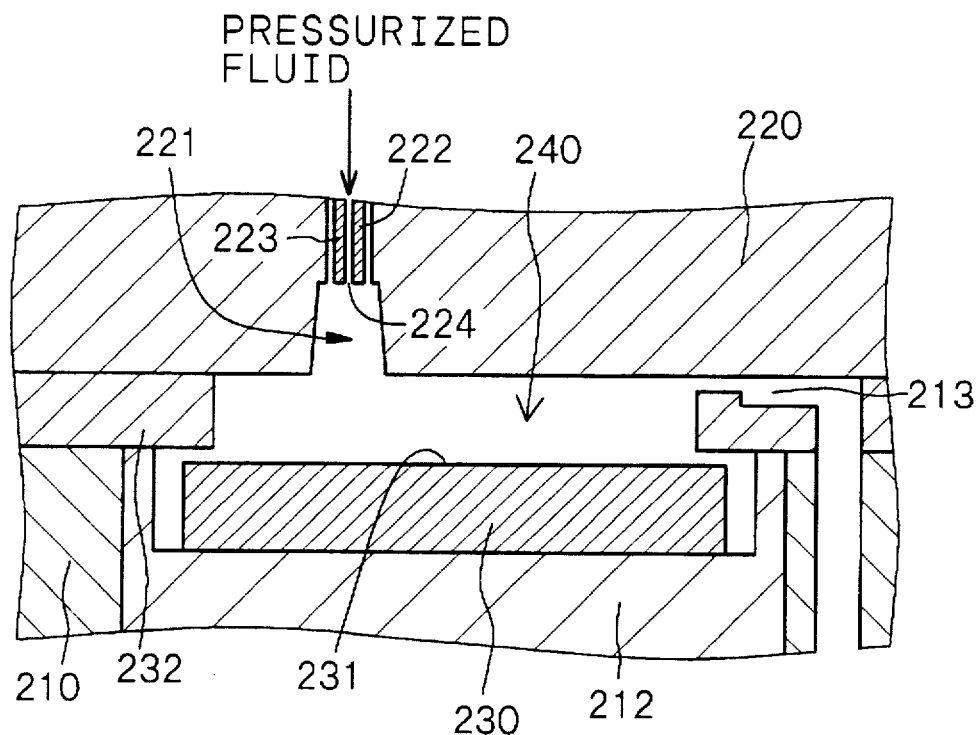
FIGS. 20A, 20B and 20C are a schematic partial cross section of a preferred embodiment of a mold assembly and schematic partial cross sections of the mold assembly under assembly in Example 28.
Figure 20B:
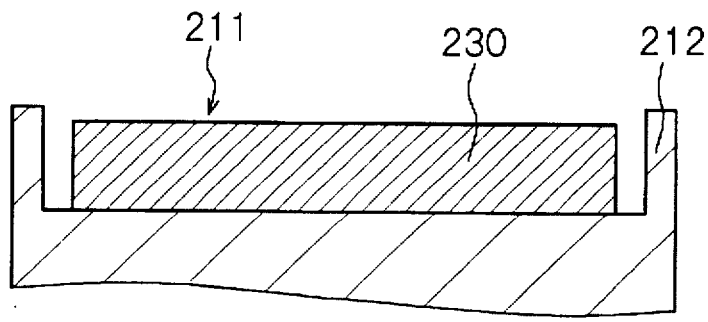
Figure 20C:
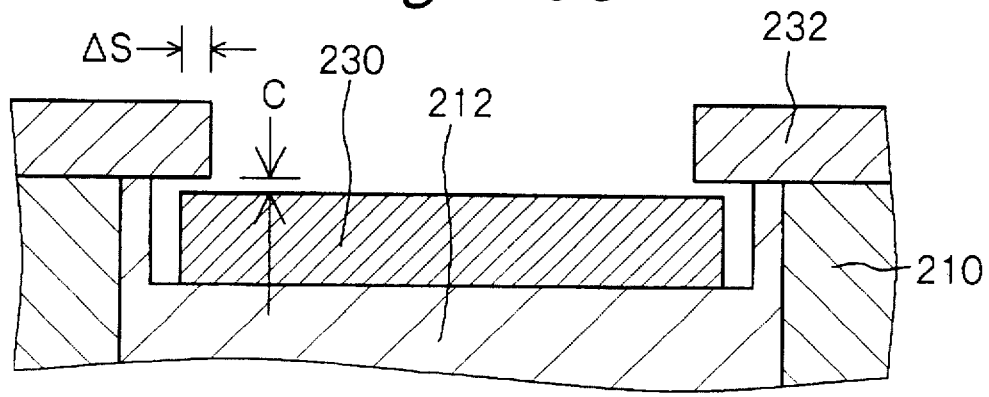

Example 28 is concerned with the method of producing a molded article directed to the third aspect of the present invention (production method based on the gas-assisted injection molding method). FIG. 20A is a schematic partial cross section showing a mold assembly in Example 28. FIGS. 20B and 20C are schematic partial cross sections showing the mold assembly being assembled.

In the mold assembly in Example 28, a cavity 240 had a size of 100.00 mm×100.00 mm×2.00 mm and had the form of a rectangular parallelepiped (plate). In Example 28, an insert block 230 was formed of $ZrO_2$—$Y_2O_3$ and had a size of 101.00 mm×101.00 mm×4.00 mm. A cavity wall 231 of the insert block 230 was polished with diamond lapping to have a surface roughness $R_{max}$ of 0.02 μm.

A core 212 to which the insert block 230 was to be disposed was formed from carbon steel S55C. The core 212 had an outer size of 105×105 mm. The core 212 was provided with an insert block attaching portion 211 having a 103.00×103.00×4.02 mm concave portion. The insert block 230 was disposed to the bottom of the core 212 with an epoxy-containing adhesive (not shown). FIG. 20B shows this state.

A fixed mold member 210 was formed from carbon steel S55C. The fixed mold member was produced such that a portion to which the core 212 was to be attached had dimensions of 105×105 mm. The core 212 to which the insert block 230 was disposed was inserted into, and attached to, the above portion.

A cover plate 232 was formed from carbon steel S55C. The cover plate 232 had an inner dimension of 100.00 mm×100.00 mm. The cover plate 232 was fixed to the fixed mold member 210 with bolts (not shown) (see FIG. 20C). The average clearance (C) between the insert block 230 and the cover plate 232 was 0.02 mm. The amount (ΔS) of overlapping of the cover plate 232 and the insert block 230 was 0.5 mm. FIG. 20C omits the showing of a gate portion.

A movable mold member 220 was formed from carbon steel S55C. A gas channel portion 221 of 4 mm depth was formed in the movable mold member 220, and a pressurized fluid introduction device 222 was attached to the bottom of the gas channel portion 221. The gas channel portion 221 also constitutes the cavity. The gas channel portion 221 works to form a lib (lib-like thickness-increased portion) on the reverse side of a molded article.

The pressurized fluid introduction device 222 comprises of a nozzle portion 223 and a non-return valve (not shown). For preventing the flow of a molten resin into the pressurized fluid introduction device 222 and the clogging of the pressurized fluid introduction device 222, the non-return valve is arranged in the nozzle portion 223 of the pressurized fluid introduction device 222. The top portion of the nozzle portion 223 has an open portion 224 open to the gas channel portion 221. The pressurized fluid introduction device 222 is connected to a pressurized fluid source (not shown) through a tubing (not shown). The pressurized fluid introduction device 222 is movable upwardly and downwardly in FIG. 20A with moving means (not shown).

A molded article produced in the above mold assembly has the form of a 100 mm×100 mm×2 mm flat plate as an outer form, and has a rib portion of 4 mm height formed on the reverse surface. A hollow portion is mainly formed in the rib portion.

The above-completed mold assembly was set in an injection molding machine. When the mold assembly was heated up to 130° C. and then rapidly cooled to 40° C., the insert block 230 formed of $ZrO_2$—$Y_2O_3$ underwent no cracking or had no problem.

Figure 22:
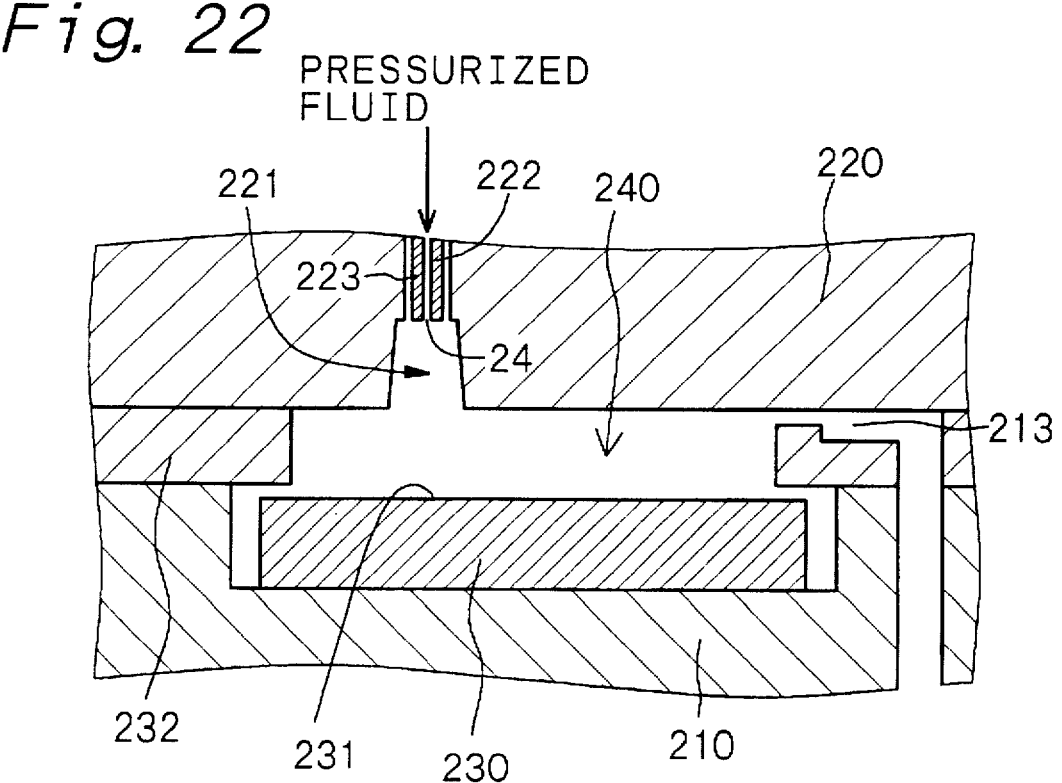
FIG. 22 is a schematic partial cross section of a mold assembly different from that shown in FIG. 20A.

In some cases, the insert block 230 may be directly disposed to the fixed mold member 210 as shown in FIG. 22.

Figure 21:
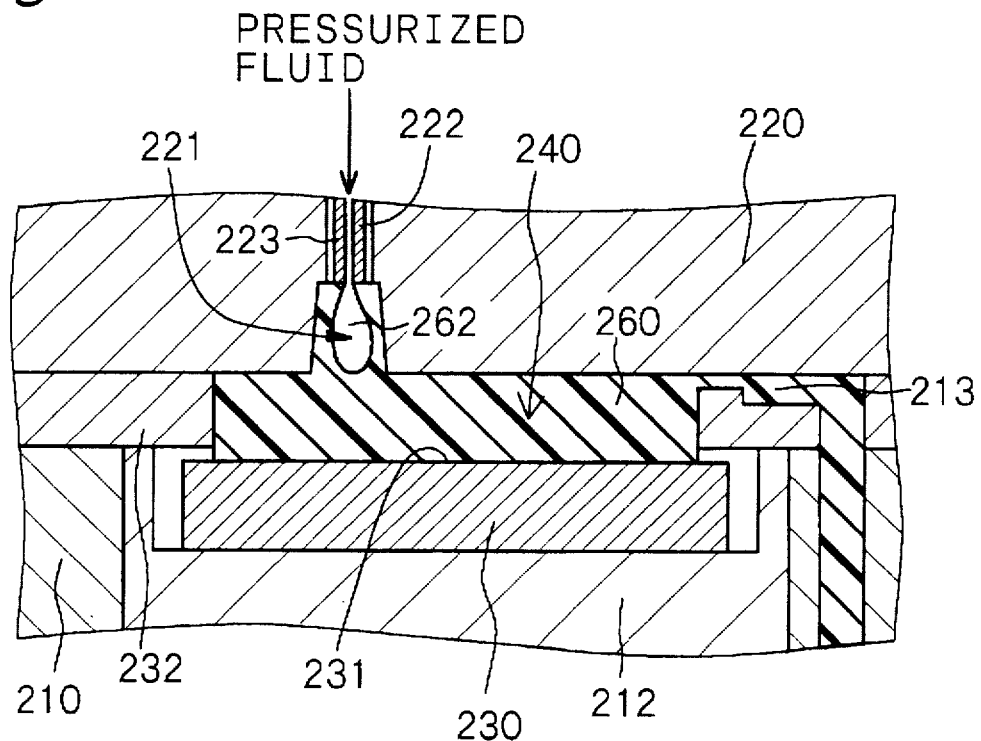
FIG. 21 shows a state in which a pressurized fluid is introduced into a molten resin injected into the cavity in Example 28.

In the same injection molding machine as that used in Example 8, the mold was heated to 100° C. As a thermoplastic resin, there was used a PC/PET resin containing 10% by weight of a glass fiber (GMB1011, supplied by Mitsubishi Engineering-Plastics Corp.). The molten resin was injected into the cavity 240 including the gas channel portion 221 through the gate portion 213 at a resin temperature of 280° C. at an injection pressure of 200 kgf/cm². The amount of the molten resin to be injected was set such that 95% of the total volume of the cavity 240 and the gas channel portion 221 was filled with the molten resin. After the completion of the injection, a pressurized fluid of nitrogen gas having a pressure of 40 kgf/cm² was introduced into the molten resin in the cavity (more specifically, in the gas channel portion 221 in Example 28) through the nozzle portion 223 of the pressurized fluid introduction device 222. FIG. 21 schematically shows the above state. Numeral 260 indicates the molten resin, and numeral 262 indicates a hollow portion. The introduction of the pressurized fluid was continued, and the resin in the cavity was cooled to solidness for 30 seconds. Then, the pressurized fluid introduction device 222 was moved by the moving means (not shown) upwardly in FIG. 21 to make a gap between the nozzle portion 223 and a molded article, whereby the pressurized fluid in the hollow portion formed in the molded article was released into atmosphere. Then, the mold was opened, and the molded article was released from the fixed mold member 210.

The molded article had no glass fiber exposed on the surface, and it had a fine appearance. Further, the molded article had no sink mark even on its edge portion, and it was excellent in smoothness and flatness. Further, the molded article showed neither color shading nor a poor appearance on that portion of its surface which had been formed near the gas channel (surface which had been in contact with the cavity wall 231 of the insert block 230). The molding was carried out 10000 cycles, while the insert block 130 underwent no damage such as cracking.

Comparative Example 28A

In Comparative Example 28A, the insert block was replaced with an insert block which was formed from Stavax steel and surface mirror-finished by polishing. That is, Comparative Example 28A used the same mold assembly, the same method and the same conditions as those used in Example 28 except for the above point, to produce a molded article. The resultant molded article had glass fiber exposed on the surface, and it had a gloss-less and poor appearance. Further, the molded article showed color shading on that portion of its surface which had been formed near the gas channel (surface which had been in contact with the cavity wall of the insert block).

Comparative Example 28B

In Comparative Example 28B, the same mold assembly and the same raw material as those used in Example 28 were used, and usual molding was carried out without introducing the pressurized fluid. The amount of the molten resin to be injected was set so as to equal the total volume of the cavity 240 and the gas channel portion 221. There was no glass fiber deposited on the molded article. However, a sink mark occurred on the edge portion of the molded article and on that surface of the molded article which was near the gas channel portion (surface which had been in contact with the cavity wall of the insert block).

Example 29

Examples 29 to 46 are concerned with the mold assembly directed to the third or fourth aspect of the present invention.

Example 29 is concerned with the mold assembly used for producing a molded article having a hole, directed to the third and fourth aspects of the present invention, more specifically to the first type mold assembly. As shown in schematic partial cross-sectional views of FIGS. 23 and 24, a core pin 331, which is formed of glass or ceramic, is attached to a first mold member 310 by a known method. Numeral 311 shows a second mold member, numeral 314 shows a cavity, numeral 320 shows an insert block, and numeral 321 shows a cavity wall of the insert block 320.

Figure 23:
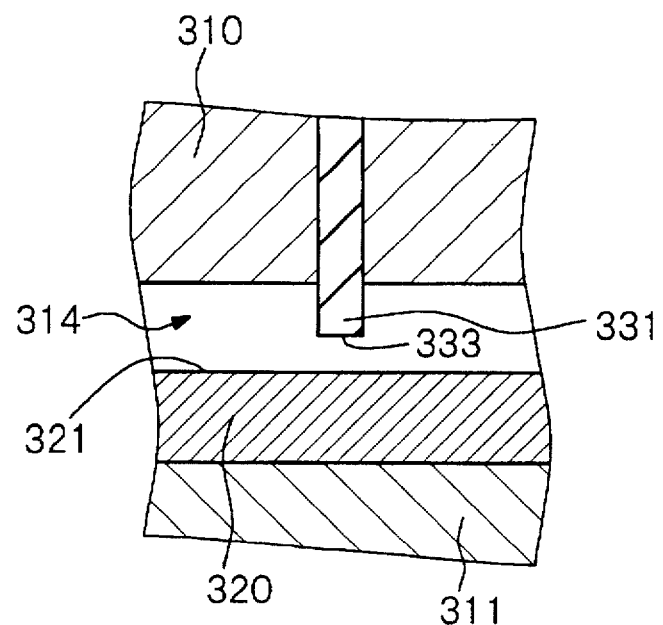
FIGS. 23 and 24 are partial cross-sectional views of a mold assembly used for producing a molded article having a hole in Example 29.
Figure 24:
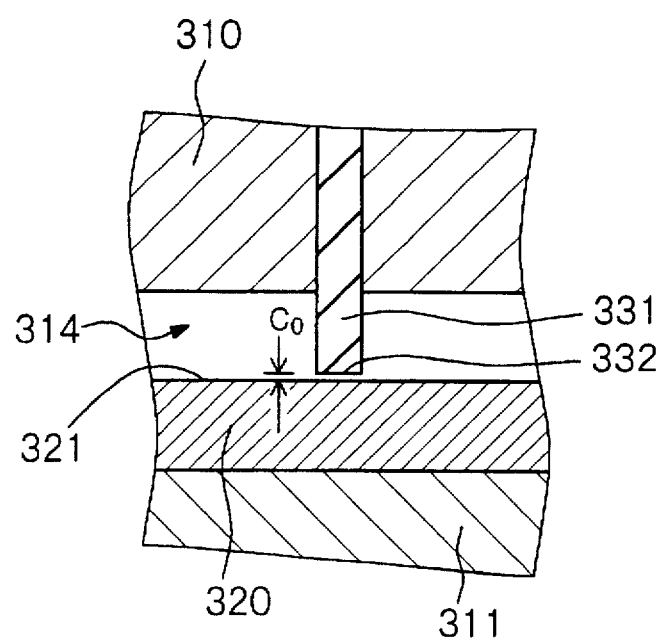

In the structure shown in FIG. 23, a top surface 333 of the core pin 331 and the cavity wall 321 of the insert block 320 have a sufficiently large clearance, whereby a molded article having a blind hole can be produced. On the other hand, in FIG. 24, the top surface of the core pin 331 corresponds to an opposite surface 332 in the mold assembly directed to the fourth aspect of the present invention, and the top surface (opposite surface 332) and the cavity wall 321 of the insert block 320 preferably have a clearance ($C_o$) of 0.003 mm to 0.03 mm (0.003 mm ≤ $C_o$ ≤ 0.03 mm), whereby a molded article having a through hole can be produced without the penetration of a molten resin into a space between the opposite surface 332 and the cavity wall 321 of the insert block 320. In the structures shown in FIGS. 23 and 24, for preventing a concentrated stress from breaking the opposite surface 332 or the top surface 333 of the core pin, the outer corner of the opposite surface 332 or the top surface 333 is preferably imparted with a curvature of at least 0.2 mm R, or is C-surface-processed (chamferred at an angel of 45 degrees), with a diamond grinder.

Example 30

Figure 25:
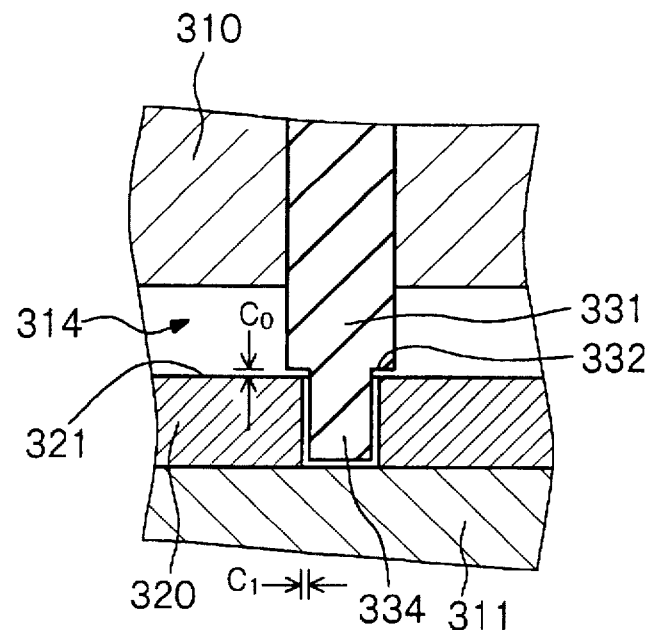
FIG. 25 is a partial cross-sectional view of a mold assembly used for producing a molded article having a hole in Example 30.

Example 30 is a variant of Example 29. As shown in a schematic partial cross-sectional view of FIG. 25, the insert block 320 has a through hole, and when the mold is clamped, a top portion 334 of the core pin 331 extends into the through hole of the insert block 320. The top portion 334 of the core pin and the through hole of the insert block 320 preferably have a clearance ($C_1$) of at least 0.1 mm. When the clearance ($C_1$) is less than 0.1 mm, the top portion 334 of the core pin and the insert block 320 may be brought into contact with each other under heat expansion or shrinkage to break the insert block 320 and the core pin 331. Further, that portion of the core pin which is present in a cavity 314 has a thickness difference (a step), and also has an opposite surface 332 which faces the cavity wall 321 of the insert block 320. Owing to the above structure, a through hole can be reliably formed in an exact position of a molded article without the penetration of a molten resin into a space between the opposite surface 332 and the cavity wall 321 of the insert block 320, and further, the damage on the top portion 334 of the core pin and the insert block 320 can be prevented.

Example 31

Example 31 is concerned with the mold assembly for producing a molded article having a hole directed to the (above-explained) fourth aspect of the present invention, more specifically to the second type mold assembly. As shown in schematic partial cross-sectional views of FIGS. 26 and 27, a core pin 341 is formed of ceramic or glass, and an insert block 320 has a through hole. The core pin 341 is attached to a second mold member 311 through the through hole of the insert block 320 by a known method. In these cases, that portion of the core pin 341 which is present in a cavity 314 has an opposite surface 342 which faces a cavity wall 321 of an insert block 320, and the opposite surface 342 and the cavity wall 321 of the insert block 320 preferably have a clearance ($C_0$) of 0.003 mm to 0.03 mm. The core pin 341 and the through hole of the insert block 320 preferably have a clearance ($C_1$) of at least 0.1 mm.

Figure 26:
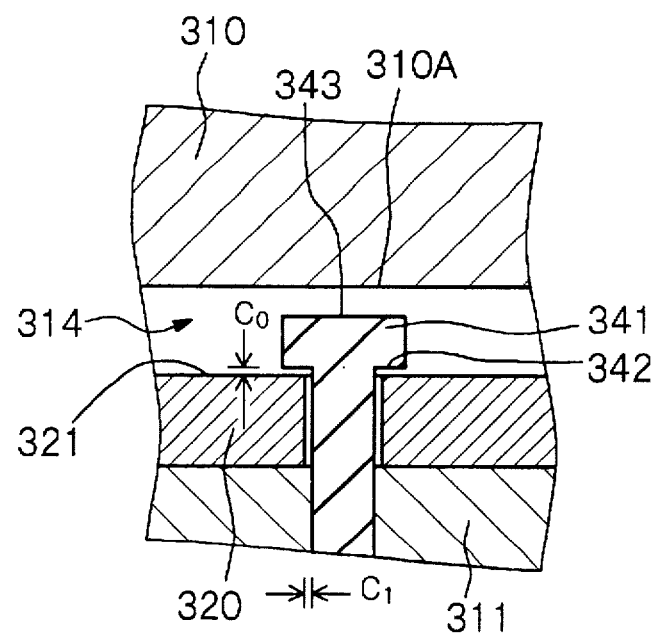
FIGS. 26 and 27 are partial cross-sectional views of a mold assembly used for producing a molded article having a hole in Example 31.
Figure 27:
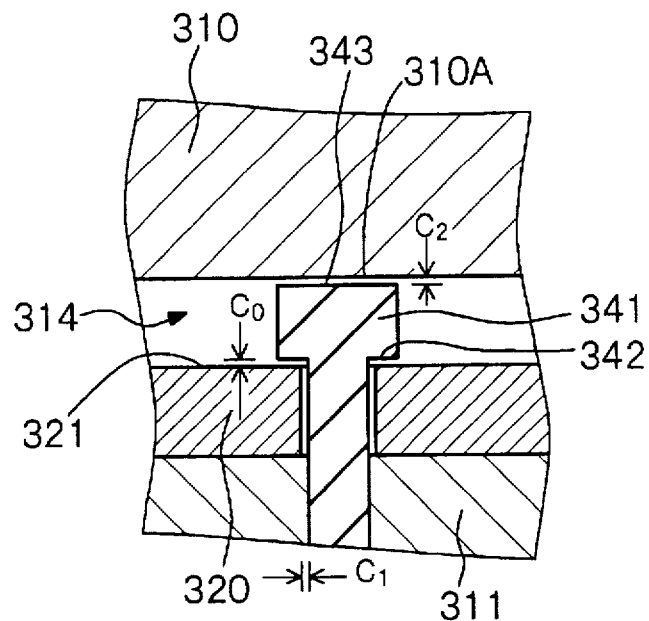

In the structure shown in FIG. 26, a top surface 343 of the core pin 341 and a cavity wall 310A of a first mold member 310 have a sufficiently large clearance, whereby a molded article having a blind hole can be produced. On the other hand, in FIG. 27, the clearance ($C_2$) between the top surface 343 of the core pin 341 and the cavity wall 310A of the first mold member 310 may be 0 mm when the cavity wall 310 is formed of a metal. When an insert block (not shown) formed disposed in the first mold member 310, the cavity wall of the insert block and the top surface 343 of the core pin 341 preferably have a clearance ($C_2$) of 0.003 mm to 0.03 mm (0.003 mm$\leq C_2 \leq$0.03 mm). Owing to the above structure, a molded article having a through hole can be produced without the penetration of a molten resin into a space between the top surface 343 of the core pin 341 and the cavity wall 310A of the first mold member 310.

Example 32

Figure 28:
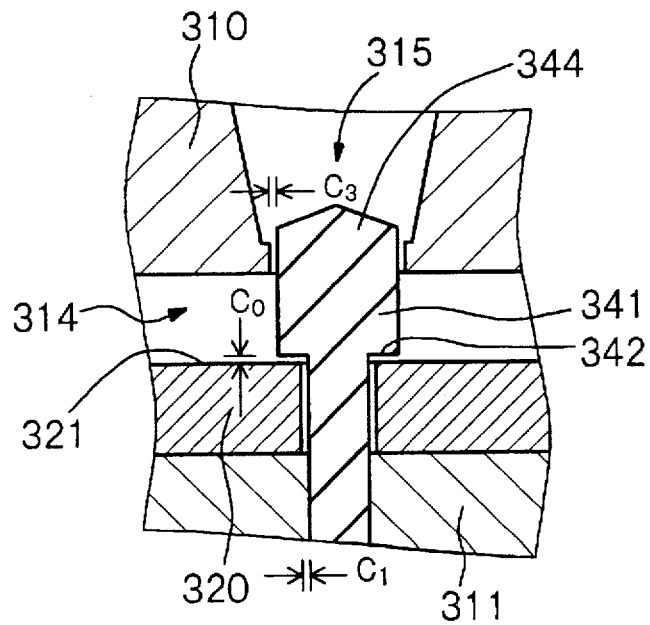
FIG. 28 is a partial cross-sectional view of a mold assembly used for producing a molded article having a hole in Example 32.

Example 32 is a variant of Example 31. In a schematic partial cross-sectional view of FIG. 28, the core pin 341 is formed of ceramic or glass. The insert block 320 has a through hole, and the core pin 341 is attached to the second mold member 311 through the through hole of the insert block 320 by a known method. The first mold member 310 has a hole portion 315, and when the mold is clamped, a top portion 344 of the core pin 341 extends into the hole portion 315. The top portion 344 of the core pin 341 and the hole portion 315 preferably have a clearance ($C_3$) of at least 0.01 mm to 0.03 mm. Owing to the above structure, a through hole can be reliably formed in a molded article. In the structures shown in FIGS. 26, 27 and 28, for preventing a concentrated stress from breaking the core pin, the outer corner of the opposite surface 342 of the core pin is preferably imparted with a curvature of at least 0.2 mm R, or is C-surface-processed, with a diamond grinder.

Example 33

Example 33 is concerned with the third type mold assembly in the mold assembly used for producing a molded article having a hole. As shown in a schematic partial cross-sectional view of FIG. 29, a core pin comprises a core pin attaching member 350 attached to a first mold member 310 by a known method, and an annular member 351 having one closed end and other open end, attached to the core pin attaching member 350. The annular member 351 has the form of a cap. The annular member 351 is formed of ceramic or glass, and constitutes a surface of that portion of the core pin which is present in a cavity 314. The core pin attaching member 350 is extending from the open end of the annular member 351 into the annular member 351. The annular member 351 preferably has a thickness (½ of a difference between outer diameter and inner diameter when the cross-sectional form is annular) of 0.5 to 4 mm. The core pin attaching member 350 can be produced from a metal. In the structure shown in FIG. 29, a top surface 353 of the annular member 351 and a cavity wall 321 of the insert block 320 have a sufficiently large clearance. Therefore, a molded article having a blind hole can be produced.

Example 34

Example 34 is a variant of Example 33. As shown in a schematic partial cross-sectional view of FIG. 30, the core pin comprises a core pin attaching member 350 attached to a first mold member 310 by a known method, and an annular member 351 having one closed end and one open end, attached to the core pin attaching member 350. The annular member 351 is formed of ceramic or glass, and constitutes a surface of that portion of the core pin which is present in the cavity 314. A surface constituting the close end of the annular member 351 corresponds to an opposite surface 352, and the core pin attaching member 350 is extending from the open end of the annular member 351 into the annular member 351. In this case, the top surface corresponding to the opposite surface 352 of the annular member 351 and the cavity wall 321 of the insert block 320 preferably have a clearance ($C_0$) of 0.003 mm to 0.03 mm (0.003 mm$\leq C_0 \leq$0.03 mm). Owing to the above structure, a molded article having a through hole can be produced without the penetration of a molten resin into a space between the top surface corresponding to the opposite surface 352 of the annular member 351 and the cavity wall 321 of the insert block 320.

Figure 29:
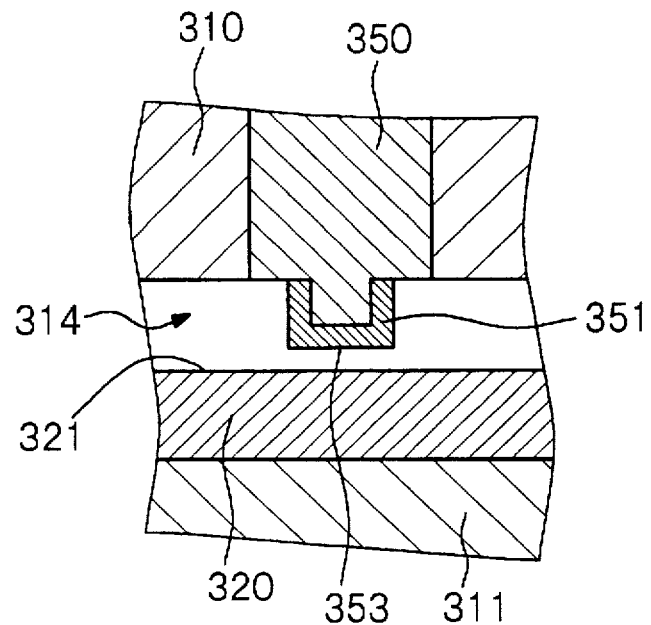
FIG. 29 is a partial cross-sectional view of a mold assembly used for producing a molded article having a hole in Example 33.
Figure 30:
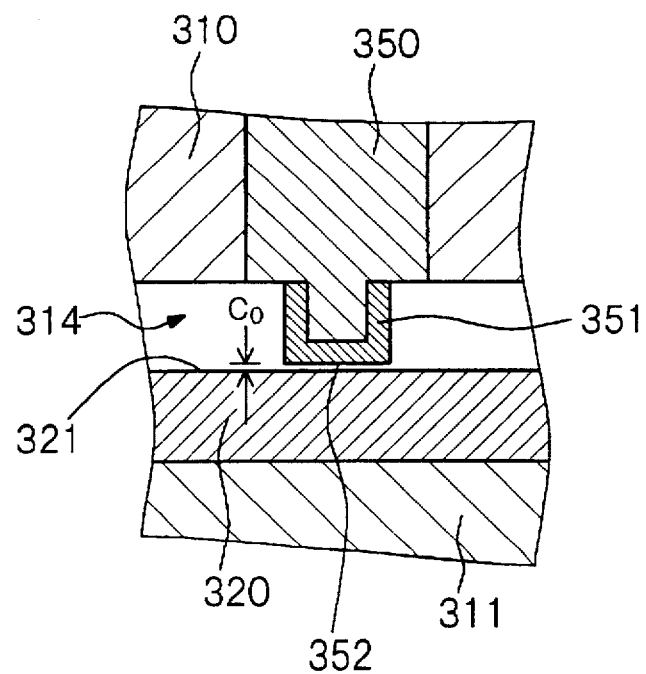
FIG. 30 is a partial cross-sectional view of a mold assembly used for producing a molded article having a hole in Example 34.

In the structures shown in FIG. 29 and 30, for preventing a concentrated stress from breaking the annular member 351, the outer corner of the annular member 351 is preferably imparted with a curvature of at least 0.2 mm R, or is C-surface-processed, with a diamond grinder.

Example 35

Example 35 is concerned with the fourth type mold assembly in the mold assembly used for producing a molded article having a hole. That is, as shown in schematic partial cross-sectional views of FIGS. 31 and 32, a core pin comprises a core pin attaching member 360 attached to a second mold member 311 by a known method, and an annular member 361 having one closed end and one open end, attached to the core pin attaching member 360. The annular member 361 has the form of a cap. The annular member 361 is formed of ceramic or glass, and constitutes a surface of that portion of the core pin which is present in a cavity 314. A surface constituting the open end of the annular member 361 corresponds to opposite surface 362, and the core pin attaching member 360 goes through a through hole provided in an insert block 320 and is extending from the open end of the annular member 361 into the annular member 361. The annular member 361 preferably has a thickness (½ of a difference between outer diameter and inner diameter when the cross-sectional form is annular)

of 0.5 to 4 mm. The core pin attaching member 360 can be produced from a metal. The core pin attaching member 360 and the through hole of the insert block 320 preferably have a clearance ($C_1$) of at least 1 mm. When the clearance ($C_1$) is less than 1 mm, the core pin 360 and the insert block 320 may be brought into contact with each other because of thermal expansion and shrinkage to break the insert block 320.

Figure 31:
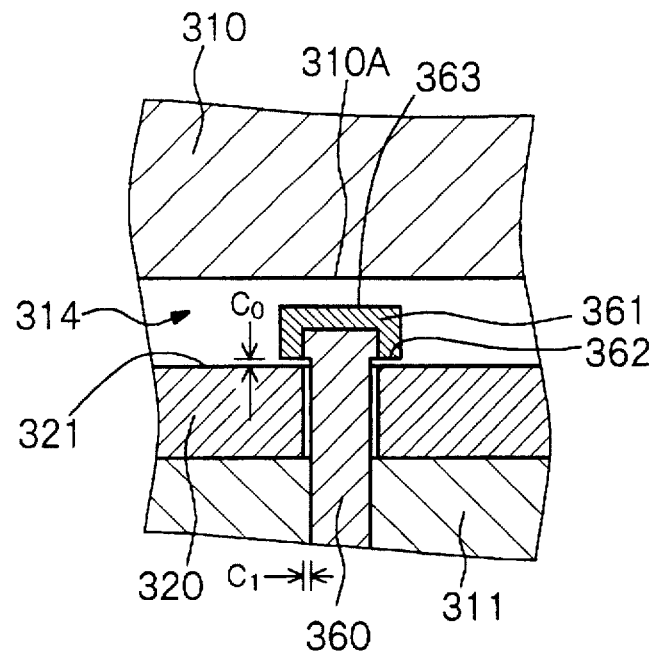
FIGS. 31 and 32 are partial cross-sectional views of a mold assembly used for producing a molded article having a hole in Example 35.
Figure 32:
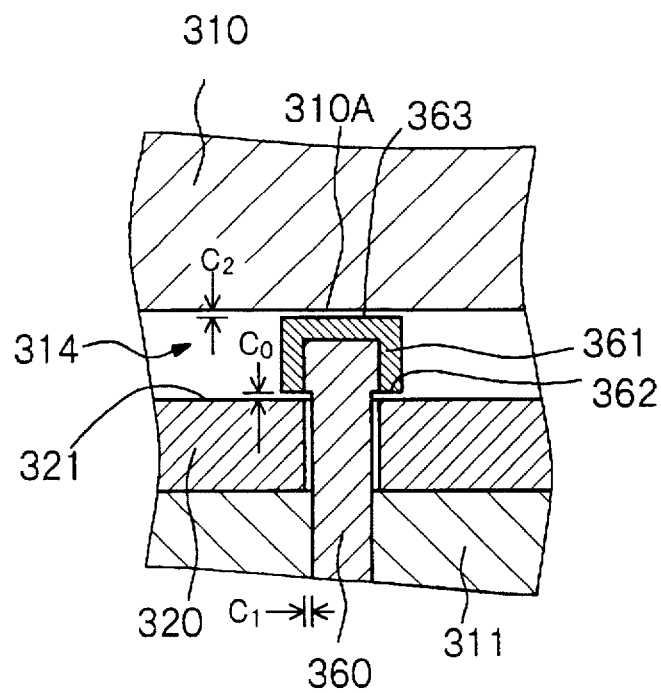

In the structure shown in FIG. 31, a top surface 363 of the close end of the annular member 361 and a cavity wall 310A of the first mold member 310 have a sufficiently large clearance. Therefore, a molded article having a blind hole can be produced. On the other hand, in FIG. 32, a top surface 363 of the close end of the annular member 361 and the cavity wall 310A of the first mold member 310 may have a clearance ($C_2$) of 0 mm when the cavity wall 310A is formed of a metal. When an insert block (not shown) is disposed in the first mold member 310, the cavity wall of the insert block and the top surface 363 of the close end of the annular member 361 preferably have a clearance ($C_2$) of 0.003 mm to 0.03 mm ($0.003 \text{ mm} \leq C_2 \leq 0.03$ mm). Owing to the above structure, a molded article having a through hole can be produced without the penetration of a molten resin into a space between the top surface 363 of the close end of the annular member 361 and the cavity wall 310A of the first mold member 310. An opposite surface 362 of the annular member 361 and a cavity wall 321 of the insert block preferably have a clearance ($C_0$) of 0.003 mm to 0.03 mm ($0.003 \text{ mm} \leq C_0 \leq 0.03$ mm). In the structures shown in FIGS. 31 and 32, for preventing a concentrated stress from breaking the annular member 361, the outer corner of the annular member 361 is preferably imparted with a curvature of at least 0.2 mm R, or is C-surface-processed, with a diamond grinder.

Example 36

Figure 33:
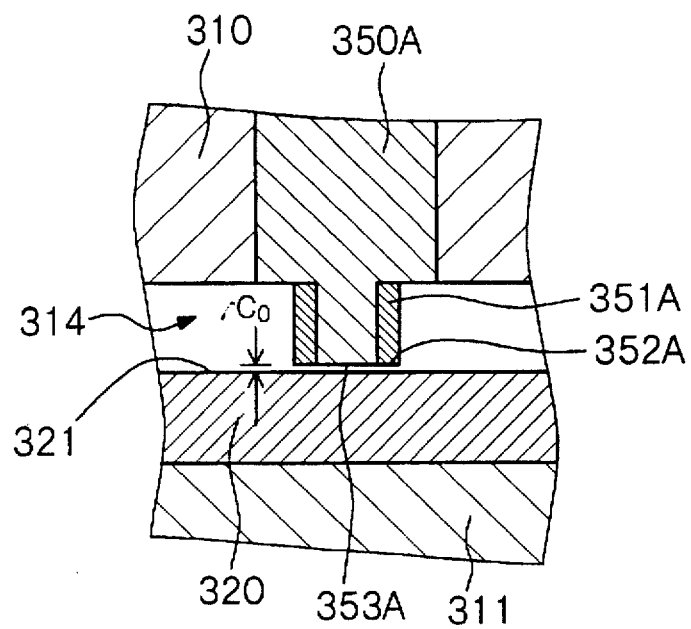
FIG. 33 is a partial cross-sectional view of a mold assembly used for producing a molded article having a hole in Example 36.

Example 36 is concerned with the fifth type mold assembly in the mold assembly used for producing a molded article having a hole. That is, as shown in a schematic partial cross-sectional view of FIG. 33, a core pin comprises a core pin attaching member 350A attached to a first mold member 310 by a known method, and an annular member 351A having both open ends, attached to the core pin attaching member 350A. The annular member 351A has the form of a ring. The annular member 351A is formed of ceramic or glass, and constitutes a surface of that portion of the core pin which is present in a cavity 314. A surface constituting the one open end of the annular member 351A corresponds to opposite surface 352A, and the core pin attaching member 350A is extending from the other open end of the annular member 351A into the annular member 351A. In Example 36, a top surface 353A of the core pin attaching member 350A is located on a plane where the opposite surface 352A is present. The annular member 351A preferably has a thickness (½ of a difference between outer diameter and inner diameter when the cross-sectional form is annular) of 0.5 to 4 mm. The core pin attaching member 350A can be produced from a metal. In FIG. 33, a surface of the one open end (opposite surface 352A) of the annular member 351A and a cavity wall 321 of an insert block 320 preferably have a clearance ($C_0$) of at least 0.003 mm to 0.03 mm ($0.003 \text{ mm} \leq C_0 \leq 0.03$ mm). Owing to the above structure, a molded article having a through hole can be produced without the penetration of a molten resin into a space between the surface of the one open end (opposite surface 352A) of the annular member 351A and the cavity wall 321 of the insert block 320.

Example 37

Example 37 is a variant of Example 36. As shown in a schematic cross-sectional view of FIG. 34, the insert block 320 has a through hole, and when the mold is clamped, a top portion 354A of the core pin attaching member 350A extends from the one open end of the annular member 351A into the through hole of the insert block 320. The top portion 354A of the core pin attaching member 350A and the through hole preferably have a clearance ($C_1$) of at least 0.1 mm. Owing to the above structure, a molded article having a through hole can be reliably produced.

Example 38

Example 38 is another variant of Example 36. As shown in a schematic cross-sectional view of FIG. 35, the top portion 355A of the core pin attaching member 350A comes to a stop inside the annular member 351. The insert block 320 has a through hole, and the second mold member 311 has a projection 316 which projects from the through hole of the insert block 320. The projection 316 and the through hole of the insert block 320 preferably have a clearance ($C_1$) of at least 0.1 mm. When the mold is clamped, the projection 316 is fitted with an interior of the annular member 351A. Specifically, when the mold is clamped, the projection 316 is fitted with the top portion 355A of the core pin attaching member 350A. Owing to the above structure, a molded article having a through hole can be reliably produced, and further, the fitting accuracy can be improved. The top portion 355A of the core pin attaching member 350A and the top surface of the projection 316 may be smooth and flat. The side wall of the top portion of the projection 316 and the inside wall of the annular member 351A preferably have a clearance of at least 0.1 mm so that the side wall of the top portion of the projection 316 and the inside surface of the annular member 351A do not come in contact with each other when the mold is clamped.

Figure 34:
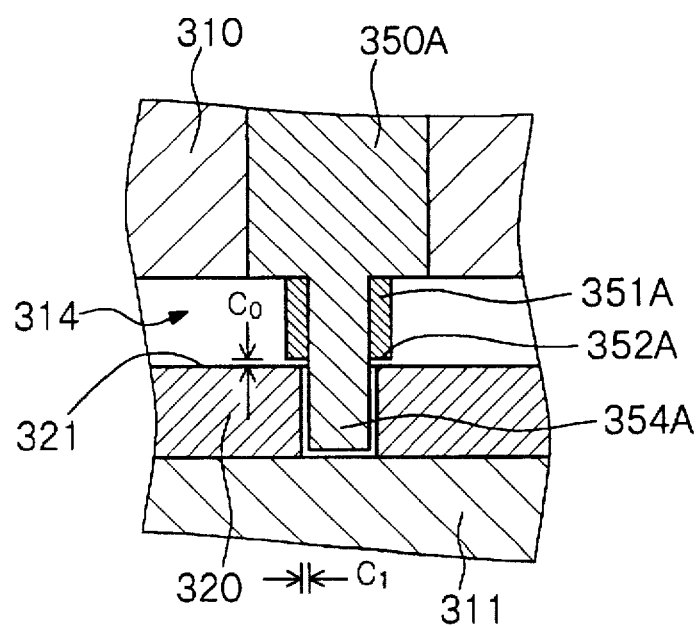
FIG. 34 is a partial cross-sectional view of a mold assembly used for producing a molded article having a hole in Example 37.
Figure 35:
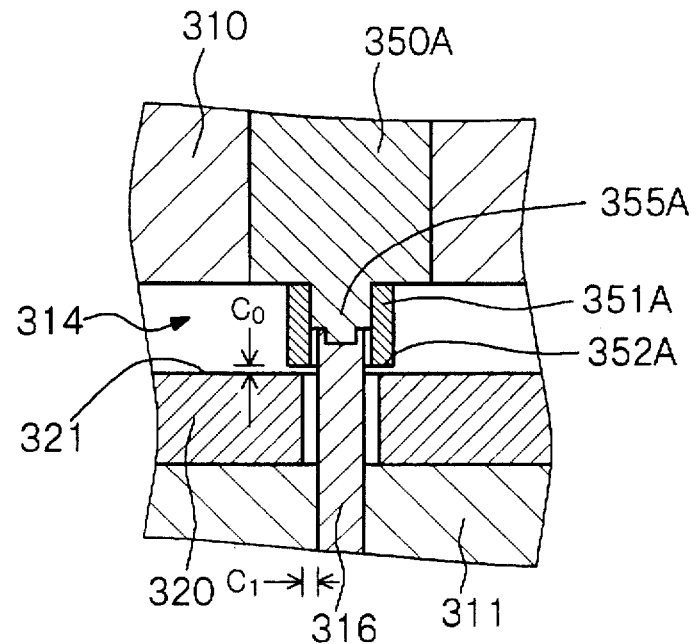
FIG. 35 is a partial cross-sectional view of a mold assembly used for producing a molded article having a hole in Example 38.

In the structures shown in FIGS. 33, 34 and 35, for preventing a concentrated stress from breaking the annular member 351A, the outer corner of the annular member 351A is preferably imparted with a curvature of at least 0.2 mm R, or is C-surface-processed, with a diamond grinder.

Example 39

Example 39 is concerned with the sixth type mold assembly in the mold assembly used for producing a molded article having a hole. That is, as shown in a schematic partial cross-sectional view of FIG. 36, a core pin comprises a core pin attaching member 360A attached to a second mold member 311 by a known method, and an annular member 361A having both open ends, attached to the core pin attaching member 360A. The annular member 361A has the form of a ring. The annular member 361A is formed of ceramic or glass, and constitutes a surface of that portion of the core pin which is present in a cavity 314. A surface constituting the one open end of the annular member 361A corresponds to opposite surface 362A, an insert block 320 has a through hole, and the core pin attaching member 360A goes through the through hole of the insert block 320 and is extending from the one open end of the annular member 361A into the annular member 361A. In this case, the core pin attaching member 360A and the through hole of the insert block 320 preferably have a clearance ($C_2$) of at least 0.1 mm. A surface corresponding to the opposite surface 362A of the annular member 361A and a cavity wall 321 of the insert block 320 preferably have a clearance ($C_0$) of at least 0.003 mm to 0.03 mm ($0.003 \text{ mm} \times C_0 \leq 0.03$ mm).

Further, the clearance ($C_2$) between a surface 366A constituting the other open end of the annular member 361A and a cavity wall 310A of a first mold member 310 can be 0 mm when the cavity wall 310A is formed of a metal. When an insert block (not shown) is disposed in the first mold member 310, the cavity wall of the insert block and the surface 366A constituting the other open end of the annular member 361A preferably have a clearance ($C_2$) of 0.003 mm to 0.03 mm (0.003 mm$\leq C_2 \leq$0.03 mm). In Example 39, a top surface 363A of the core pin attaching member 360A is located on a plane where the surface 366A is present, while the top surface 363A of the core pin attaching member 360A may project above the plane where the surface 366A is present when the cavity wall 310A is formed of a metal.

Example 40

Example 40 is a variant of Example 39. As shown in a schematic partial cross-sectional view of FIG. 37, the first mold member 310 has a hole portion 315, and when the mold is clamped, a top portion 364A of the core pin attaching member 360A extends into the hole portion 315. The annular member 361A around the top portion 364A of the core pin attaching member 360A and the hole portion 315 preferably have a clearance ($C_3$) of 0.01 mm to 0.03 mm.

Example 41

Figure 38:
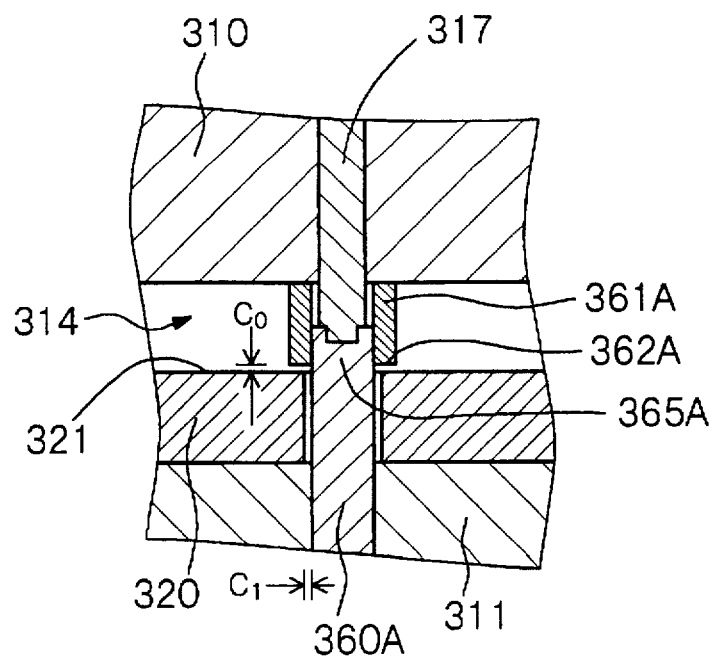
FIG. 38 is a partial cross-sectional view of a mold assembly used for producing a molded article having a hole in Example 41.

In another embodiment, as shown in a schematic partial cross-sectional view of FIG. 38, the top portion 365A of the core pin attaching member 360A comes to a stop inside the annular member 361A, and the first mold member 310 has a projection 317. When the mold is clamped, the projection 317 is fitted with an interior of the annular member 361A. Specifically, when the mold is clamped, the projection 317 is fitted with the top portion 365A of the core pin attaching member 360A. Owing to the above structure, a molded article having a through hole can be also produced, and the fitting accuracy can be improved. The top portion 365A of the core pin attaching member 360A and the top surface of the projection 317 may be smooth and flat. The side wall of the top portion of the projection 317 and the inside wall of the annular member 361A preferably have a clearance of at least 0.1 mm so that the side wall of the top portion of the projection 317 and the inside surface of the annular member 361A do not come in contact with each other when the mold is clamped.

Figure 36:
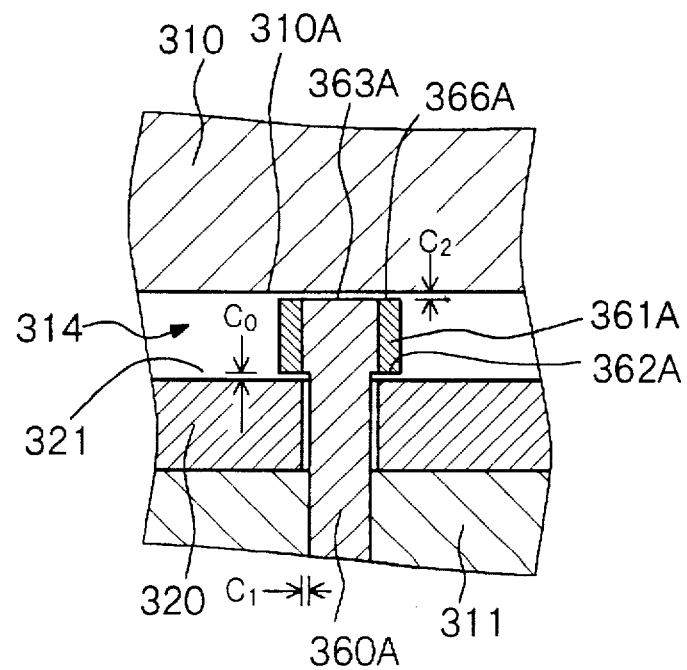
FIG. 36 is a partial cross-sectional view of a mold assembly used for producing a molded article having a hole in Example 39.
Figure 37:
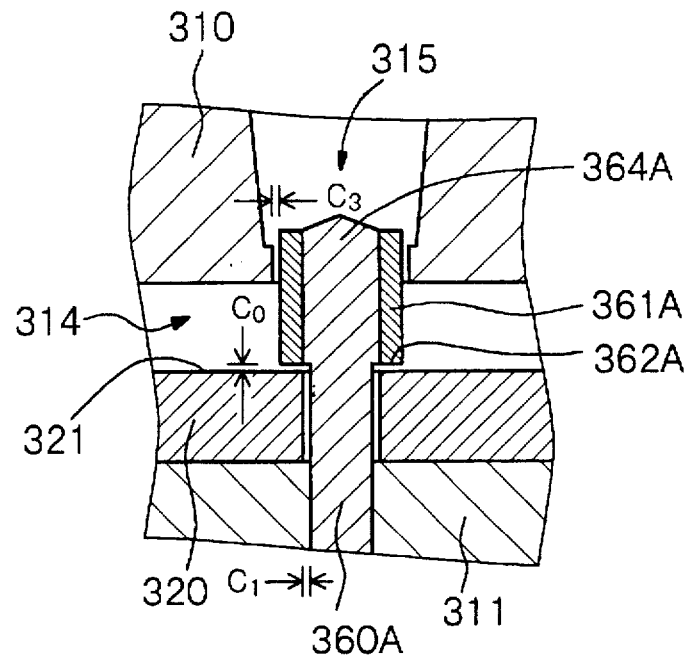
FIG. 37 is a partial cross-sectional view of a mold assembly used for producing a molded article having a hole in Example 40.

In the structures shown in FIGS. 36, 37 and 38, for preventing a concentrated stress from breaking the annular member 361A, the outer corner of the annular member 361A is preferably imparted with a curvature of at least 0.2 mm R, or is C-surface-processed, with a diamond grinder.

Example 42

Example 42 is concerned with the seventh type mold assembly in the mold assembly used for producing a molded article having a hole, and with a preferred embodiment in which the diameter of a core pin is greater than 10 mm. That is, in the mold assembly used for producing a molded article having a hole directed to the third or fourth aspect of the present invention, as shown in schematic partial cross-sectional views of FIGS. 39 to 44, a flame-sprayed layer 381 or 391 is formed on a surface of that part of a core pin 380 or 390 which is present in a cavity 314, by flame-spraying ceramic instead of forming the core pin from ceramic or glass.

Figure 39:
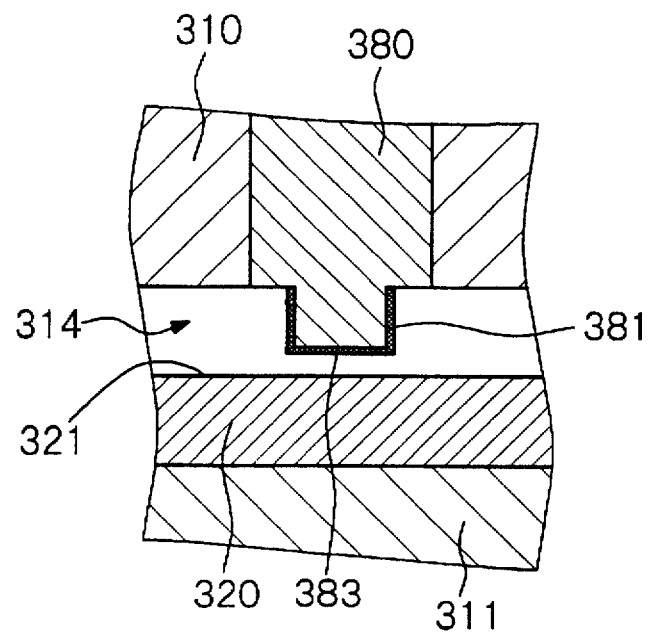
FIGS. 39, 40, 41, 42, 43 and 44 are schematic partial cross-sectional views of a mold assembly used for producing a molded article having a hole in Example 42.

In the structure shown in FIG. 39, the core pin 380 is attached to a first mold member 310, and a top surface 383 of the core pin 380 and a cavity wall 321 of an insert block 320 have a sufficiently large clearance. In the structure shown in FIG. 41, an insert block 320 has a through hole, a core pin 390 is attached to a second mold member 311 through the through hole of the insert block 320, and a top surface 393 of the core pin 390 and a cavity wall 310A of a first mold member 310 have a sufficiently large clearance. Owing to these structures, a molded article having a blind hole can be produced. In the embodiment shown in FIG. 41, that portion of the core pin 390 which is present in a cavity 314 has an opposite surface 392 which faces the cavity wall 321 of the insert block 320, and the opposite surface 392 and the cavity wall 321 of the insert block 320 preferably have a clearance ($C_0$) of 0.003 mm to 0.03 mm. The opposite surface 392 may be, or may not be, coated with a flame-sprayed layer.

Figure 40:
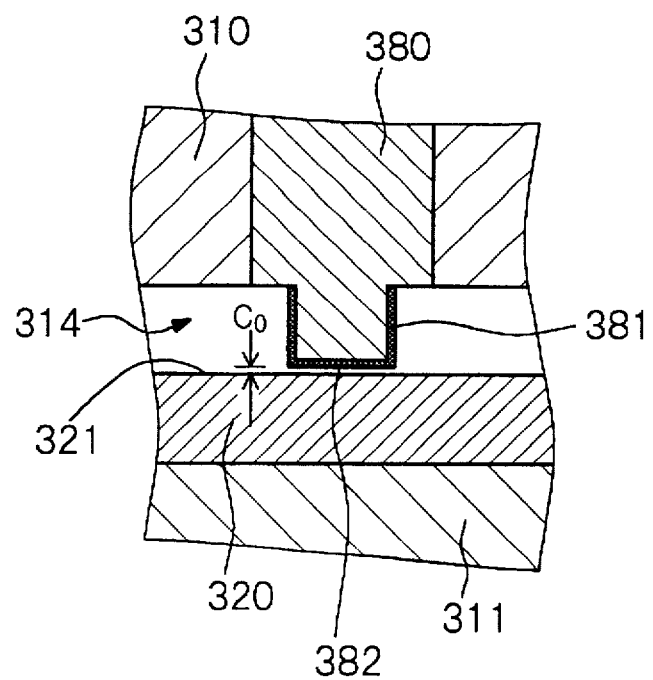
Figure 41:
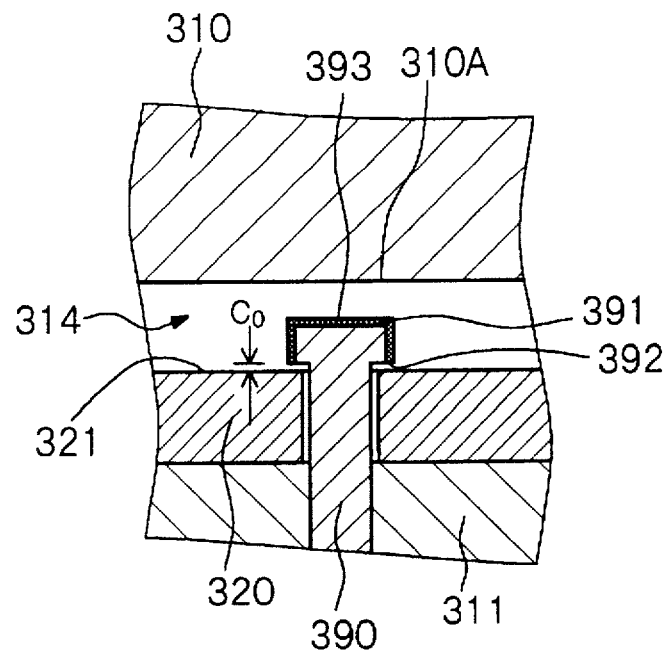

In another embodiment, as shown in the schematic partial cross-sectional view of FIG. 40, the core pin 380 is attached to the first mold member 310, that portion of the core pin which is present in the cavity 314 has an opposite surface 382 which faces the cavity wall 321 of the insert block 320, and the opposite surface 382 and the cavity wall 321 of the insert block 320 preferably have a clearance ($C_0$) of 0.003 mm to 0.03 mm. The opposite surface 382 may be, or may not be, coated with a flame-sprayed layer. In the structure shown in FIG. 40, a molded article having a through hole can be produced.

Figure 42:
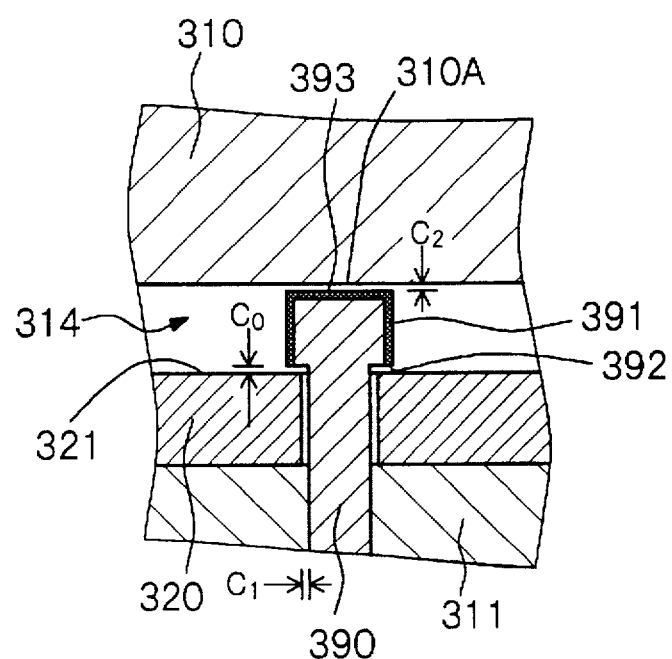

As shown in the schematic partial cross-sectional view of FIG. 42, the insert block 320 has a through hole, the core pin 390 is attached to the second mold member 311 through the through hole of the insert block 320, and that portion of the core pin 390 which is present in the cavity 314 has an opposite surface 392 which faces the cavity wall 321 of the insert block 320. The opposite surface 392 and the cavity wall 321 of the insert block 320 preferably have a clearance ($C_0$) of 0.003 mm to 0.03 mm. The opposite surface 392 may be, or may not be, coated with a flame-sprayed layer. Further, the clearance ($C_2$) between the top surface 393 of the core pin 390 and the cavity wall 310A of the first mold member 310 can be 0 mm when the cavity wall 310A is formed of a metal. When an insert block (not shown) is disposed in the first mold member 310, the cavity wall of the insert block and the top surface 393 of the core pin 390 preferably have a clearance ($C_2$) of 0.003 mm to 0.03 mm (0.003 mm$\leq C_2 \leq$0.03 mm). The top surface 393 may be, or may not be, coated with a flame-sprayed layer. In the above structure, a molded article having a through hole can be produced.

Figure 43:
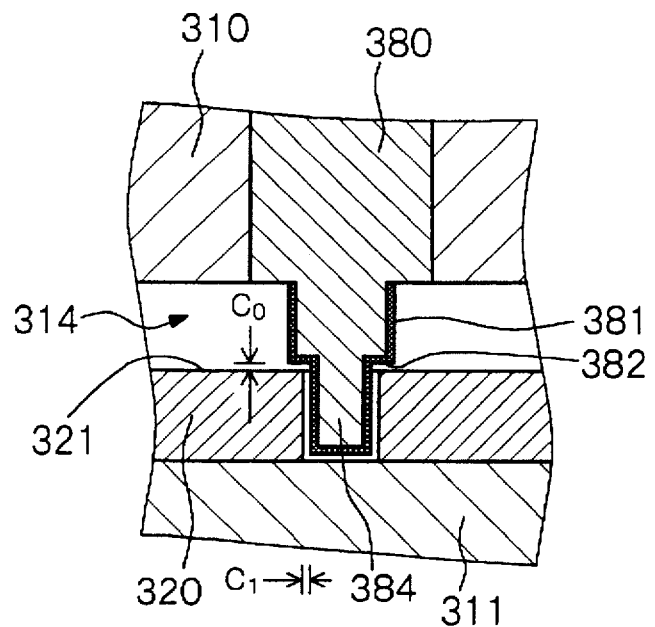

In another embodiment, as shown in the schematic partial cross-sectional view of FIG. 43, the core pin 380 is attached to the first mold member 310, the insert block 320 has a through hole, and when the mold is clamped, the top portion 384 of the core pin 380 extends into the through hole of the insert block 320, and the top portion 384 of the core pin 380 and the through hole of the insert block 320 preferably have a clearance ($C_1$) of at least 0.1 mm. In FIG. 43, the flame-sprayed layer is formed on each of the opposite surface 382 and the surface of the top portion 384, while no flame-sprayed layer may be formed thereon.

Figure 44:
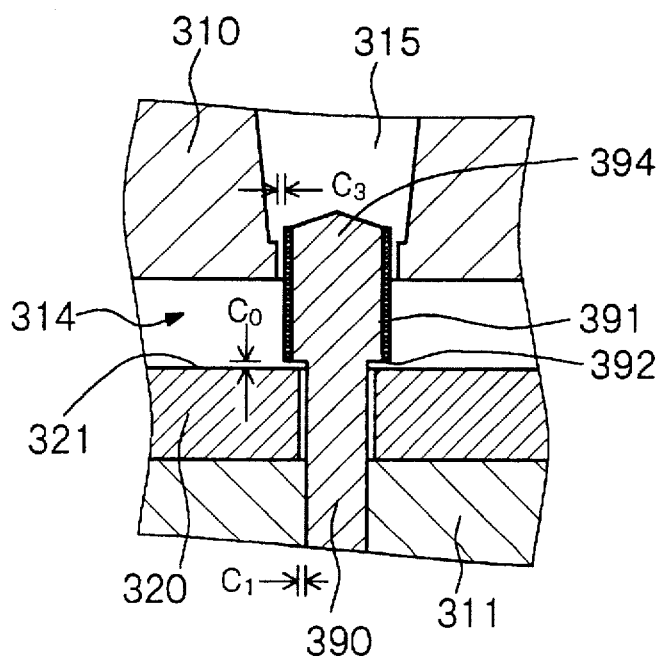

In another embodiment, as shown in the schematic partial cross-sectional view of FIG. 44, the insert block 320 has a through hole, and the core pin 390 is attached to the second mold member 311 through the through hole of the insert block 320. In this embodiment, preferably, the first mold member 310 has a hole portion 315, and when the mold is clamped, the core pin 390 extends into the hole portion 315, and the flame-sprayed layer 391 of the top portion 394 of the core pin 390 and the hole portion 315 preferably has a clearance ($C_3$) of 0.01 mm to 0.03 mm.

Example 43

Figure 45:
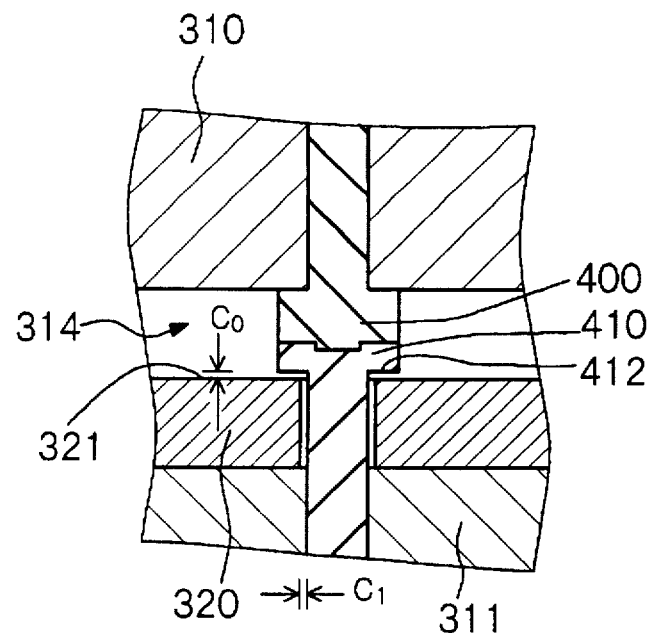
FIGS. 45, 46, 47 and 48 are schematic partial cross-sectional views of a mold assembly used for producing a molded article having a hole in Example 43.

In Example 43, one core pin is attached to a first mold member and other core pin is attached to a second mold member. The structure shown in FIG. 45 is a combination of Example 29 (see FIG. 23) and Example 31 (see FIG. 26). That is, a first core pin 400 is formed of a metal, and is attached to the first mold member 310 by a known method. A second core pin 410 is also formed of a metal, and is attached to the second mold member 311 through a through hole of an insert block 320 by a known method. The top surface of the first core pin 400 and the top surface of the second core pin 410 are structurally fitted with each other. The second core pin 410 has an opposite surface 412.

Figure 46:
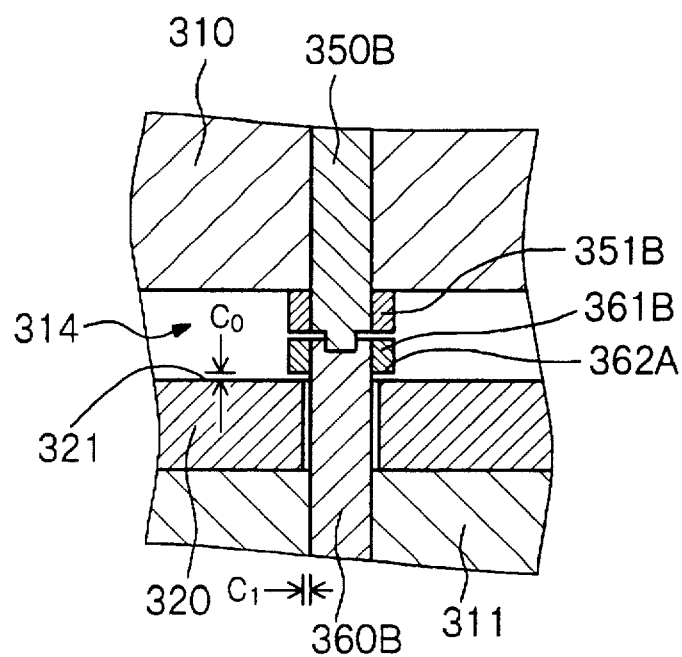

The structure shown in FIG. 46 is combination of Example 36 (see FIG. 33) and Example 39 (see FIG. 36). That is, a first core pin comprises a core pin attaching member 350B attached to a first mold member 310 by a known method and an annular member 351B having both open ends, attached to the core pin attaching member 350B. The annular member 351B has the form of a ring and is formed of ceramic or glass. The core pin attaching member 350B is extending from the other open end of the annular member 351B into the annular member 351B. On the other hand, a second core pin comprises a core pin attaching member 360B attached to a second mold member 311 by a known method and an annular member 361B having both open ends, attached to the core pin attaching member 360B. The core pin 361B has the form of a ring, and is formed of ceramic or glass. These annular members 351B and 361B constitute surfaces of those portions of the core pins which are present in a cavity 314. A surface constituting the one open end of the annular member 361B corresponds to an opposite surface 362A, an insert block 320 has a through hole, and the core pin attaching member 360B goes through the through hole of the insert block 320 and is extending from the one open end of the annular member 361B into the annular member 361B. In this case, the core pin attaching member 360B and the through hole of the insert block 320 preferably have a clearance ($C_1$) of at least 0.1 mm. The core pin attaching members 350B and 360B are structurally fitted with each other. The one open end face (top surface) of the annular member 351B and the other open end face (top surface) of the annular member 361B preferably have a clearance of 0.003 mm to 0.03 mm for preventing the damage of the annular member 351B and the annular member 361B.

Figure 47:
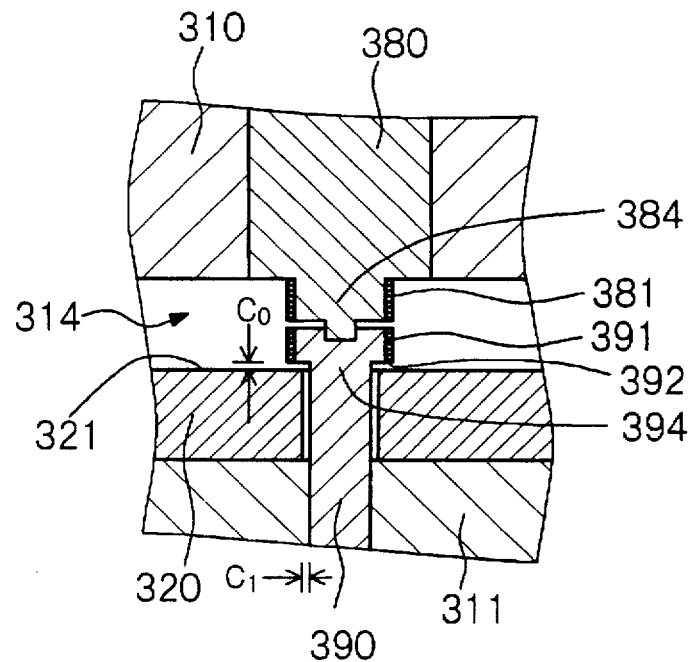

The structure shown in FIG. 47 is a combination of Example 42 shown in FIG. 40 and Example 42 shown in FIG. 42. That is, an insert block 320 has a through hole. A core pin comprises a first core pin 380 attached to a first mold member 310 and a second core pin 390 attached to a second mold member 311 through the through hole of the insert block 320. A top portion 384 of the first core pin 380 and a top portion 394 of the second core pin are fitted in each other when the mold is clamped. The top surface of a flame-sprayed layer 381 formed on the first core pin 380 and the top surface of a flame-sprayed layer 391 formed on the second core pin 390 preferably have a clearance of 0.003 mm o 0.03 mm for preventing the breaking of the flame-sprayed layers 381 and 391.

Figure 48:
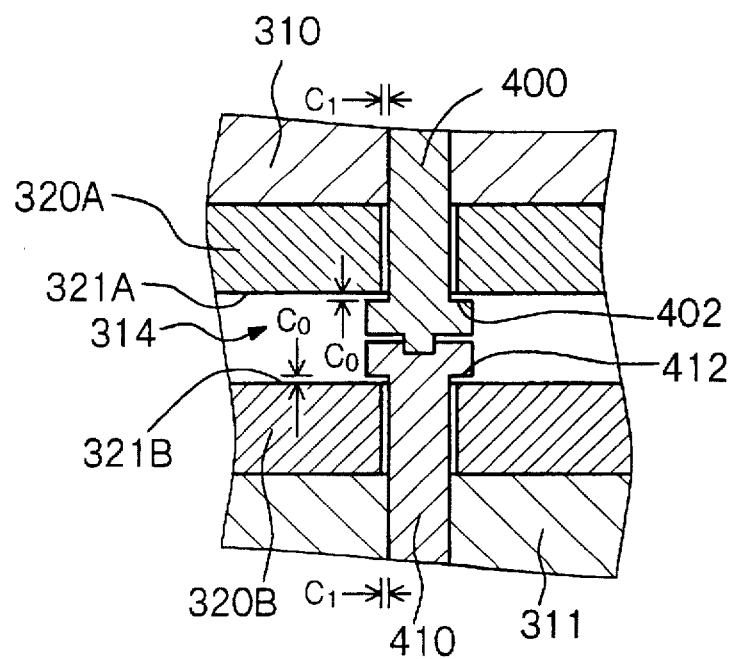

The structure shown in FIG. 48 is a variant of the structure shown in FIG. 45. A first insert block 320A is disposed to the first mold member 310, and a second insert block 320B is disposed to the second mold member 311. The first insert block 320A has a through hole, and a first core pin 400 formed of a metal is attached to the first mold member 310 through the through hole of the first insert block 320A by a known method. The first core pin 400 has an opposite surface 402. A second core pin 410 is also formed of a metal, and the second insert block 320B has a through hole. The second core pin 410 is attached to the second mold member 311 through the through hole of the second insert block 320B by a known method. The second core pin 410 has an opposite surface 412. The top surfaces of the first core pin 400 and the second core pin 410 are structurally fitted with each other. The opposite surface 402 of the first core pin 400 and a cavity wall 321A of the first insert block 320A preferably have a clearance ($C_0$) of 0.003 mm to 0.03 mm, and the opposite surface 412 of the second core pin 410 and a cavity wall 321B of the second insert block 320B preferably have a clearance ($C_0$) of 0.003 mm to 0.03 mm. Further, the first core pin 400 and the through hole of the first insert block 320A preferably have a clearance ($C_1$) of at least 0.1 mm, and the second core pin 410 and the second insert block 320B preferably have a clearance of ($C_1$) of at least 0.1 mm. The structure explained in Example 43 is for an illustrative purpose, and may be altered as required.

Example 44

Examples 44 to 46 are concerned with the method of producing a molded article directed to the fourth aspect of the present invention.

The mold assembly explained in Example 37 and shown in FIG. 34 was used as a mold assembly for producing a molded article having a hole in Example 44. The assembling of the mold assembly used for producing a molded article having a hole in Example 44 will be explained with reference to FIGS. 49A, 49B, 50A and 50B of partial schematic cross sections.

Figure 50A:
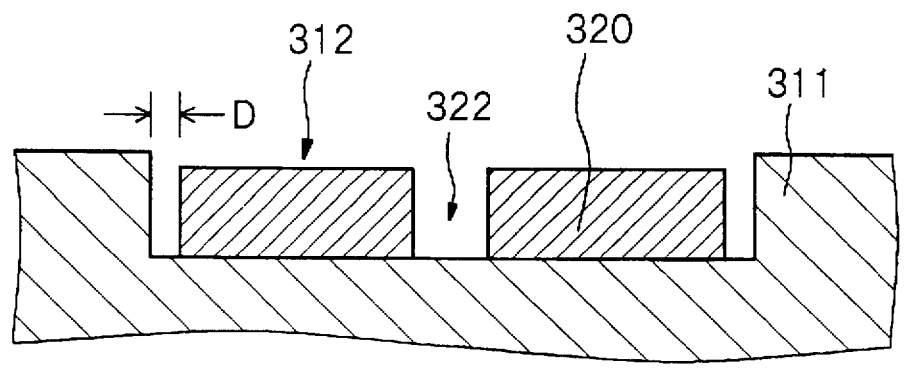
FIGS. 50A and 50B schematic partial cross sections of a mold assembly under assembly in Example 44.

As shown in FIG. 50A, in Example 44, there was used an insert block 320 which was formed of $ZrO_2$, had the form of a disk having a thickness of 3.00 mm and a diameter of 100.00 mm and had a through hole 322 having a diameter of 27.00 mm in the central portion thereof. A second mold member (fixed mold member) 311 formed from carbon steel S55C had an insert block attaching portion 312. The insert block attaching portion 312 had inner dimensions of 100.2 mm in diameter and 3.02 mm in depth. The insert block 320 was disposed to the insert block attaching portion 312 in the second mold member (fixed mold member) with an epoxy-containing adhesive (not shown).

Figure 50B:
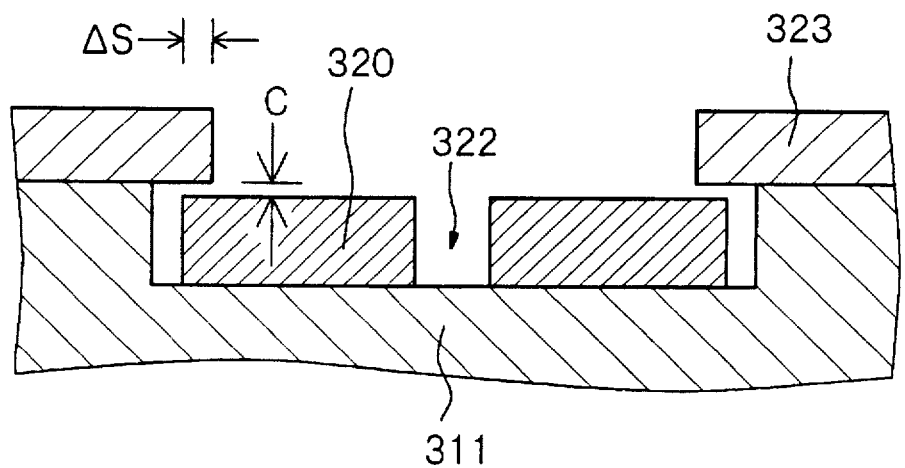

As shown in FIG. 50B, a cover plate 323 for covering a peripheral portion of the insert block 320 was formed from carbon steel S55C. The cover plate 323 had an inner dimension of 99.00 mm in diameter. The cover plate 323 was fixed to the second mold member (fixed mold member) 311 with bolts (not shown). The average clearance (C) between the insert block 320 and the cover plate 323 was 0.01 mm. The amount ($\Delta S$) of overlapping of the insert block 320 and the cover plate 323 was 0.5 mm.

Figure 49A:
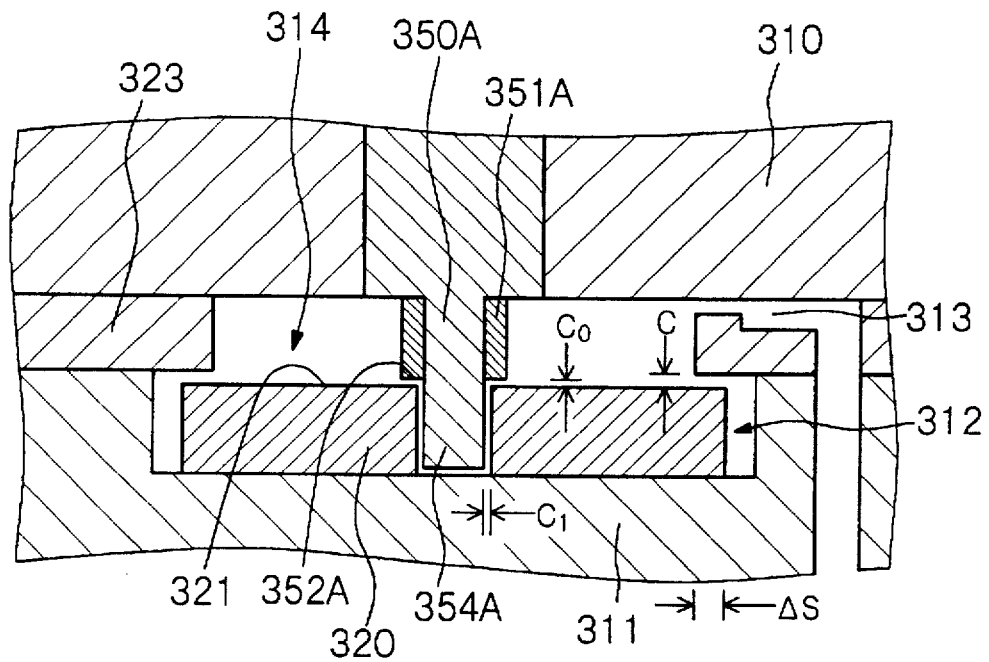
FIGS. 49A and 49B are schematic partial cross sections of a preferred embodiment of a mold assembly in Example 44.
Figure 49B:
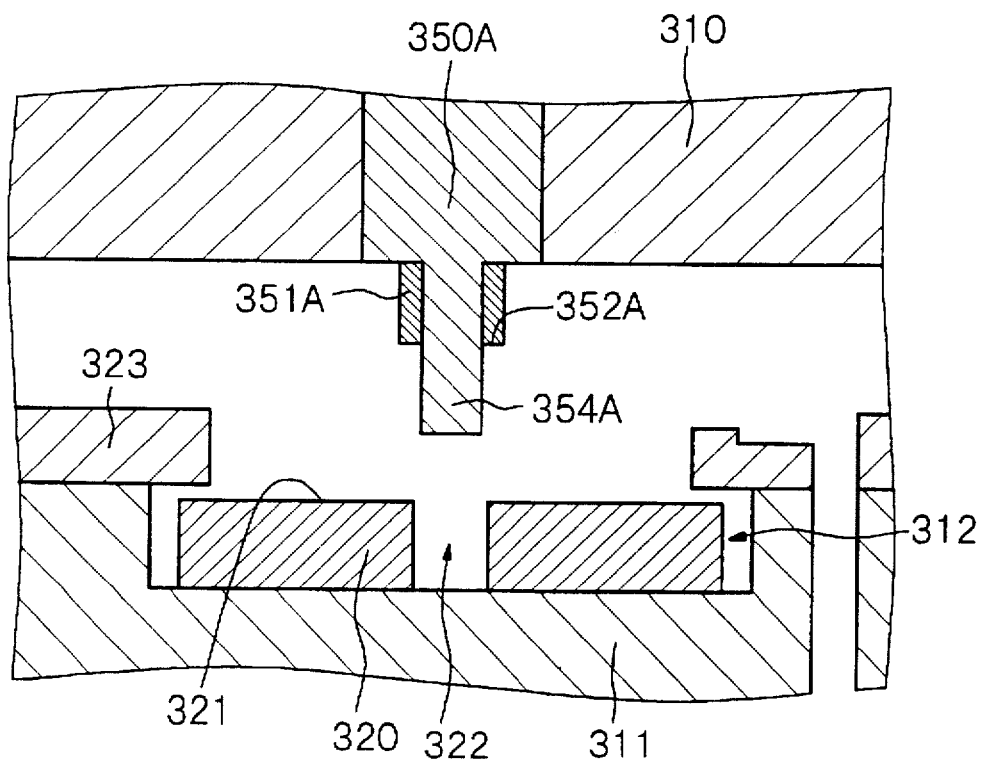

FIGS. 49A and 49B show states where the mold is clamped and the mold is opened after the mold assembly for producing a molded article having a hole in Example 44 is assembled. A core pin for forming a hole of a molded article comprises a core pin attaching member 350A of a metal attached to the first mold member (movable mold member) 310 and an annular member 351A attached to the core pin attaching member 350A with an adhesive (not shown). Both ends of the annular member 351A were open. The annular member 351A was formed of $ZrO_2$ by a cutting and grinding process, and had an inner diameter of 26.00 mm and an outer diameter of 32.00 mm. The outer corner of the annular member 351A was ground to have a curvature of 0.5 mm R. That portion of the core pin attaching member 350A to which the annular member 351A was to be attached had a diameter of 25.90 mm. The surface constituting the one open end of the annular member 351A corresponds to an opposite surface 352A, and the core pin attaching member 350A is extending from the other open end of the annular member 351A into the annular member 351A. The cavity wall 321 of the insert block 320 and the opposite surface 352A of the annular member 351A were not in contact with each other. When the mold was clamped, the cavity wall 321 of the insert block 320 and the opposite surface 352A of the annular member 351A had a clearance ($C_0$) of 0.01 mm. When the mold is closed, the top portion 354A of the core pin attaching member 350A extends from the one open end of the annular member 351A into a through hole 322 of the insert block 320. The top portion 354A of the core pin attaching member 350A and the through hole 322 had a clearance ($C_1$) of 0.55 mm. The above structure prevents the breaking of the insert block 320 and the core pin 350A or prevents the occurrence of mold flashes on a molded article.

Example 45

Figure 51A:
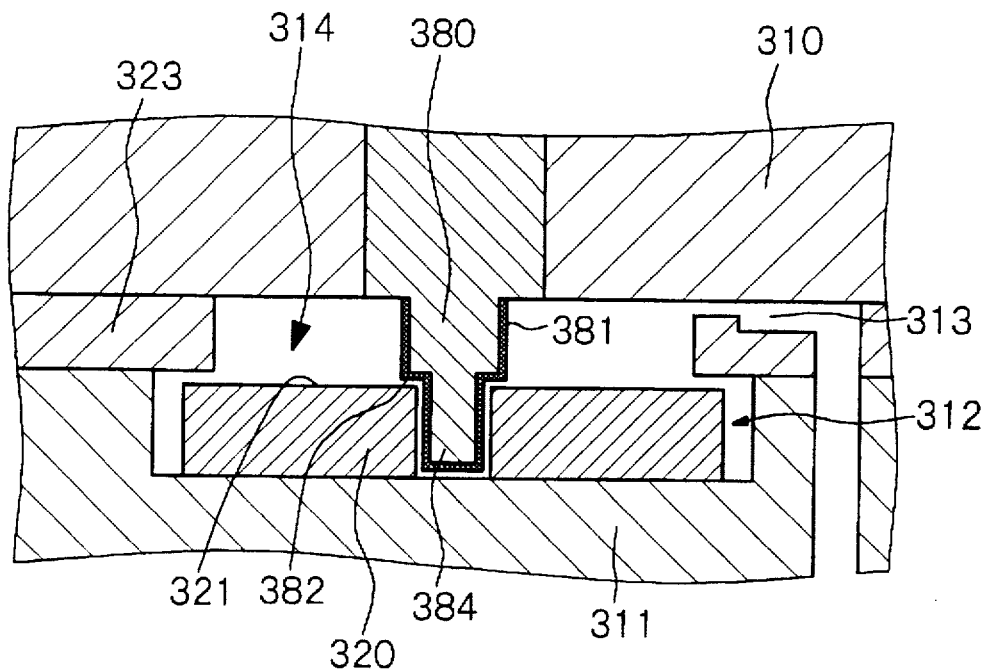
FIGS. 51A and 51B are a schematic partial cross section of a mold assembly used for producing a molded article having a hole in Example 45, showing a state at the time of clamping the mold after the assembling of the mold assembly and a schematic partial cross section of the mold assembly, showing a state at the time of opening the mold.
Figure 51B:
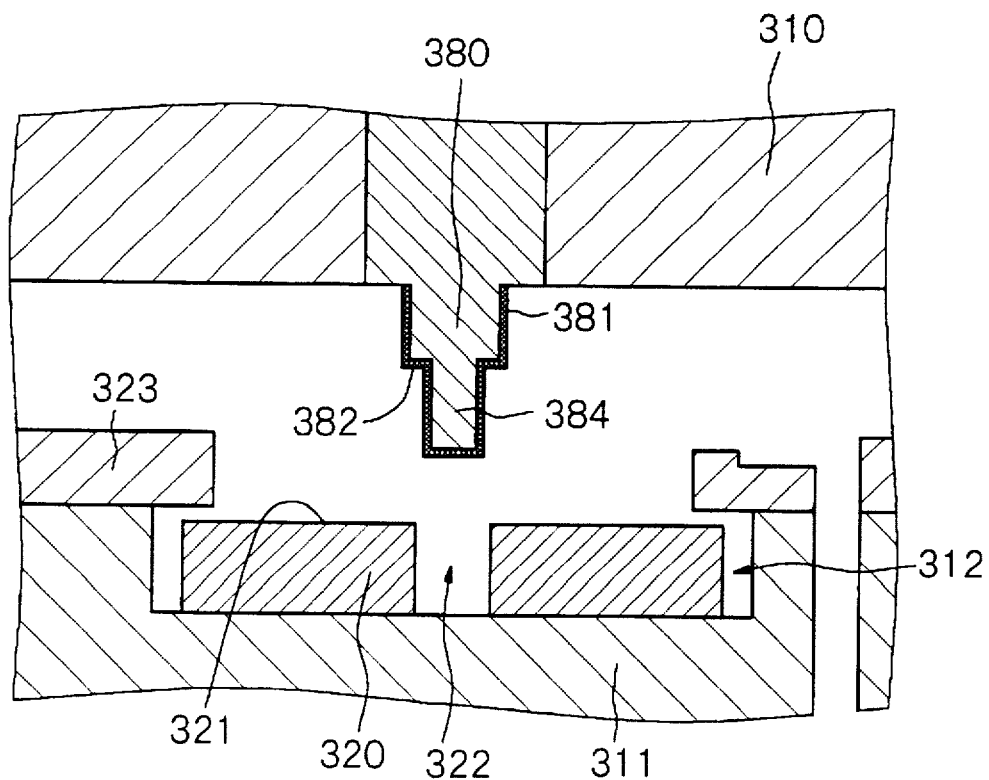

The mold assembly in Example 42, shown in FIG. 43, was used as a mold assembly for producing a molded article having a hole. FIGS. 51A and 51B show partial schematic cross sections of the mold assembly used in Example 45. FIGS. 51A and 51B show states where the mold is clamped and the mold is opened after the mold assembly for producing a molded article having a hole in Example 45 is assembled.

Example 45 used an insert block 320 having the same outer diameter as that in Example 44. The insert block 320 had a through hole 322 having a diameter of 4.00 mm in the central portion thereof. A flame-sprayed layer 381 (thickness 0.6 mm) of $ZrO_2$ was formed on at least that portion (all the surface in this Example) of the core pin 380 which was present in the cavity 314 by flame-spraying $ZrO_2$. That portion of the core pin 380 which was present in the cavity 314 had a diameter of 5.0 mm (including the flame-sprayed layer). The top portion 384 of the core pin 380 had a diameter of 3.6 mm (including the flame-sprayed layer). That portion of the core pin 380 which was present in the cavity 314 had an opposite surface 382 which faced the cavity wall 321 of the insert block 320. The opposite surface 382 and the cavity wall 321 of the insert block 320 had a clearance ($C_0$) of 0.005 mm. The core pin 380 was attached to the first mold member 310. The insert block 320 had a through hole 322 having a diameter of 4.0 mm. When the mold was clamped, the top portion 384 of the core pin 380 extended into the through hole 322 of the insert block 320, and the top portion 384 (including the flame-sprayed layer) of the core pin 380 and the through hole 322 had a clearance of 0.2 mm.

Example 46

Figure 52A:
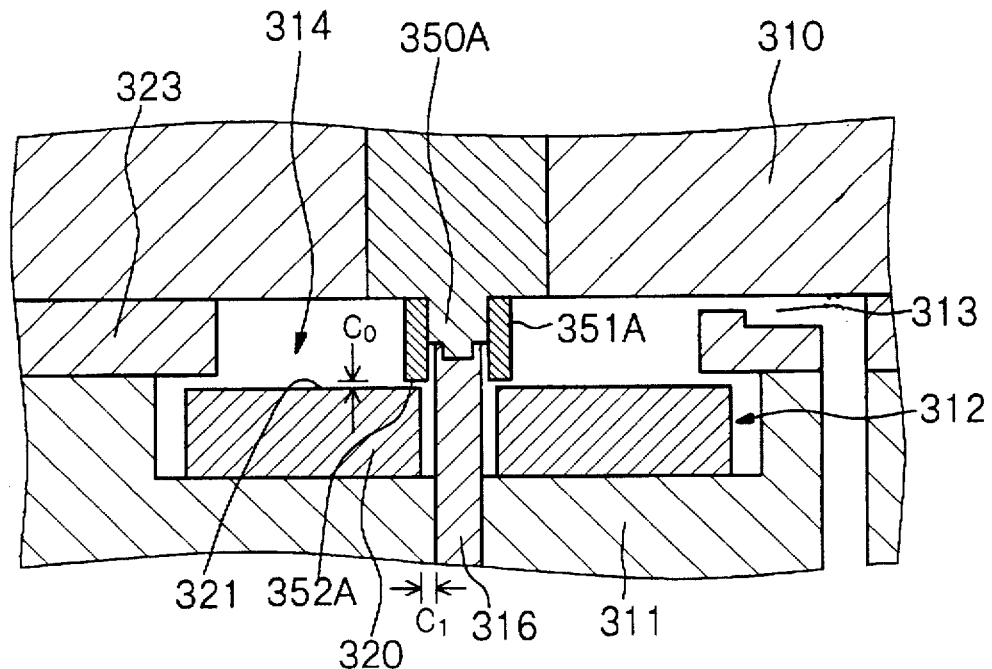
FIGS. 52A and 52B are a schematic partial cross section of a mold assembly used for producing a molded article having a hole in Example 46, showing a state at the time of clamping the mold after the assembling of the mold assembly and a schematic partial cross section of the mold assembly, showing a state at the time of opening the mold.
Figure 52B:
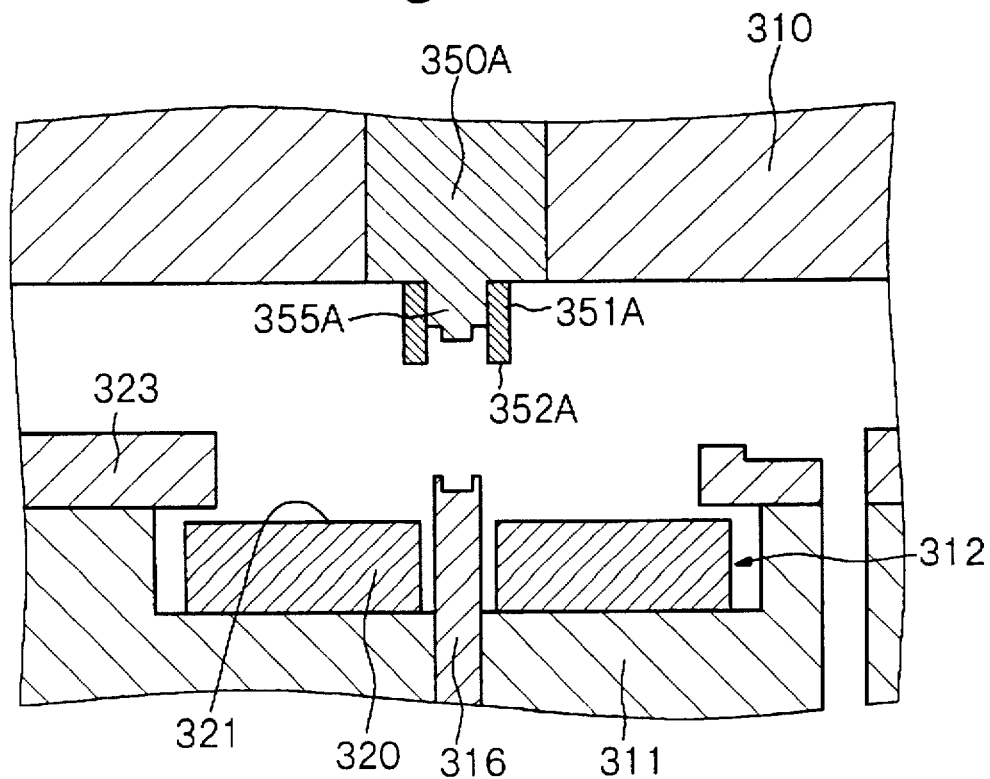

The mold assembly for producing a molded article having a hole in Example 38, shown in FIG. 35, was used as a mold assembly in Example 46. FIGS. 52A and 52B show partial schematic cross sections of the mold assembly used in Example 46. FIGS. 52A and 52B show states where the mold is clamped and the mold is opened after the mold assembly for producing a molded article having a hole in Example 45 is assembled.

The insert block 320 was formed of glass-ceramics having a crystallinity of 70%. The cavity wall 321 of the insert block 320 was lapped and finished with diamond lapping and cerium oxide lapping to have a surface roughness $R_{max}$ of 0.02 μm. The insert block 320 had a thickness of 4.00 mm, an outer diameter of 100.00 mm and an inner diameter of 30.00 mm. The insert block attaching portion 312 in the second mold member (fixed mold member) 311 had inner dimensions of 100.2 mm in outer diameter and 4.02 mm in depth. The insert block attaching portion 312 was formed of carbon steel S55C by a cutting and grinding process. The insert block attaching portion 312 was provided with a projection 316 which was to be fitted with the core pin attaching member 350A. Then, the insert block 320 was disposed into the insert block attaching portion 312 with an epoxy-containing adhesive.

A cover plate 323 for covering a peripheral portion of the insert block 320 was formed from carbon steel S55C. The cover plate 323 had an inner dimension of 99.00 mm in diameter. The cover plate 323 was fixed to the second mold member (fixed mold member) 311 with bolts (not shown).

The average clearance (C) between the insert block 320 and the cover plate 323 was 0.01 mm. The amount ($\Delta S$) of overlapping of the cover plate 323 and the insert block 320 was 0.5 mm.

The core pin attaching member 350A was attached inside the first mold member (movable mold member) 310. That portion of the core pin attaching member 350A of carbon steel S55C to which the annular member 351A was to be attached had a diameter of 25.9 mm. The annular member 351A was formed of $ZrO_2$ by a cutting and grinding process. The annular member 351A had an outer diameter of 32.00 mm and an inner diameter of 26.00 mm. The outer corner of the annular member 351A was ground to have a curvature of 0.5 mm R by a diamond grinder. The annular member 351A was fixed to the annular member attaching portion of the core pin attaching member 350A with an adhesive. When the mold was clamped, the cavity wall 321 of the insert block 320 and the opposite surface 352A of the annular member 351A had a clearance ($C_0$) of 0.01 mm. The projection 316 and the through hole of the insert block 320 had a clearance ($C_1$) of 2.1 mm. Further, the side wall of the top portion of the projection 316 and the inside surface of the annular member 351A had a clearance of 0.1 mm. A molded article had the form of a doughnut having an outer diameter of 99 mm, an inner diameter of 32 mm and a thickness of 2 mm.

The above-completed mold assembly was set in an injection molding machine. The mold assembly was heated up to 130° C. with a mold temperature controller and then rapidly cooled to 40° C. to show that the problems such as cracking, etc., did not occur on the insert block 320 of glass-ceramics having a crystallinity of 70%.

Figure 53:
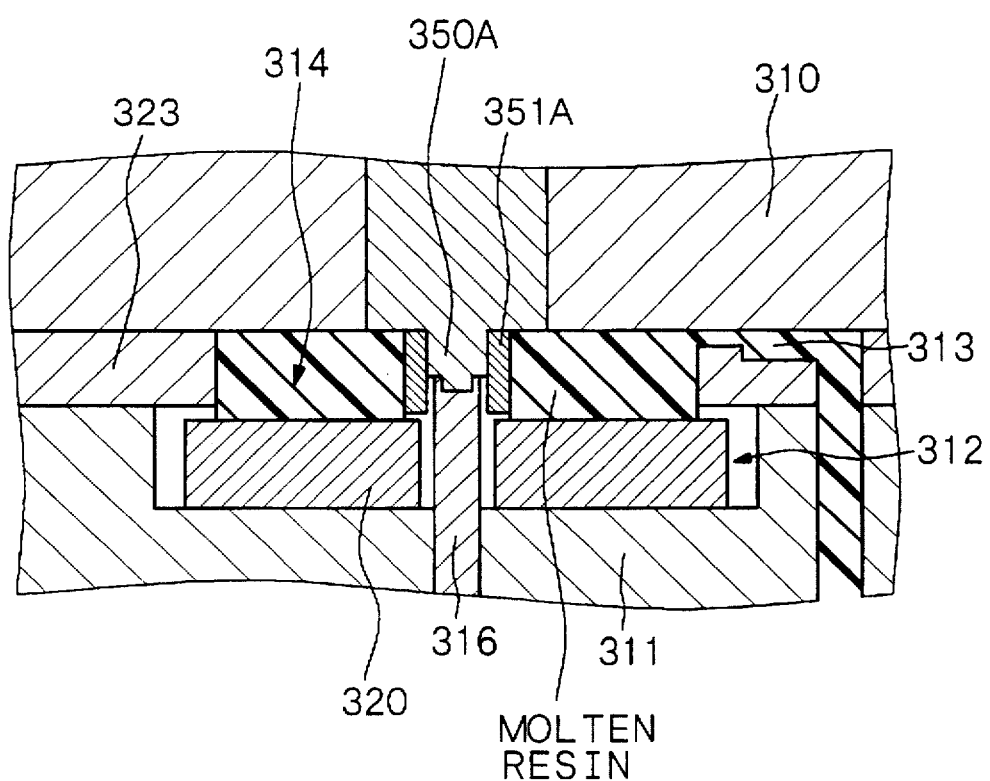
FIG. 53 is a schematic partial cross section of the mold assembly used for producing a molded article having a hole in Example 46, showing a state at the time of completion of the injection of a molten resin into the cavity.

The mold in the same injection molding machine as that in Example 8 was heated to 80° C. A black polycarbonate resin (S3000, supplied by Mitsubishi Engineering-Plastics Corp.) was injected from a gate portion 313 into the cavity 314 at a resin temperature of 280° C. at an injection pressure of 700 kgf/cm$^2$ (see FIG. 53). Twenty seconds after the completion of the injection, a molded article was released from the mold.

The molded article which had been in contact with the insert block 320, including edge portions of the molded article, had excellent gloss, and no occurrence of a weldline was found. Further, when the above molding was repeated 10000 cycles, neither the insert block 320 nor the annular member 351A was broken.

Comparative Example 46A

An attempt was made to produce a molded article under the same conditions as those in Example 46 except that the insert block 320A and the annular member 351A were formed from Stavax steel and that the their cavity walls were ground to form mirror-finished surfaces. The molten resin in the cavity showed poor flowability, and the cavity was not completely filled with the molten resin. The injection pressure was therefore increased by 100 kgf/cm$^2$ up to 800 kgf/cm$^2$ to carry out the molding. The resultant molded article had a weldline on the surface.

Comparative Example 46B

A molded article was produced under the same conditions as those in Example 46 except that the clearance ($C_o$) between the opposite surface 352A of the annular member 351A and the cavity wall 321 of the insert block 320 was changed to 0.00 mm and that the amount ($\Delta S$) of overlapping of the cover plate 323 and the insert block 320 was changed to 0.00 mm. As a result, that surface of the molded article which had been in contact with the cavity wall 321 of the insert block 320 had excellent gloss and showed no occurrence of a weldline. However, the insert block 320 and the annular member 351 underwent cracking after 15th molding cycle.

The present invention is explained above on the basis of preferred Examples, while the present invention shall not be limited thereto. The molding conditions and the raw materials used in Examples and the structures of the mold assemblies in Examples are all for illustrative purposes, and they may be modified as required. The forms and sizes of the insert block and the cover plate are also for illustrative purposes, and can be modified in design as required. The insert block and the cover plate may be disposed in the movable mold member, and they may be disposed both in the fixed movable mold members or the first and second mold members as required.

The insert block of the present invention not only has a high heat insulation effect, but also can be easily inspected and maintained. Further, the mold assembly of the present invention enables the control of the rapid cooling of a molten resin filled in the cavity and also enables the effective prevention of occurrence of poor appearances such as a weld-mark and a flow mark. Further, it is made possible to effectively prevent the deposition of the metal powder or metal flakes on the surface of the molded article and the occurrence of color shading in the molded article. Moreover, since the wettability between a molten resin and the cavity wall of the insert block can be increased, the high decalcomania or replication of the cavity wall to the surface of the molded article can be attained, and the molded article can be easily released from the mold.

In the mold assembly of the present invention, while the insert block and the cover plate have the clearance (C) in the predetermined range and while the amount ($\Delta S$) of overlapping of the cover plate and the insert block is within the predetermined range, the insert block covers the peripheral of the cover plate and does not contact with the cover plate. As a result, the insert block is free from breaking in the continuous operation for a long period of time, and the mold assembly having a mirror surface can be easily produced at a low cost. Further, the appearance of a molded article is not impaired even in edge portions, the occurrence of mold flashes on the edge portion of a molded article can be prevented, and the decreased percentage of defective molded articles and the equalization and the improvement of molded articles in quality can be accomplished, which serves to decrease the production cost of molded articles.

The insert block formed of glass-ceramics easily gives a molded article having an excellent mirror surface property and an excellent surface state replicated from the insert block. Further, the insert block formed of glass-ceramics has a low coefficient of linear expansion, a high heat shock strength and high durability against breaking and cracking.

Further, since a molten resin is improved in flowability, the pressure for the injection of the molten resin can be decreased to decrease a residual stress in a molded article. As a result, the molded article is improved in quality. Further, owing to the decrease of the injection pressure, the mold can be decreased in thickness and the molding machine can be decreased in size, which leads to a decrease in the cost of molded articles.

In the method of producing a molded article directed to the first aspect of the present invention, the average length, the average diameter and the content of an inorganic fiber contained in the thermoplastic resin are defined, and the mold assembly having the insert block and the cover plate is used. As a result, a molded article which has a high elastic modulus but has an excellent mirror surface property can be produced. A thermoplastic resin containing an inorganic fiber, which has been used only in the fields of parts whose appearances are not weighed due to the difficulty in obtaining an excellent appearance at present, can be therefore used in a variety of fields.

In the method of producing a molded article directed to the first aspect of the present invention, a state of the cavity wall of the mold can be faithfully replicated to the surface of a molded article, and there can be obtained a door handles of an automobile having high rigidity, a low coefficient of linear expansion, high heat resistance and excellent definition.

In the method of producing a molded article directed to the first aspect of the present invention, there can be produced mirror parts and reflector parts having a high elastic modulus and very high definition (mirror surface property) from a thermoplastic resin containing an inorganic fiber having high rigidity, a low coefficient of linear expansion and high heat resistance. Therefore, a thermoplastic resin containing an inorganic fiber, which has been used only in the fields of parts whose appearances are not weighed due to the difficulty in obtaining an excellent appearance at present, can be used in the field of the production of mirrors and reflectors. Further, since a mirror (part) and a reflector (part) having assembly parts integrated thereinto can be produced, it is expected to decrease the number of their assembly parts and the production cost thereof, the productivity of the mirror and the reflector can be improved, and the improvement in workability based on the decrease of the number of the assembly parts can be expected.

When a coating composition is applied to the surface of a molded article produced from a thermoplastic resin containing an inorganic fiber by the method of producing a molded article directed to the first aspect of the present invention, there can be obtained an exterior member of an automobile having high rigidity, a low coefficient of linear expansion and high heat resistance and also having an excellent appearance. Further, the production of an exterior member of an automobile having an excellent appearance and a decreased weight can be improved in the mass-productivity and the freedom in design.

when a hard coating is formed on the surface of a molded article produced from a thermoplastic resin containing an inorganic fiber, there can be obtained a pillar of an automobile having high rigidity, a low coefficient of linear expansion and high heat resistance and also having an excellent appearance. Further, the occurrence of a cracking caused on the molded article by a hard coating solution can be prevented.

When a molded article is produced from a crystalline thermoplastic resin according to the method of producing a molded article directed to the first aspect of the present invention, the resin surface of the molded article has a high crystallinity, and the cracking of the molded article caused by the resin deterioration and the degradation of the physical properties of the resin surface can be prevented.

When a molded article is produced from a polymer alloy according to the method of producing a molded article directed to the first aspect of the present invention, there can be easily produced a molded article having highly improved gloss and an excellent mirror surface property (definition).

Further, a molded article produced according to the method of producing a molded article directed to the first aspect of the present invention has a metallic color tone with a deep and glossy appearance without a clear coating.

In the method of producing a molded article directed to the second aspect of the present invention (injection compression molding method), the pressure for injecting a molten resin can be set at a low level. Further, since the use of the insert block formed of ceramic or glass improves the molten resin in flowability, the above pressure can be set at a lower level. As a result, it is made possible to decrease the residual stress which the molded article is to have, and the molded article is improved in quality. Further, since pressure is uniformly exerted on the molded article surface, the occurrence of a sink mark on the molded article surface can be prevented. Furthermore, the occurrence of the deformation and breaking of the insert block can be effectively prevented. The development of a solidification layer of some resins is delayed and the wettability between the molten resin and the cavity wall of the insert block is therefore improved. As a result, a vacuum state is formed between the cavity wall of the insert block and the resin (molded article), so that it is sometimes difficult to release the molded article from the mold. For overcoming the above phenomenon, there is employed the mold assembly having a structure in which a knock-out pin is provided and a fluid can be flowed through a space between the knock-out pin and the first mold member and through a space between the insert block and the cover plate when the mold is opened to release a molded article from the first mold member with the knock-out pin after the molded article is produced, whereby the space between the cavity wall of the insert block and the resin (molded article) is no longer in a vacuum state, and the molded article can be reliably released from the mold.

In the method of producing a molded article directed to the third aspect of the present invention (gas-assisted injection molding method), a pressurized fluid is introduced into a molten resin injected into the cavity, and it is therefore made possible to prevent the occurrence of a sink mark on edge portions of the molded article and on thickness-increased portions such as a gas channel portion.

When the mold assembly for producing a molded article having a hole directed to the third or fourth aspect of the present invention, it is made possible to prevent the occurrence of the deterioration of decalcomania or replication and gloss caused by rapid cooling of a molten resin, and the occurrence of a weldline can be prevented. Further, a molded article having a hole can be easily produced. When the insert block is disposed so as to have a clearance (C) and the amount ($\Delta S$) of overlapping with the cover plate in the predetermined ranges, the insert block is free from breakage in the molding operation for a long period of time. When the core pin is formed of ceramic or glass or when at least the surface of that portion of the core pin which is present in the cavity is formed of ceramic or glass, a molten resin which is divided into two flows by the core pin and converges thereafter is not cooled to excess, and the resultant molded article has almost no weldline. Further, when the opposite surface of that portion of the core pin which is present in the cavity and the cavity wall of the insert block have a predetermined clearance, the core pin and the insert block are no longer brought into contact with each other, and the core pin and the insert block can be used in the operation for a long period of time.

What is claimed is:

1. A method of the production of a molded article, using a mold assembly comprising (A) a mold having a cavity, for producing a molded article from a thermoplastic resin, (B) an insert block formed of ceramic or glass having a thermal conductivity of $2 \times 10^{-2}$ cal/cm.sec.°C. or less, said insert block being disposed inside the mold, constituting part of the cavity, and having a thickness of 0.5 mm to 10 mm, and (C) a cover plate for covering a peripheral portion of the insert block, said cover plate being attached to the mold and constituting part of the cavity, wherein a clearance between the insert block and the cover plate is 0.001 mm to 0.03 mm, and an amount of overlapping of the insert block and the cover plate is at least 0.1 mm, said method comprising filling a molten thermoplastic resin in the cavity, and then cooling the thermoplastic resin to solidness.

2. The method of the production of a molded article according to claim 1, wherein the insert block has a surface which constitutes part of the cavity, and said surface of the insert block has a surface roughness $R_{max}$ of 0.03 µm or less.

3. The method of the production of a molded article according to claim 1, wherein the insert block is formed of ceramic selected from the group consisting of $ZrO_2$, $ZrO_2$—$CaO$, $ZrO_2$—$Y_2O_3$, $ZrO_2$—$MgO$, $K_2O$—$TiO_2$, $Al_2O_3$, $Al_2O_3$—$TiC$, $Ti_3N_2$ and $3Al_2O_3$—$2SiO_2$ or glass selected from the group consisting of soda-lime glass, quartz glass, heat resisting glass and glass-ceramics.

4. The method of the production of a molded article according to claim 3, wherein the insert block is formed of glass-ceramics having a crystallinity of at least 10%.

5. The method of the production of a molded article according to claim 4, wherein the insert block is formed of glass-ceramics having a crystallinity of at least 60%.

6. The method of the production of a molded article according to claim 4, wherein the insert block is formed of glass-ceramics having a coefficient of linear expansion of $1 \times 10^{-6}$/K or less and having a heat shock strength of at least 400° C., the insert block has a surface which constitutes part of the cavity, and said surface of the insert block has a surface roughness ($R_{max}$) of 0.03 µm or less.

7. The method of the production of a molded article according to claim 1, wherein the thermoplastic resin is a thermoplastic resin containing 5 to 80% by weight of an inorganic fiber having an average length of 5 to 400 µm and an average diameter of 0.01 to 15 µm.

8. The method of the production of a molded article according to claim 7, wherein the inorganic fiber is at least one member selected from the group consisting of a glass fiber, a carbon fiber, wollastonite, an aluminum borate whisker fiber, a potassium titanate whisker fiber, a basic magnesium sulfate whisker fiber, a calcium silicate whisker fiber and a calcium sulfate whisker fiber.

9. The method of the production of a molded article according to claim 7, wherein the thermoplastic resin is one selected from the group consisting of a polycarbonate resin, a polyamide resin, a modified PPE resin, a polyester resin and a polycarbonate/polyester resin polymer alloy.

10. The method of the production of a molded article according to claim 7, wherein the molded article is to constitute a door handle of an automobile.

11. The method of the production of a molded article according to claim 7, wherein the method further includes the step of forming a light reflection thin film on at least part of the surface of the molded article.

12. The method of the production of a molded article according to claim 11, wherein the light reflection thin film has a thickness of at least 50 nm.

13. The method of the production of a molded article according to claim 12, wherein the light reflection thin film is formed by vacuum-depositing aluminum.

14. The method of the production of a molded article according to claim 11, wherein the molded article is to constitute a mirror.

15. The method of the production of a molded article according to claim 14, wherein the molded article has a flexural modulus of at least 5.0 GPa, a coefficient of linear expansion of $3.0 \times 10^{-5}$/K or less, a deflection temperature under load of at least 100° C., and definition of at least 85%.

16. The method of the production of a molded article according to claim 11, wherein the molded article is to constitute a reflector.

17. The method of the production of a molded article according to claim 7, wherein the method further includes the step of forming a coating on at least part of the surface of the molded article.

18. The method of the production of a molded article according to claim 17, wherein the coating is formed from at least one coating composition selected from the group consisting of an acrylic coating composition, a urethane coating composition and an epoxy coating composition.

19. The method of the production of a molded article according to claim 17, wherein the molded article is to constitute an exterior member of an automobile.

20. The method of the production of a molded article according to claim 19, wherein the molded article is to constitute a front fender, a rear fender, a door, a bonnet, a roof or a trunk hood.

21. The method of the production of a molded article according to claim 7, wherein the method further includes the step of forming a hard coating on at least part of the surface of the molded article.

22. The method of the production of a molded article according to claim 21, wherein the hard coating is at least one member selected from the group consisting of an acrylic hard coating, a urethane hard coating and a silicone hard coating.

23. The method of the production of a molded article according to claim 21, wherein the molded article is to constitute a pillar of an automobile.

24. The method of the production of a molded article according to claim 1, wherein the thermoplastic resin is a crystalline thermoplastic resin.

25. The method of the production of a molded article according to claim 24, wherein the crystalline thermoplastic resin is one member selected from the group consisting of a polyolefin resin, a polyamide resin, a polyoxymethylene resin, a polyester resin and a polyphenylene sulfide resin.

26. The method of the production of a molded article according to claim 1, wherein the thermoplastic resin is a polymer alloy.

27. The method of the production of a molded article according to claim 26, wherein the polymer alloy is a blend of at least two thermoplastic resins, or a block or graft copolymer in which at least two thermoplastic resins are chemically bound.

28. The method of the production of a molded article according to claim 1, wherein the thermoplastic resin contains 0.01 to 80% by weight of a metal powder having an average particle diameter of 0.1 µm to 1 mm, or metal flakes having an average thickness of 0.1 to 200 µm and an average size which is greater than the average thickness, and the thermoplastic resin is an amorphous thermoplastic resin, or is a crystalline thermoplastic resin which satisfies the following formula, $$Y > (3.35 \times 10^7) X^{-4.08}$$

wherein Y is a semi-crystallization time and X is a super-cooling degree.

29. The method of the production of a molded article according to claim 28, wherein the metal powder is a chromium oxide powder or an aluminum powder.

30. The method of the production of a molded article according to claim 28, wherein the metal flakes are aluminum flakes.

31. The method of the production of a molded article according to claim 28, wherein the thermoplastic resin contains 1 to 50% by weight of an inorganic fiber, provided that the total amount of the metal powder or the metal flakes and the inorganic fiber is 80% by weight or less.

32. The method of producing a molded article using a mold assembly comprising (A) a mold comprising a first mold member and a second mold member and having a structure in which a cavity for molding a thermoplastic resin to form a molded article is formed inside the mold at the time of closing the mold and the cavity is variable in volume at the time of forming the molded article, (B) an insert block formed of ceramic or glass having a thermal conductivity of $2 \times 10^{-2}$ cal/cm-sec.°C. or less, said insert block being disposed inside the first mold member, the second mold member or the first and second mold members, constituting part of the cavity and having a thickness of 0.5 mm to 10 mm, and (C) a cover plate for covering a peripheral portion of the insert block, said cover plate being attached to the mold member in which the insert block is disposed, and constituting part of the cavity, wherein a clearance between the insert block and the cover plate is 0.001 mm to 0.03 mm, and an amount of overlapping of the cover plate and the insert block is at least 0.1 mm, said method comprising the steps of (a) closing the first mold member and the second mold member so as to make a cavity volume greater than a volume of the molded article to be produced, (b) injecting a molten thermoplastic resin to the cavity, (c) decreasing the cavity volume to the volume of the molded article to be produced, concurrently with the initiation of injection of the thermoplastic resin, during the injection, or after completion of the injection, and (d) cooling the thermoplastic resin in the cavity and then releasing a molded article from the mold.

33. The method of producing a molded article according to claim 32, wherein the mold assembly further has a knock-out pin slidably arranged in the first mold member, a clearance between the knock-out pin and the first mold member is 0.01 mm to 0.03 mm, a space between the knock-out pin and the first mold member and a space between the insert block and the cover plate are communicated with a fluid source, and a fluid flows through the space between the knock-out pin and the first mold member and through the space between the insert block and the cover plate when the mold is opened to release the molded article from the first mold member with the knock-out pin after the molded article is produced.

34. The method of producing a molded article according to claim 32 or 33, wherein the insert block is formed of ceramic selected from the group consisting of $ZrO_2$, $ZrO_2$—CaO, $ZrO_2$—$Y_2O_3$, $ZrO_2$—MgO, $K_2O$—$TiO_2$, $Al_2O_3$, $Al_2O_3$—TiC, $Ti_3N_2$ and $3Al_2O_3$—$2SiO_2$ or glass selected from the group consisting of soda-lime glass, quartz glass, heat resisting glass and glass-ceramics.

35. The method of producing a molded article using a mold assembly comprising (A) a mold having a cavity, for producing a molded article from a thermoplastic resin, (B) a pressurized fluid introduction device, (C) an insert block formed of ceramic or glass having a thermal conductivity of $2 \times 10^{-2}$ cal/cm.sec.°C. or less, said insert block being disposed inside the mold, constituting part of the cavity and having a thickness of 0.5 mm to 10 mm, and (D) a cover plate for covering a peripheral portion of the insert block, said cover plate being attached to the mold and constituting part of the cavity, wherein a clearance between the insert block and the cover plate is 0.001 mm to 0.03 mm, and an amount of overlapping of the insert block and the cover plate is at least 0.1 mm, said method comprising injecting a molten thermoplastic resin into the cavity, introducing a pressurized fluid from the pressurized fluid introduction device into the molten thermoplastic resin in the cavity, and then cooling the thermoplastic resin to solidify it, thereby to form a hollow portion inside the thermoplastic resin in the cavity.

36. The method of producing a molded article according to claim 35, wherein the insert block is formed of ceramic selected from the group consisting of $ZrO_2$, $ZrO_2$—CaO, $ZrO_2$—$Y_2O_3$, $ZrO_2$—MgO, $K_2O$—$TiO_2$, $Al_2O_3$, $Al_2O_3$—TiC, $Ti_3N_2$ and $3Al_2O_3$—$2SiO_2$ or glass selected from the group consisting of soda-lime glass, quartz glass, heat resisting glass and glass-ceramics.

37. The method of producing a molded article according to claim 1, wherein the molded article has a hole, the mold comprises a first mold member and a second mold member and is capable of forming the cavity at a time of closing the mold, the insert block is disposed inside the first mold member, the second mold member or the first and second members, the cover plate is attached to the mold member in which the insert block is disposed, and constituting part of the cavity, and the mold assembly further comprises a core pin for forming the hole in the molded article, said core pin is attached to the first mold member, the second mold member or the first and second members, and said core pin has a portion which is present in the cavity and forms part of the cavity, and a molten thermoplastic resin is filled into the cavity formed by the mold, the core pin, the insert block and the cover plate, to produce the molded article having the hole.

38. The method of producing a molded article according to claim 37, wherein that portion of the core pin which is present in the cavity has an opposite surface which faces that surface of the insert block which constitutes the cavity, and a clearance between the opposite surface of the core pin and said surface of the insert block is 0.003 mm to 0.03 mm.

39. The method of producing a molded article according to claim 37, wherein the core pin is formed of ceramic or glass and attached to the first mold member.

40. The method of producing a molded article according to claim 37, wherein the core pin is formed of ceramic or glass, the insert block has a through hole and the core pin is attached to the second mold member through the through hole of the insert block.

41. The method of producing a molded article according to claim 39 or 40, wherein the core pin is formed of $ZrO_2$—$Y_2O_3$ or $3Al_2O_3$—$2SiO_2$ having a thermal conductivity of $2 \times 10^{-2}$ cal/cm.sec.°C. or less, or formed of glass-ceramics having a thermal conductivity of $2 \times 10^{-2}$ cal/cm.sec.deg or less.

42. The method of producing a molded article according to claim 37, wherein the core pin comprises (a) a core pin attaching member provided to the first mold member, and (b) an annular member which is formed of ceramic or glass, has one closed end and one open end and is attached to the core pin attaching member, and the annular member constitutes a surface of that part of the core pin which is present in the cavity, and the core pin attaching member is extending from the open end of the annular member into the annular member.

43. The method of producing a molded article according to claim 38, wherein the core pin comprises (a) a core pin attaching member provided to the second mold member and (b) an annular member which is formed of ceramic or glass, has one closed end and one open end and is attached to the core pin attaching member, and the annular member constitutes a surface of that part of the core pin which is present in the cavity, a surface constituting the open end of the annular member corresponds to the opposite surface, the insert block has a through hole, and the core pin attaching member is extending through the through hole of the insert block and extending from the open end of the annular member into the annular member.

44. The method of producing a molded article according to claim 38, wherein the core pin comprises (a) a core pin attaching member provided to the first mold member and (b) an annular member which is formed of ceramic or glass, has both open ends and is attached to the core pin attaching member, and the annular member constitutes a surface of that part of the core pin which is present in the cavity, a surface constituting the one open end of the annular member corresponds to the opposite surface, and the core pin attaching member is extending from the other open end of the annular member into the annular member.

45. The method of producing a molded article according to claim 38, wherein the core pin comprises (a) a core pin attaching member provided to the second mold member, and (b) an annular member which is formed of ceramic or glass, has both open ends and is attached to the core pin attaching member, and the annular member constitutes a surface of that part of the core pin which is present in the cavity, a surface constituting the one open end of the annular member corresponds to the opposite surface, the insert block has a through hole, and the core pin attaching member is extending through the through hole of the insert block and extending from the one open end of the annular member into the annular member.

46. The method of producing a molded article according to any one of claims 42 to 45, wherein the annular member is formed of $ZrO_2$—$Y_2O_3$ or $3Al_2O_3$—$2SiO_2$ having thermal conductivity of $2\times10^{-2}$ cal/cm.sec.°C. or less, or formed of glass-ceramics having a thermal conductivity of $2\times10^{-2}$ cal/cm.sec.°C. or less.

47. The method of producing a molded article according to claim 37 or 38, wherein a flame sprayed layer is formed on a surface of that portion of the core pin which is present in the cavity by flame-spraying ceramic or glass.

48. The method of producing a molded article according to claim 47, wherein the material for forming the flame sprayed layer is $ZrO_2$—$Y_2O_3$ or $3Al_2O_3$—$2SiO_2$ having a thermal conductivity of $2\times10^{-2}$ cal/cm.sec.°C. or less.

49. The method of producing a molded article according to claim 37, wherein at least a surface of that portion of the core pin which is present in the cavity has a surface formed of ceramic or glass.

50. The method of producing a molded article according to claim 49, wherein that portion of the core pin which is present in the cavity has an opposite surface facing the surface of the insert block which constitutes part of the cavity, and a clearance between the opposite surface and said surface of the insert block is 0.003 mm to 0.03 mm.

51. The method of producing a molded article according to claim 37, wherein the insert block is formed of ceramic selected from the group consisting of $ZrO_2$, $ZrO_2$—CaO, $ZrO_2$—$Y_2O_3$, $ZrO_2$—MgO, $K_2O$—$TiO_2$, $Al_2O_3$, $Al_2O_3$—TiC, $Ti_3N_2$ and $3Al_2O_3$—$2SiO_2$ or glass selected from the group consisting of soda-lime glass, quartz glass, heat resisting glass and glass-ceramics.

* * * * *

UNITED STATES PATENT AND TRADEMARK OFFICE
CERTIFICATE OF CORRECTION

PATENT NO. : 5,741,446
DATED : April 21, 1998
INVENTOR(S) : Hisashi TAHARA et al.

It is certified that error appears in the above-identified patent and that said Letters Patent is hereby corrected as shown below:

On the title page,
    Section [30], line 9, change "7-403516" to --7-302516--.

Signed and Sealed this

First Day of September, 1998

Attest:

BRUCE LEHMAN

Attesting Officer     Commissioner of Patents and Trademarks